United States Patent [19]

Lewis

[11] Patent Number: 5,689,376
[45] Date of Patent: Nov. 18, 1997

[54] TWO ELEMENT OPTICAL SYSTEM, A CAMERA USING IT AND METHOD OF MAKING THE CAMERA

[75] Inventor: Alan E. Lewis, Rochester, N.Y.

[73] Assignee: Eastman Kodak Company, Rochester, N.Y.

[21] Appl. No.: 427,552

[22] Filed: Apr. 24, 1995

[51] Int. Cl.$^6$ ........................................................ G02B 9/08
[52] U.S. Cl. ........................................................ 359/717
[58] Field of Search ................................ 359/713, 714, 359/715, 716, 717, 689, 708

[56] References Cited

U.S. PATENT DOCUMENTS

| | | | |
|---|---|---|---|
| 3,006,248 | 10/1961 | Linke | 350/450 |
| 4,443,067 | 4/1984 | Owen | 359/675 |
| 4,690,515 | 9/1987 | Nakajima | 359/708 |
| 4,932,764 | 6/1990 | Simpson, Jr. | 359/725 |
| 4,979,807 | 12/1990 | Matsuoka | 359/708 |
| 5,000,552 | 3/1991 | Simpson, Jr. | 359/740 |
| 5,067,803 | 11/1991 | Ohno | 359/708 |
| 5,166,830 | 11/1992 | Ishibai | 359/717 |
| 5,327,291 | 7/1994 | Baker | 359/716 |
| 5,365,377 | 11/1994 | Sato | 359/718 |

OTHER PUBLICATIONS

Meiron, Joseph, "On the Design of Optical Systems Containing Aspheric Surfaces" Journal of Optical Society of America, vol. 46, No. 4 Apr. 1956.

Primary Examiner—David C. Nelms
Assistant Examiner—Ricky Mack
Attorney, Agent, or Firm—Svetlana Z. Short

[57] ABSTRACT

An optical system comprising two lens elements one of which is biaspheric, the optical system is suitable for use in photographic devices such as single-use cameras having curved image planes. This optical system can operate at low F-numbers while maintaining an excellent performance.

24 Claims, 37 Drawing Sheets

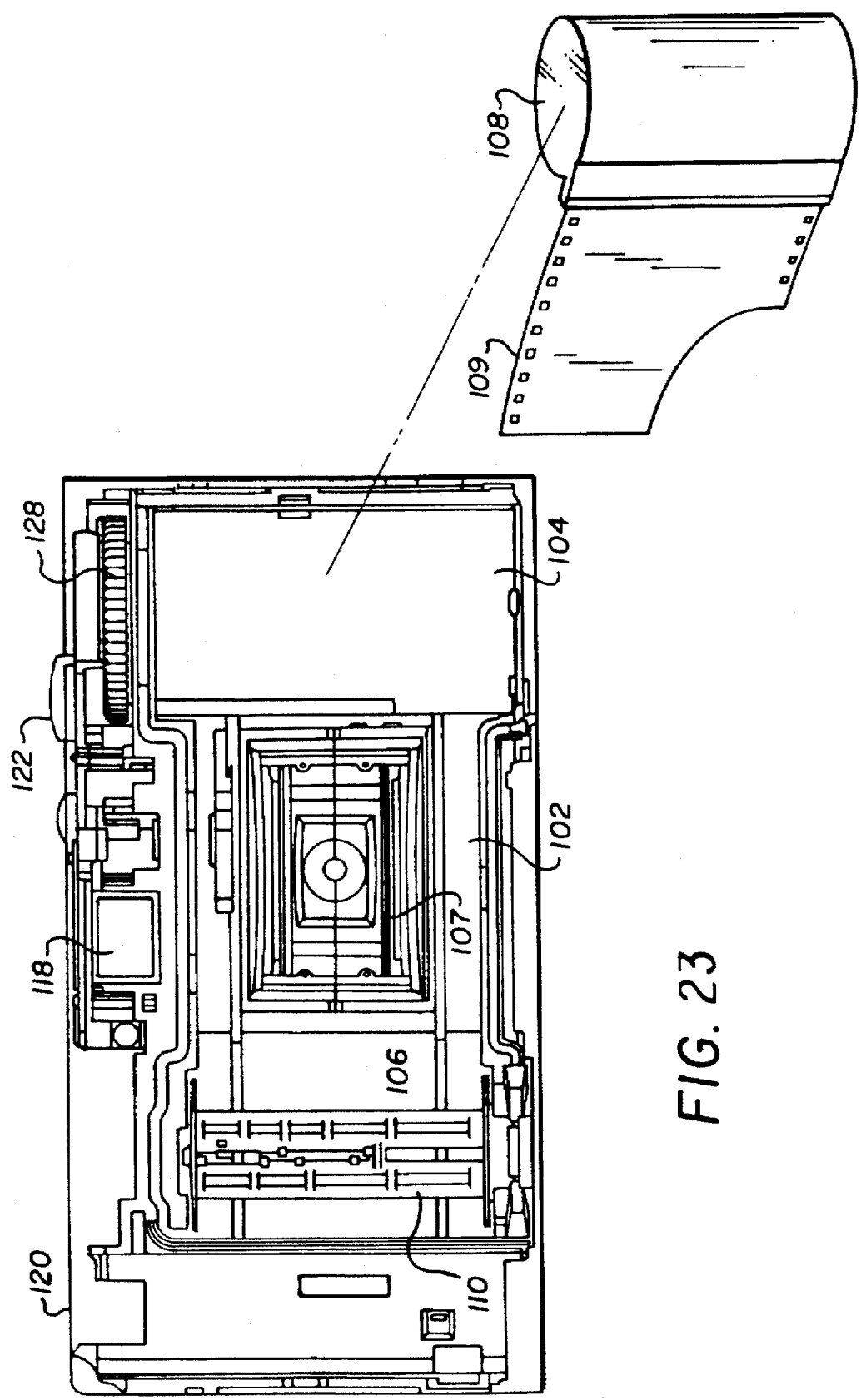

TWO ELEMENT OPTICAL SYSTEM, A CAMERA USING IT AND METHOD OF MAKING THE CAMERA

CROSS REFERENCE TO A RELATED APPLICATION

This application is related to U.S. Pat. No. 5,604,639, issued Feb. 18, 1997, entitled A TWO-ELEMENT OPTICAL SYSTEM AND CAMERA AND METHOD OF MAKING A CAMERA, filed in the names of Joseph R. Bietry and Alan E. Lewis.

BACKGROUND OF THE INVENTION

1. Field of the Invention

This invention relates to optical systems comprising two lens components suitable for use in photographic devices having curved image surfaces.

2. Description of the Prior Art

U.S. Pat. No. 3,006,248 by W. R. Linke (issued in 1961) discloses an objective lens system having a cylindrical image surface that comprises two meniscus lens elements. This lens system has a field of view of about 62 degrees and an aperture of about F/8. The disclosed lens system, "while of the symmetrical type is not completely symmetrical." This lens system has no aspheric surfaces.

Other proposals have been made for optical systems (or lens systems) including two different asymmetrically located lens elements. For example, U.S. Pat. Nos. 4,932,764 and 5,000,552 disclose a two-element lens system suitable for use in inexpensive cameras having a curved image surface, such as single-use cameras. This lens system utilizes two meniscus lens elements arranged around the aperture stop. The lens system is characterized by very good aberration correction, considering that only two lens elements are used. These lens systems have F-numbers F/8 and F/11 and accommodate a field of view of at least 62 and 75 degrees respectively, without the use of aspheric surfaces.

U.S. Pat. No. 5,067,803 also discloses a two-element lens system for use in photographic cameras. This patent also uses two meniscus lens elements arranged around a central aperture stop. The disclosed lens system utilizes a single aspheric surface on either one or both of the lens elements, but nevertheless performs at relatively slow (i.e. narrow) aperture, i.e. F/13.8.

U.S. Pat. No. 5,327,291 also discloses a two component objective lens system. The disclosed lens system utilizes a single aspheric surface on each of the two lens elements. This lens system is designed for a flat image plane (i.e. surface) and has a field of view that does not exceed 60 degrees.

The two lens element camera objectives are often designed to provide an F/number of F/11 or more. It is advantageous for camera objectives (i.e., taking lenses) to have a wide-angle, fast lens system with a superior performance. However, that is difficult to accomplish with only two lens elements. Thus, notwithstanding the variety of objective lens systems which have been previously proposed, there still exists a need for lens systems of simple construction which can be produced at low cost.

Applicant's invention addresses this need and represents a further improvement in two element lens systems for camera objectives (i.e. taking lenses).

SUMMARY OF THE INVENTION

An object of the present invention is to produce an improved two-component or two element lens system with curved image surfaces.

This and other objects of the present invention are met by an optical system, for use in a low-cost camera having an image surface curved toward the optical system, the optical system comprising only two single lens components and an aperture stop located therebetween, one of said lens components being biaspheric, the optical system having a curved image corresponding substantially (in its long dimension) to the curved image surface of the camera through a full field angle of at least 62.5 degrees and preferably 70 degrees or more.

According to a further aspect of the present invention, a method of making a single-use camera from previously used single-use camera parts comprises the steps of: (A) providing a camera body having a film cassette chamber, (B) supporting in the camera body previously used single-use camera parts including a viewfinder, a shutter mechanism, and an optical system including only two lens elements, one of said lens elements being biaspheric, each of said lens elements having an index of refraction of at least 1.45; and (C) loading an unexposed roll of fill into the fill cassette chamber of the camera body.

According to yet another aspect of the present invention, a single-use camera from previously used camera parts comprises: a camera body having a film cassette chamber, the camera body supporting previously used single-use camera parts including an optical system comprising only two lens elements, one of the lens elements being biaspheric, and a shutter located between the lens elements, the optical system being adapted for imaging on a curved film plane; a shutter mechanism, and a viewfinder; and an unexposed roll of fill mounted in the fill cassette chamber of the camera body.

With the preferred embodiments of the invention, the following and other advantages are realized.

It is an advantage of the disclosed embodiments that the lens system has a significantly improved optical performance while simultaneously being able to provide a wide angle coverage (from 0 to nearly 80 degrees) and a high numerical aperture (such as F/8 for example). More specifically, we discovered that having one biaspheric lens component in a two component lens system similar to the one described herein unexpectedly provides significantly better optical aberration correction then a similar lens system having two aspheric surfaces, where each of the aspheric surfaces corresponds to a different lens element.

Another advantage of the disclosed embodiments is that a photographic lens system is extremely simple in construction, is easy to assemble, and yet is capable of taking enlargement quality photographs or panoramic photographs.

Yet another advantage of the disclosed embodiments is that it provides a single-use camera made from previously used single-use camera parts.

Still another advantage of the present invention is that it provides a method of making a single-use camera from previously used camera parts.

BRIEF DESCRIPTION OF THE DRAWINGS

Several embodiments of the present invention with now be described, by way of example, with reference to the accompanying drawings, in which:

FIG. 23 is a partial rear view of the single-use camera of FIG. 22 showing the reloading of a film cassette.

DETAILED DESCRIPTION OF THE INVENTION

The following embodiments of the present invention consist of an optical system (also called a lens system) 10a–10i for an objective or taking lens 112 imaging an object on a cylindrical image surface coincident with a photographic film frame F of the film 109 for use in an inexpensive camera such as single lens camera 100. The camera 100 includes other known structures or means for advancing the film and a shutter for enabling an exposure of the fill frame F to capture an image of the scene to be photographed. The optical system ( or the lens system) $10_k$ comprises two lens components $12_k$ and $14_k$, and a shutter $S_k$, disposed between the two lens components at the aperture stop location. The subscript "k" identifies the $k^{th}$ embodiment of the present invention. The Photonics Dictionary (1981) defines a shutter as "a mechanical or automatic device used in a camera to control the time in which a light sensitive material is exposed to radiation." This device is usually an aperture hole and a shutter blade which covers and uncovers the aperture. With this type of shutter, if the shutter is located close to the aperture stop location, the exposure on the film is held uniform.

The front lens component $12_k$ of the optical system $10_k$ is a meniscus lens element $E_{1k}$ having a concave surface oriented towards the aperture stop (shutter). The rear lens component $14_k$ is a meniscus lens element $E_{2k}$. It also has a concave surface oriented towards the aperture stop. The front lens component $12_k$ may or may not have a longer focal length than the rear lens component $14_k$. Lens system $10_k$ deviates from a perfectly symmetrical type in that the two lens components $12_k$ and $14_k$ are not identical. More specifically, the focal lengths of the two lens components are significantly different from one another and at least one of the two lens components is biaspheric. If only one biaspheric lens component is used, its focal length is typically (but not always) greater than that of the other lens component. The aperture stop $AS_k$ is located between the two lens elements or on one of the internal lens surfaces.

Figure 1:
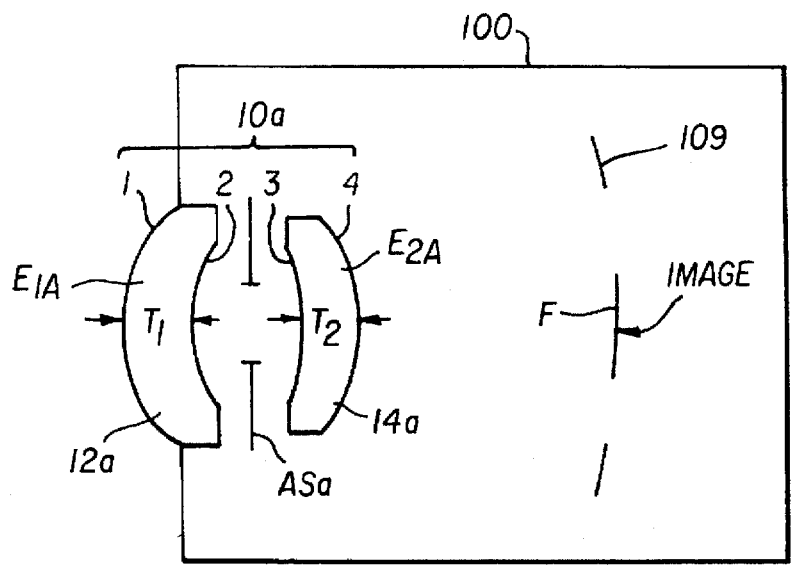
FIG. 1 shows the outline of the lens system 10a of a first preferred embodiment.

The first embodiment is illustrated in FIG. 1. Its specific parameters are provided in Table 1.

In the first embodiment, the focal length of optical system 10a is 21.63 mm, the F-number is 8 and the full field of view is 77.4 degrees. Both of lens elements $E_{1a}$ and $E_{2a}$ of the first embodiment are positive and are made from the same type of plastic. The front lens element $E_{1a}$ is biaspheric and a second lens element $E_{2a}$ has no aspheric surfaces. The front lens element $E_{1a}$ is biaspheric because both the front surface (surface 1) and the rear surface of the lens element $E_{1a}$ are aspheric.

We discovered that having one biaspheric lens component in a two component lens system similar to the one described herein unexpectedly provides significantly better optical aberration correction when compared to the lens system having two aspheric surfaces, where each of the aspheric surfaces corresponds to a different lens element.

More specifically, aspheric surfaces with about 290 waves and 114 waves departure from the best fit sphere, are used on the first and the second surfaces, respectively, of the biaspheric lens element to control the image quality. The best fit sphere in this case is a sphere that intersects the asphere on axis and at 100% of clear aperture. The greatest deviation of this sphere from the asphere at any point within the clear aperture does not exceed 290 waves (where λ=632.8 nm). The use of the aspheric surface and the particular bendings of the lens components (or lens elements) provides the F/8 lens system with the performance equivalent to that of a much slower two element lens system.

It is preferred that the thickness T of the lens elements be 1<T<3 mm. In this embodiment the lens elements $E_{1a}$ and $E_{2a}$ have the thickness of 2.13 mm and 1.78 mm respectively. The focal length $f_{1a}$ of the first lens component 12a is 70.42 mm and the focal length $f_{2a}$ of the second lens component 14a is 24.47 mm. The ratio of $f_{1a}/f_{2a}$=2.88.

The image surface of the lens system 10a is cylindrical with a sag in the long dimension of the image. As a result of the increased numerical aperture, best results were achieved when the cylindrical radius of curvature was in the range of |90|mm to |120|mm due to considerations of geometric depth of focus as well as natural Petzval curvature of the lens system. In this first embodiment, as well as in some of the other embodiments of the present invention this cylindrical radius of curvature is −90 min.

The aperture stop ASa is located in the airspaced formed between the first lens element $E_{1a}$ and the second lens element $E_{2a}$.

The ratio of the total length TL of the lens system (measuring from the front-most surface's vertex to the image plane) to the effective focal length (EFL) of the lens system is 1.21.

The aberration curves illustrating the performance of the optical system of the first preferred embodiment are provided in FIGS. 2A–2F.

Figure 2A:
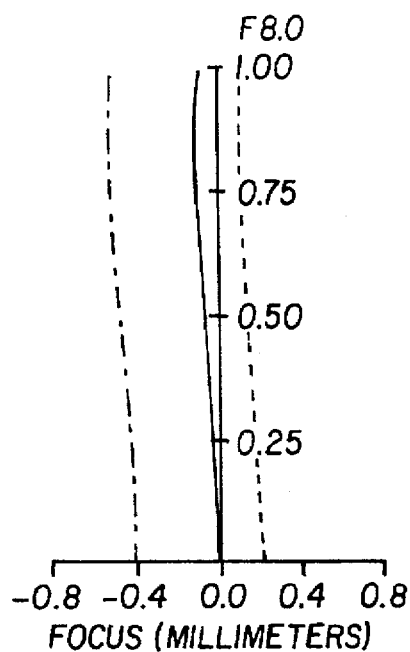
FIGS. 2A–2F provide aberration curves for the lens system 10a illustrated in FIG. 1.

More specifically, FIG. 2A illustrates longitudinal spherical aberration. The vertical axis depicts relative aperture. The horizontal axis depicts the focus position. The primary wavelength is 546.1 nm.

Figure 2B:
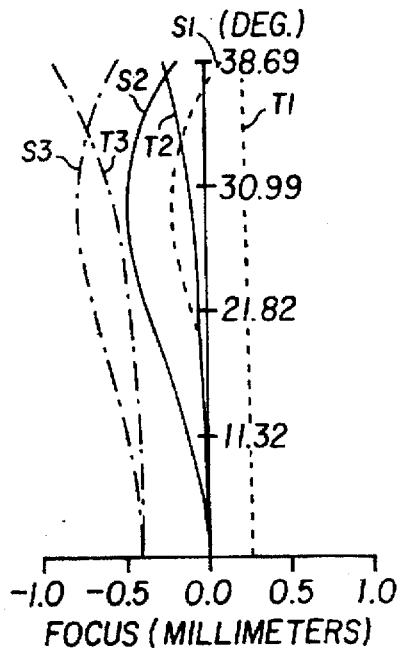

FIG. 2B illustrates astigmatism in the lens system. The vertical axis is the half field angle in degrees. The horizontal axis is focus position.

The "zero focus" on the horizontal axis of the longitudinal spherical aberration (LSA) and astigmatism plots (FIGS. 2A and 2B) is shown referenced to the paraxial focus at 546.1 nm. Since the image is cylindrically curved, we choose to reference the vertical axis of the astigmatism plot to an average curvature of the image format. For simplicity, we choose the best fit radius to the corner of the image format for our reference. The best fit radius is the radius that intersects the cylinder image format in the center and at the corner. This best fit radius is found by multiplying the cylinder film radius by a factor which is dependent on the shape of the image format (i.e. the ratio of the two dimensions of the format). For this first embodiment, the shape of the image format (16.7×30 mm) gives us a multiplying factor of 1.3099 for the best fit radius to the corner of the format. Using this with the −90 mm cylinder radius, and the fact that the cylinder radius is along the long dimension of the format, we get a best fit corner radius of −117.89 mm. This is the best image radius to use for analysis since it is easy to define and is an average radius over the cylindrical format. More specifically, the multiplying factor for the best fit corner radius to a cylindrical image format may be calculated using the following procedure.

Calculate the angle $\theta$ between the horizontal and the diagonal of the image format. Here, $\theta$=arctan (16.7/30) or 29.103 degrees. The multiplying factor that gives the approximate best fit corner radius for the cylinder is $1/[Cos^2(\theta)]$, which in this case is 1.3099.

Use of this average image radius (best fit corner radius) eliminates much of the difficulty in analyzing image quality over a cylindrical format. The curvature of the cylinder varies between the vertical (where the image is flat) and the longer horizontal dimension where it is curved the most, and it is in the corner where the maximum field is imaged. All of the aberrations shown which are dependent on field are referenced to the best fit radius described.

Figure 2C:
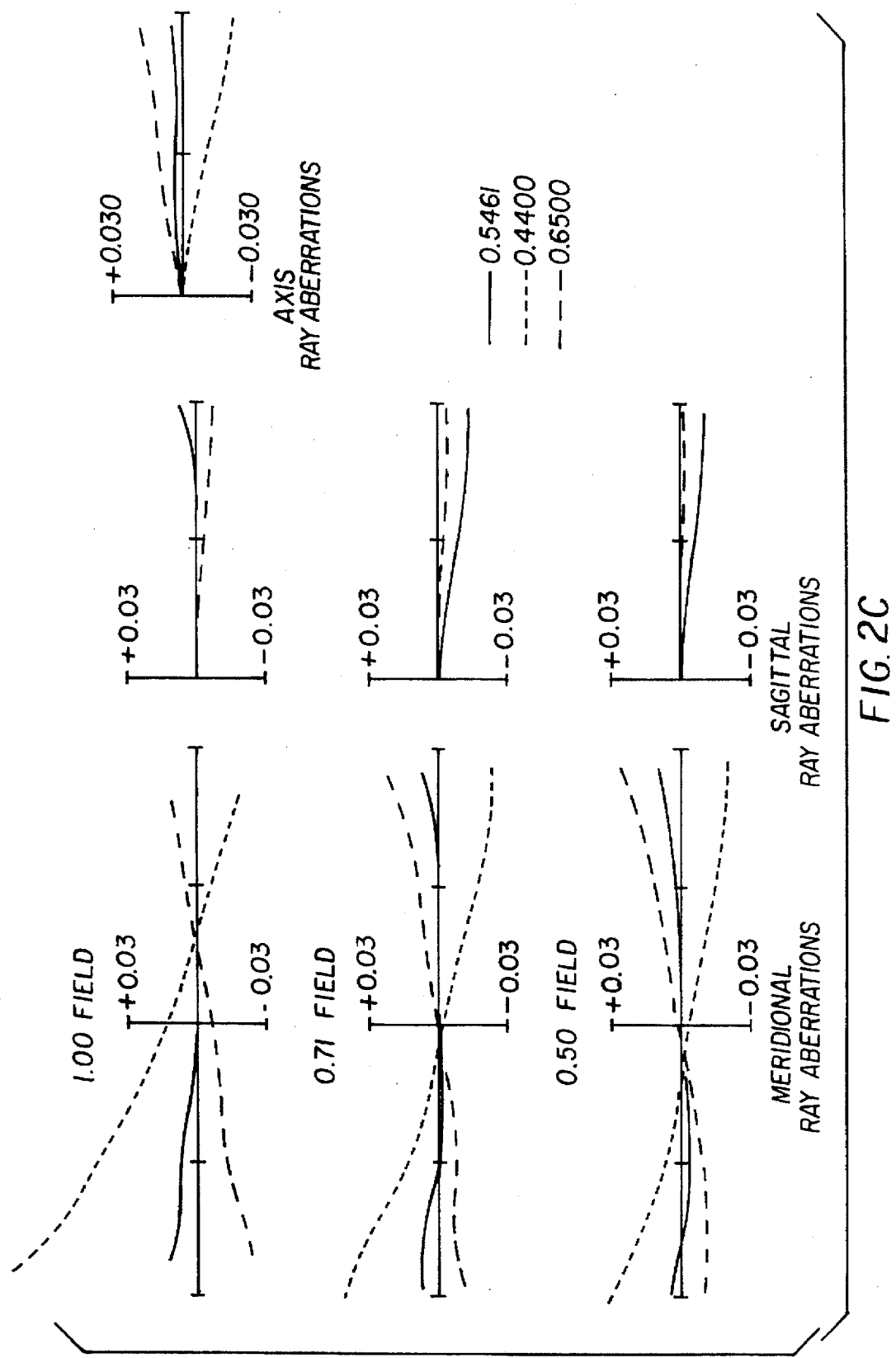

FIG. 2C depicts ray intercept curves for the first embodiment at several relative field positions (axis, 0.5, 0.7, and full field). The vertical axis depicts ray aberrations in millimeters. The horizontal axis is relative pupil coordinate, the edges being ±full pupil (i.e. ±1.0 pupil).

Figure 2D:
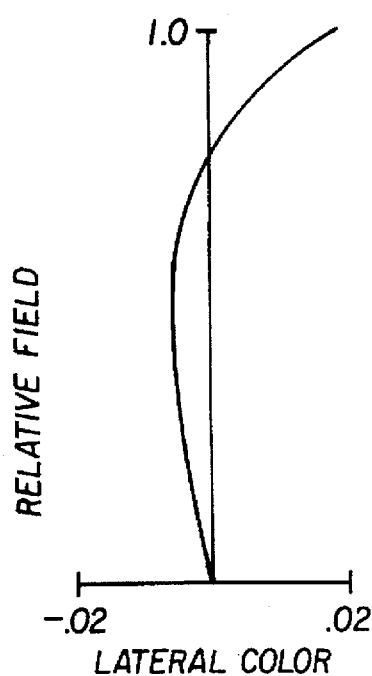

FIG. 2D depicts the lateral color measured in millimeters (440 nm to 650 nm) across the field.

Figure 2E:
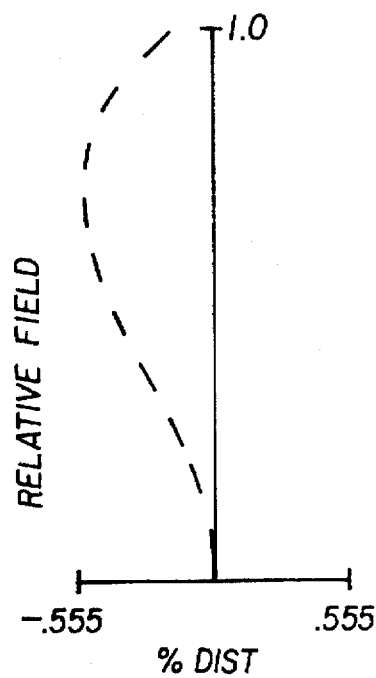

FIG. 2E depicts the distortion at the primary wavelength (546.1 nm) across the field. The distortion definition used here is:

[(principal real ray height on best fit image curve)—(paraxial principal ray height on the plane which is tangent to the best fit image curve on axis (i.e. at the vertex of this curve))]÷[paraxial ray height on the plane which is tangent to the best fit image curve on axis].

For calculating the percent distortion, we merely multiply this quantity by 100. Note that different optical design and analysis programs define distortion on curved images differently, but this definition is one of the several definitions commonly used.

Figure 2F:
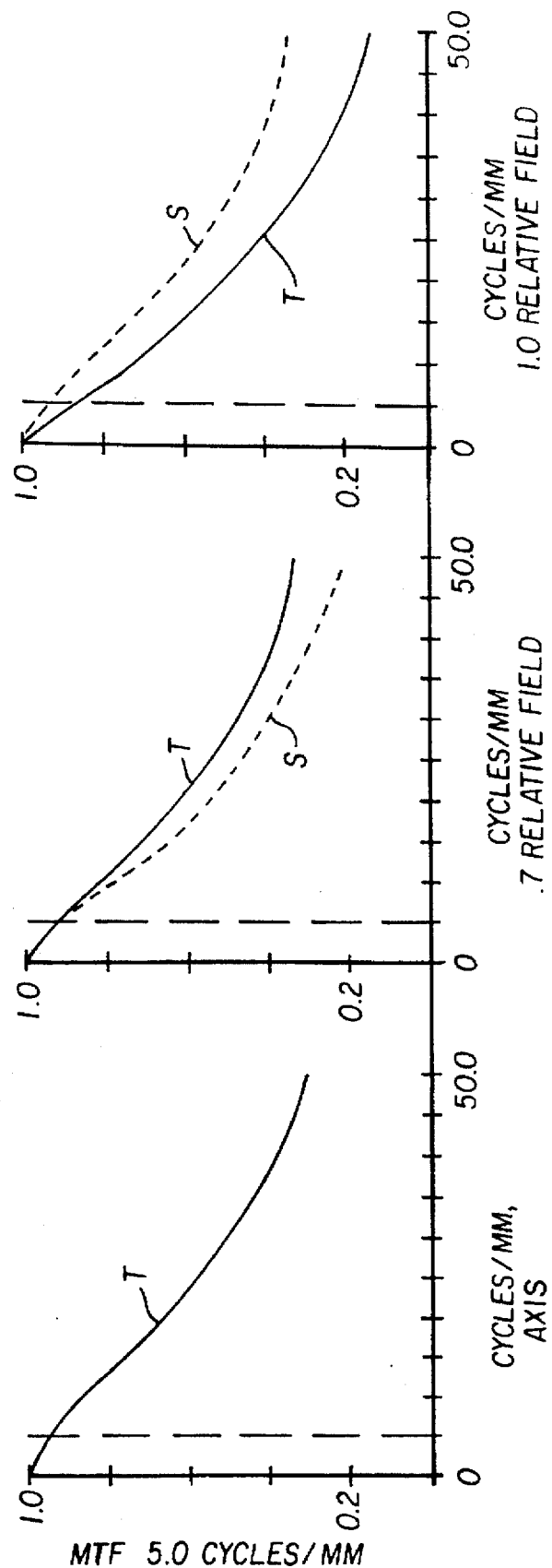

FIG. 2F depicts heterochromatic through frequency MTF at three field points: axis, 0.7 relative field, and full field. Wavelengths used were 650 nm, 546.1 nm, and 440 nm with respective chromatic weights of 35, 50, and 15.

Figure 3:
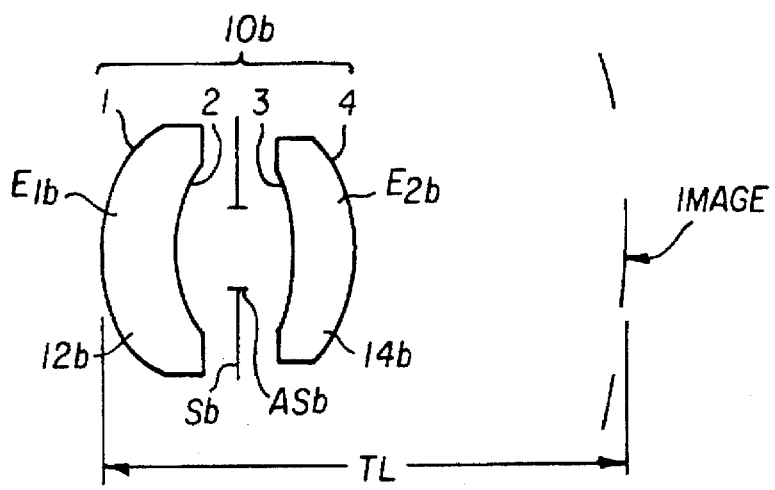
FIG. 3 shows the outline of the lens system 10b of a second preferred embodiment.

The second preferred embodiment is very similar to the first. It is illustrated in FIG. 3. The optical system 10b of the second embodiment is constructed from two lens components 12b and 14b and an optical shutter Sb, which is located between those lens components at the location of the aperture stop ASb.

The front lens component 12b is a meniscus plastic lens element $E_{1b}$. The rear lens component 14b is a meniscus plastic lens element $E_{2b}$. The front lens element $E_{1b}$ is biaspheric and a second lens element $E_{2b}$ has no aspheric surfaces. The front lens component 12b has a longer focal length than the rear lens component 14b. In the second embodiment, the focal length of optical system 10b is 21.63 mm, the F-number is 8 and the full field of view is 76.8 degrees. Both of lens components 12b and 14b are made from the same type of plastic. The ratio of the total length TL of the lens system (measuring from the front-most surface's vertex to the image plane) to the effective focal length (EFL) of the lens system is 1.21.

In this, second embodiment the lens components 12b and 14b have the thickness of 2.21 mm and 1.81 mm respectively. The focal length $f_{1b}$ of the first lens component 12b is 79.55 mm and the focal length $f_{2b}$ of the second lens component 14b is 23.36 mm. The ratio of $f_{1b}/f_{2b}$=3.41. The image surface of the lens system 10b is cylindrical with a sag in the long dimension of the image. In this embodiment, this cylindrical radius of curvature is −120 mm.

Aspheric surfaces with about 312 waves and 120 waves departure from the best fit sphere, are used on the first and the second surfaces, respectively, of the biaspheric lens element to control the image quality.

The aberration curves illustrating the performance of the optical system of the second embodiment are provided in FIG. 4A–4F.

Figure 4D:
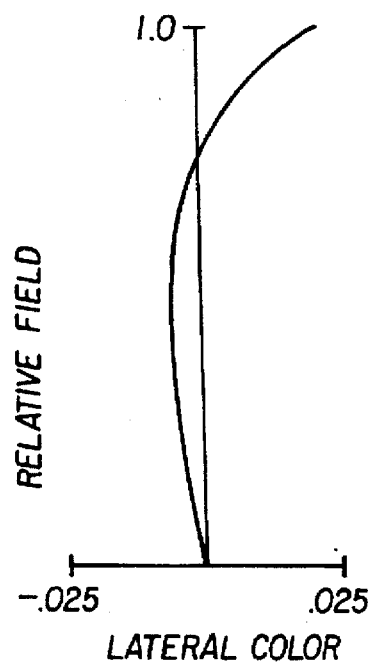
FIGS. 4A–4F provide aberration curves for the lens system 10b illustrated in FIG. 3.
Figure 4E:
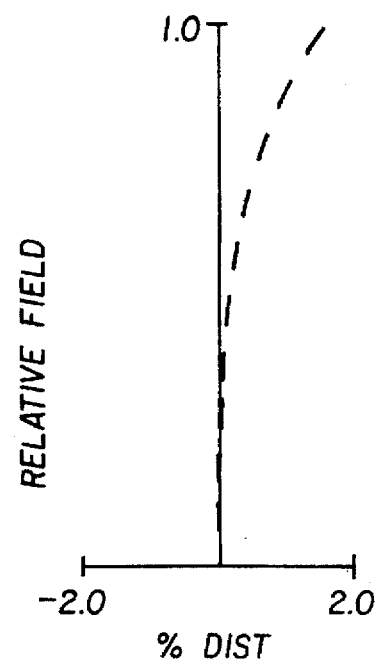
Figure 4A:
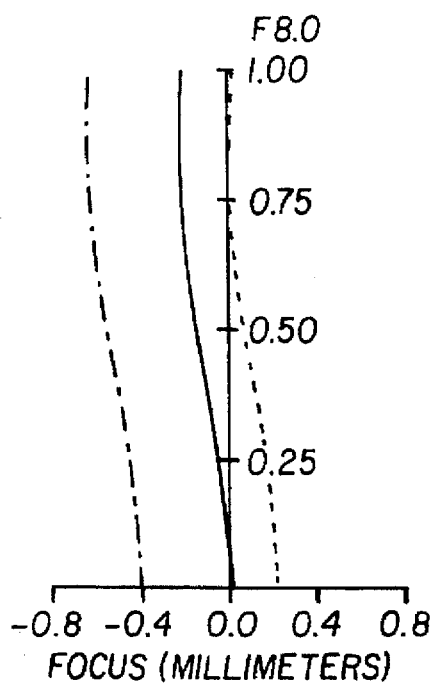

More specifically, FIG. 4A illustrates longitudinal spherical aberration. The vertical axis depicts relative aperture. The horizontal axis depicts the focus position. The primary wavelength is 546.1 nm.

Figure 4B:
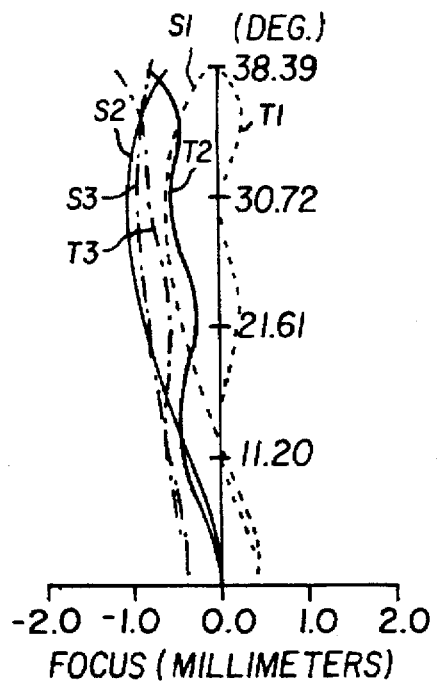

FIG. 4B illustrates astigmatism in the lens system. The vertical axis is the half field angle in degrees. The horizontal axis is focus position.

The "zero focus" on the horizontal axis of the longitudinal spherical aberration (LSA) and astigmatism plots (FIGS. 4A and 4B) is shown referenced to the paraxial focus at 546.1 nm. Since the image is cylindrically curved, we choose to reference the vertical axis of the astigmatism plot to an average curvature of the image format. For simplicity, we again choose the best fit radius to the corner of the image format for our reference. For this second embodiment, the shape of the image format (16.7×30 mm) gives us a multiplying factor of 1.3099 for the best fit radius to the corner of the format. Using this with the −120 mm cylinder radius, we get a best fit corner radius of − 157.19 mm. All of the aberrations shown which are dependent on field are referenced to this best fit radius.

Figure 4C:
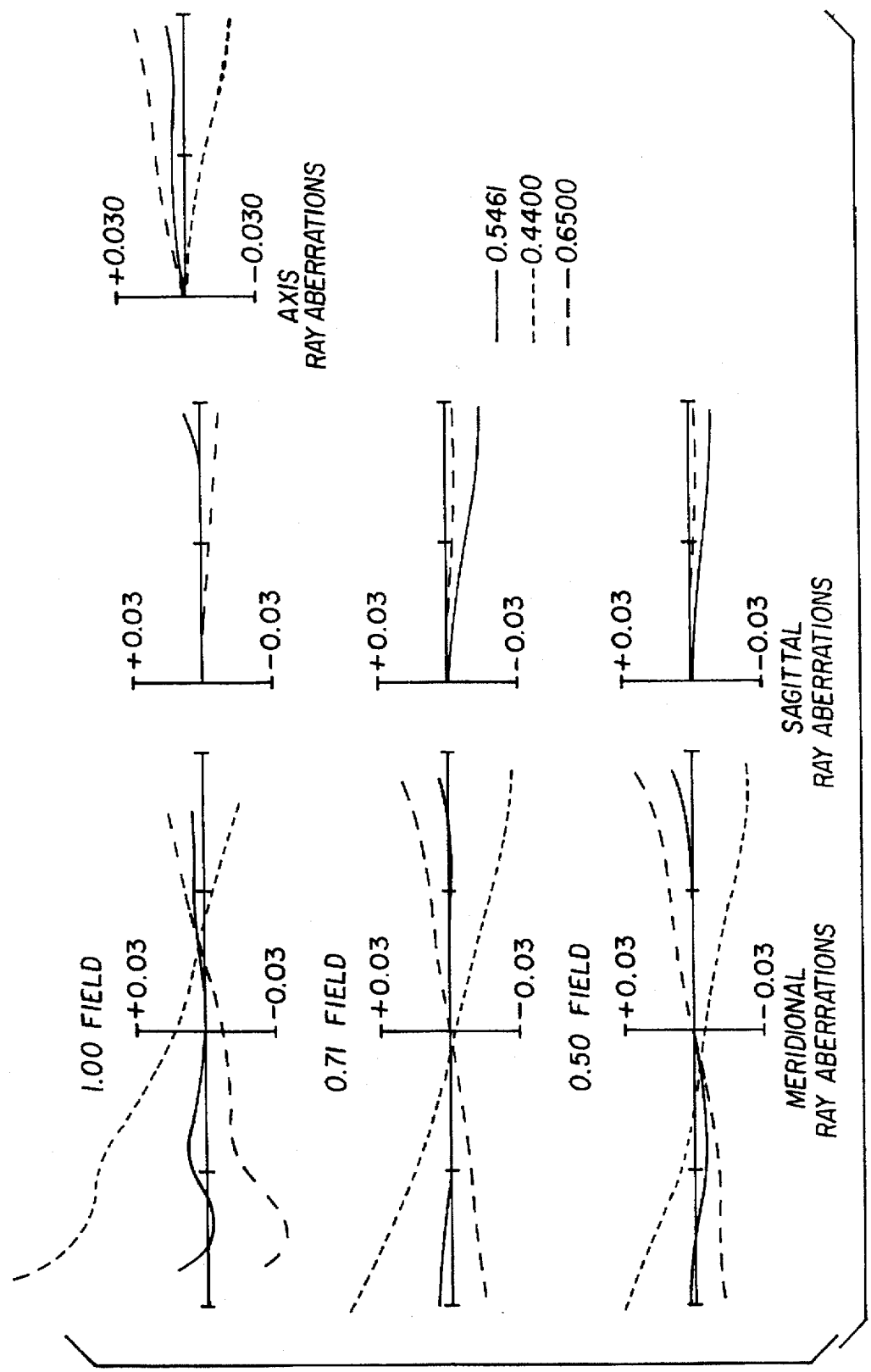

FIG. 4C depicts ray intercept curves for the second embodiment at several relative field positions (i.e. axis, 0.5, 0.7, and full field). The vertical axis depicts ray aberrations in millimeters. The horizontal axis is relative pupil coordinate, the edges being ±full pupil (i.e. ±1.0 pupil).

FIG. 4D depicts the lateral color (440 nm to 650 nm) across the field.

FIG. 4E depicts the distortion at the primary wavelength (546.1 nm) across the field.

Figure 4F:
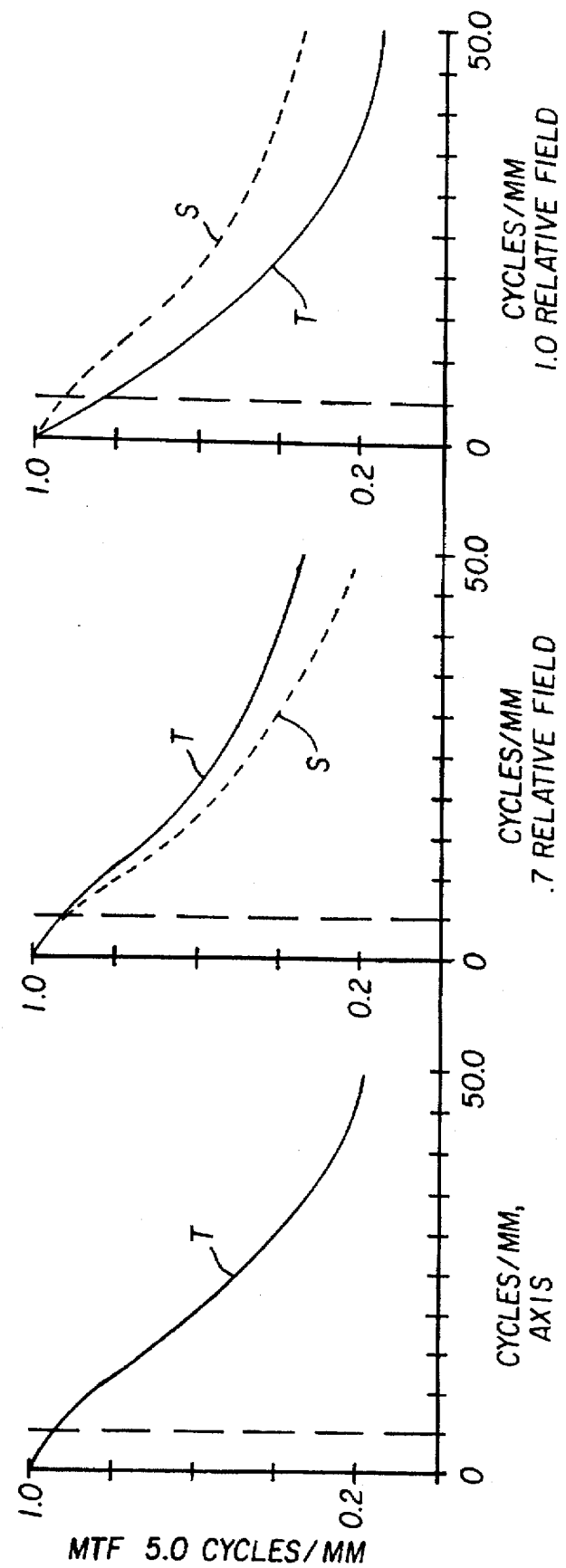

FIG. 4F depicts heterochromatic through frequency MTF at three field points: axis, 0.7 relative field, and full field. Wavelengths used were 650 nm, 546.1 nm, and 440 nm with respective chromatic weights of 35, 50, and 15.

Figure 5:
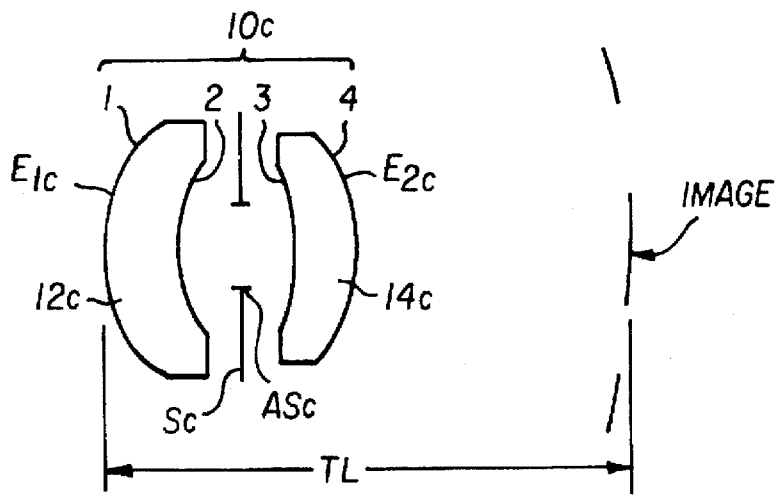
FIG. 5 shows the outline of the lens system 10c of a third preferred embodiment.

The third preferred embodiment is very similar to the first and the second preferred embodiments. It is illustrated in FIG. 5. The front lens component 12c of the optical system 10c is a meniscus plastic lens element $E_{1c}$. The rear lens component 14c is a meniscus plastic lens element $E_{2c}$. The front lens component 12c is biaspheric. The aperture stop ASc is located in the airspaced formed between the first lens element $E_{1c}$ and the second lens element $E_{2c}$. In this third embodiment, the focal length of optical system 10c is 24 mm, the F-number is 8 and the full field of view is 71.8 degrees. Both of lens elements $E_{1c}$ and $E_{2c}$ of the third embodiment are positive and are made from the same type of plastic.

In this, third embodiment the lens components 12c and 14c have the thickness of 1.92 mm and 1.70 mm respectively. The focal length $f_{1b}$ of the first lens component 12c is 62.9 mm and the focal length $f_{2b}$ of the second lens component 14c is 29.91 mm. The ratio of $f_{1c}/f_{2c}$=2.10.

The image surface of the lens system 10c is cylindrical with a sag in the long dimension of the image. In this embodiment, this cylindrical radius of curvature is −90 mm.

Aspheric surfaces with about 209 waves and 94 waves departure from the best fit sphere, are used on the first and the second surfaces, respectively, of the biaspheric lens element to control the image quality.

The ratio of the total length TL of the lens system (measuring from the front-most surface's vertex to the image plane) to the effective focal length (EFL) of the lens system is 1.17.

The aberration curves illustrating the performance of the optical system of the third preferred embodiment are provided in FIGS. 6A–6F.

Figure 6A:
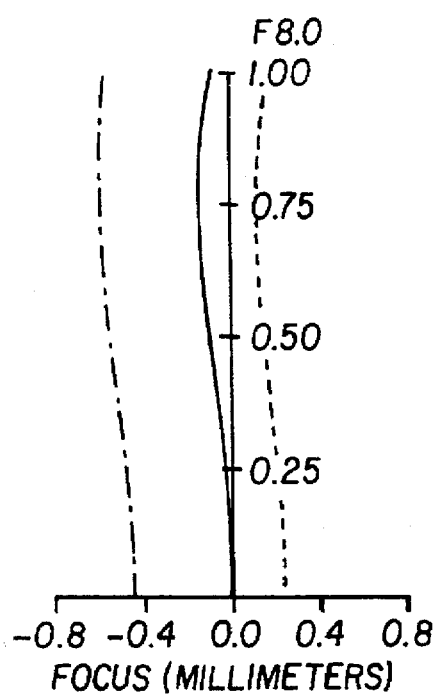
FIGS. 6A–6F provide aberration curves for the lens system 10c illustrated in FIG. 5.

More specifically, FIG. 6A illustrates longitudinal spherical aberration. The vertical axis depicts relative aperture. The horizontal axis depicts the focus position. The primary wavelength is 546.1 nm.

Figure 6B:
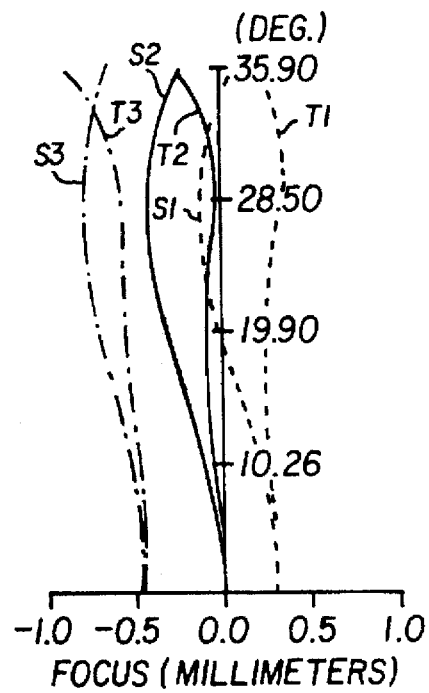

FIG. 6B illustrates astigmatism in the lens system. The vertical axis is the half field angle in degrees. The horizontal axis is focus position.

The "zero focus" on the horizontal axis of the longitudinal spherical aberration (LSA) and astigmatism plots (FIGS. 6A and 6B) is shown referenced to the paraxial focus at 546.1 nm. Since the image is cylindrically curved, we choose to reference the vertical axis of the astigmatism plot to an average curvature of the image format. For simplicity, we again choose the best fit radius to the corner of the image format for our reference. For this third embodiment, the shape of the image format (16.7×30 mm) gives us a multiplying factor of 1.3099 for the best fit radius to the corner of the format. Using this with the −90 mm cylinder radius, we get a best fit corner radius of −117.89 mm. All of the aberrations shown which are dependent on field are referenced to this best fit radius.

Figure 6C:
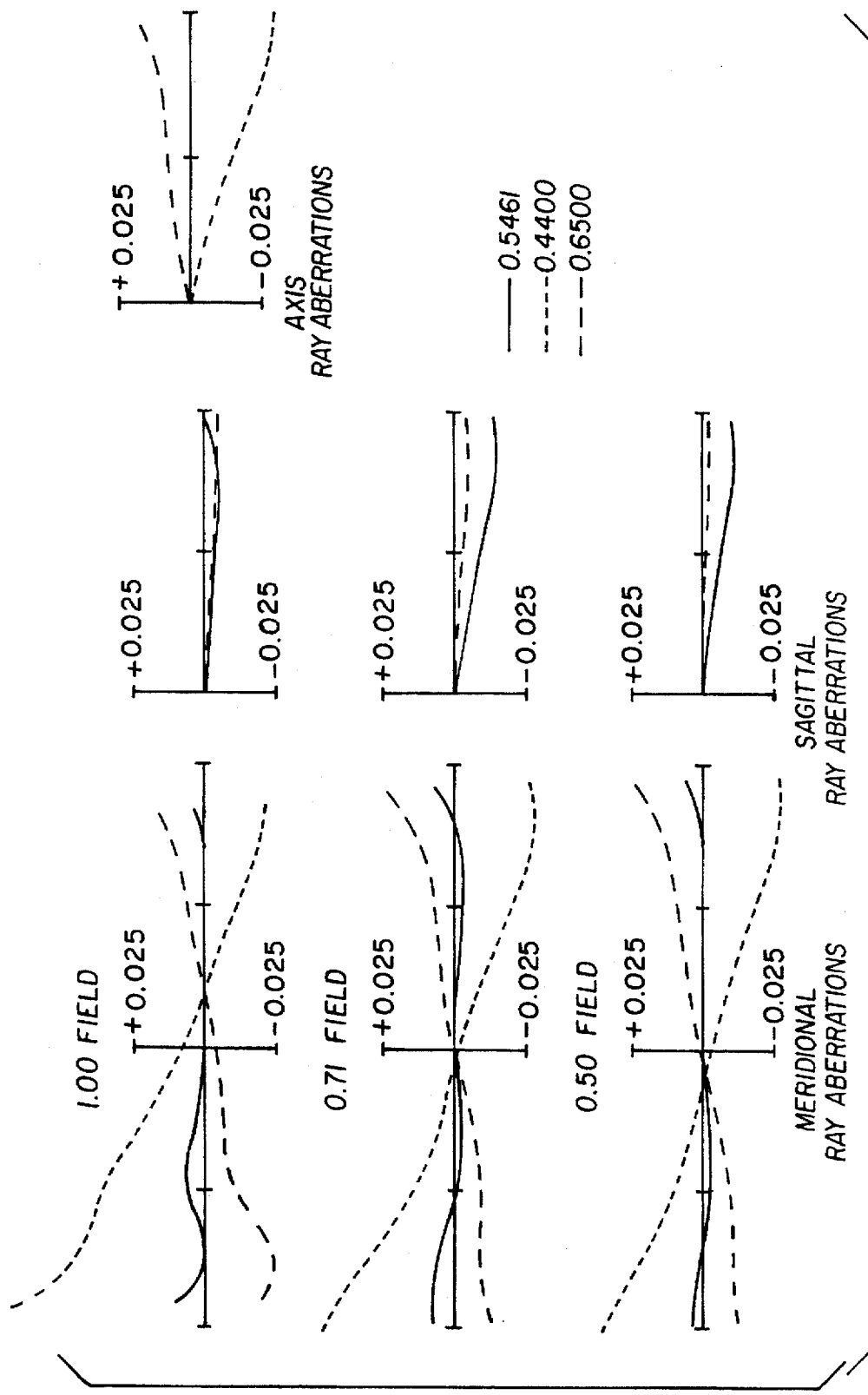

FIG. 6C depicts ray intercept curves for the third embodiment at several relative field positions (i.e. axis, 0.5, 0.7, and full field). The vertical axis depicts ray aberrations in millimeters. The horizontal axis is relative pupil coordinate, the edges being ±full pupil (i.e. ±1.0 pupil).

Figure 6D:
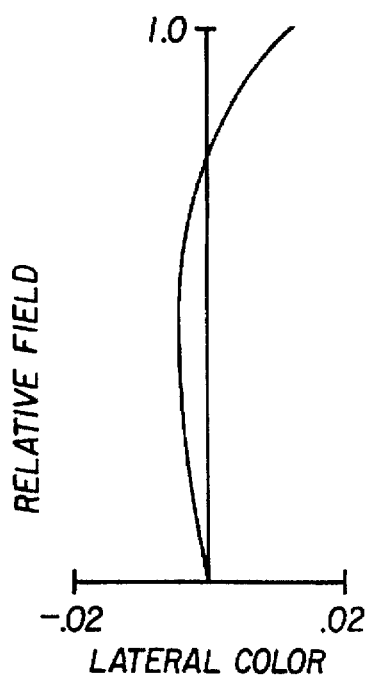

FIG. 6D depicts the lateral color (440 nm to 650 nm) across the field.

Figure 6E:
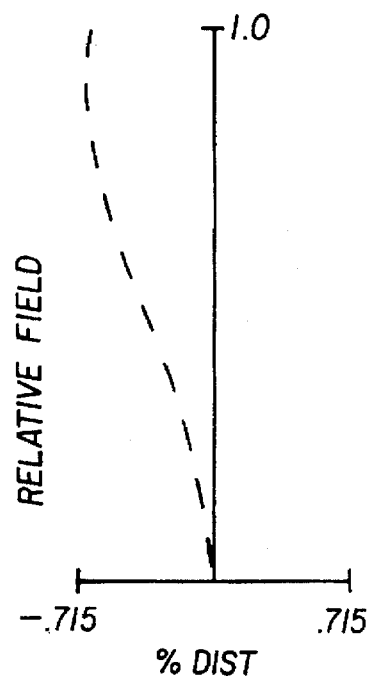

FIG. 6E depicts the distortion at the primary wavelength (546.1 nm) across the field.

Figure 6F:
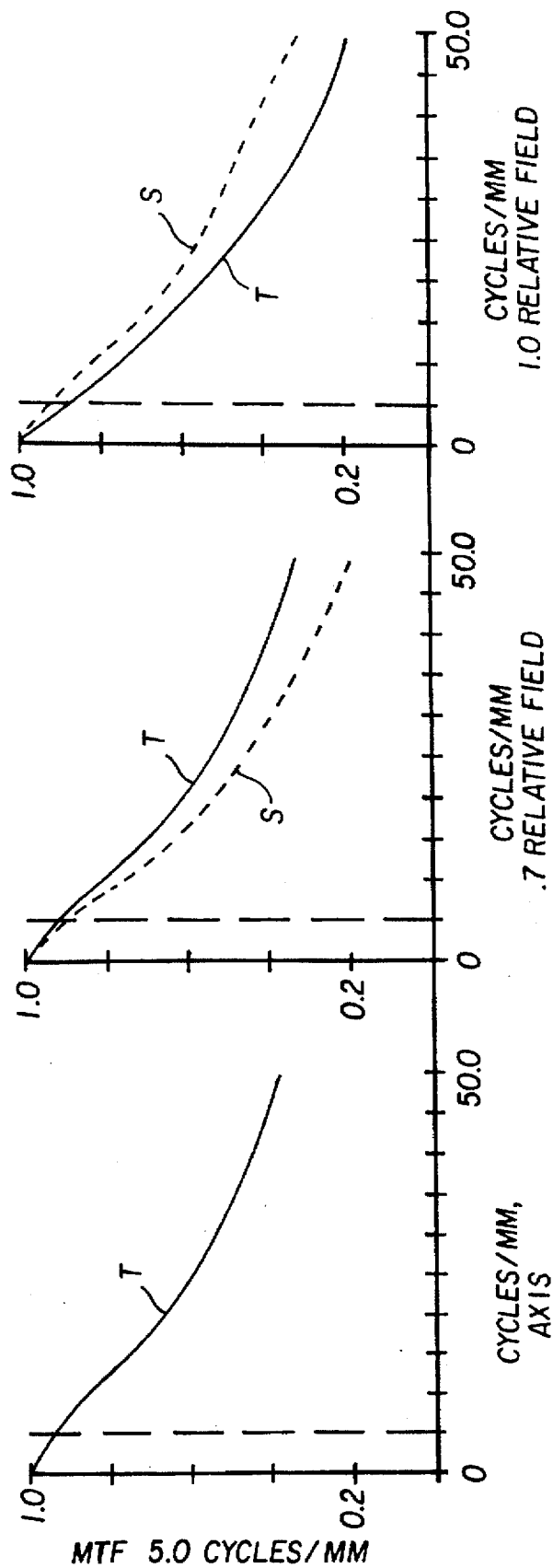

FIG. 6F depicts heterochromatic through frequency MTF at three field points: axis, 0.7 relative field, and full field. Wavelengths used were 650 nm, 546.1 nm, and 440 nm with respective chromatic weights of 35, 50, and 15.

Figure 7:
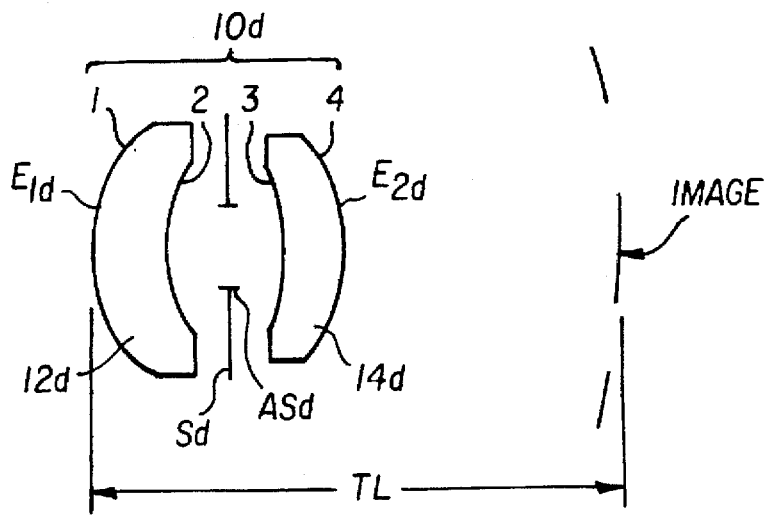
FIG. 7 shows the outline of the lens system 10d of a fourth preferred embodiment.

The fourth preferred embodiment is illustrated in FIG. 7. The optical system 10d of the fourth embodiment is constructed from two lens components 12d and 14d. The front lens component 12d is a meniscus plastic lens element $E_{1d}$. The rear lens component 14d is a meniscus plastic lens element $E_{2d}$. The front lens element $E_{1d}$ is biaspheric and a second lens element $E_{2d}$ has no aspheric surfaces. The front lens component 12d has a longer focal length than the rear lens component 14d. In the fourth embodiment, the focal length of optical system 10d is 24 mm, the F-number is 8 and the full field of view is 71 degrees. Both of lens components 12d and 14d are made from the same type of plastic.

In this fourth embodiment the lens components 12d and 14d have the thickness of 1.97 mm and 1.72 mm respectively. The focal length $f_{1d}$ of the first lens component 12d is 64.82 mm and the focal length $f_{2d}$ of the second lens component 14d is 29.25 mm. The ratio of $f_{1d}/f_{2d}$=2.22. The image surface of the lens system 10d is cylindrical with a sag in the long dimension of the image. In this embodiment, this cylindrical radius of curvature is −120 mm.

Aspheric surfaces with about 221 waves and 100 waves departure from the best fit sphere, are used on the first and the second surfaces, respectively, of the biaspheric lens element to control the image quality.

The ratio of the total length TL of the lens system (measuring from the front-most surface's vertex to the image plane) to the effective focal length (EFL) of the lens system is 1.17.

The aberration curves illustrating the performance of the optical system of the fourth embodiment are provided in FIG. 8A–8F.

Figure 8D:
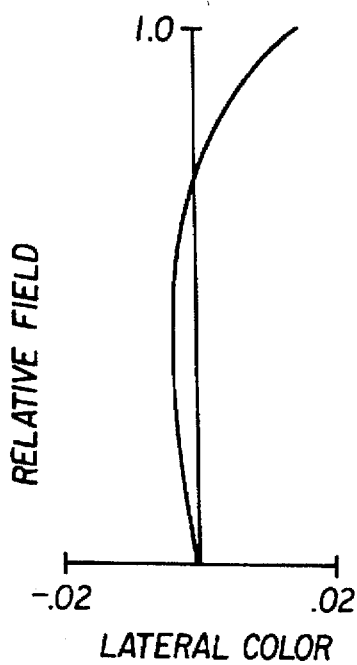
FIGS. 8A–8F provide aberration curves for the lens system 10d illustrated in FIG. 7.
Figure 8E:
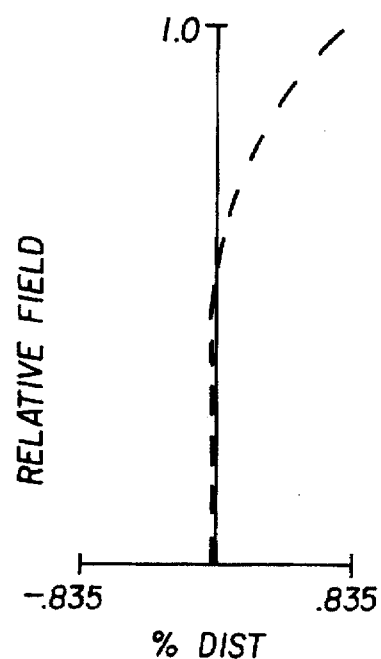
Figure 8A:
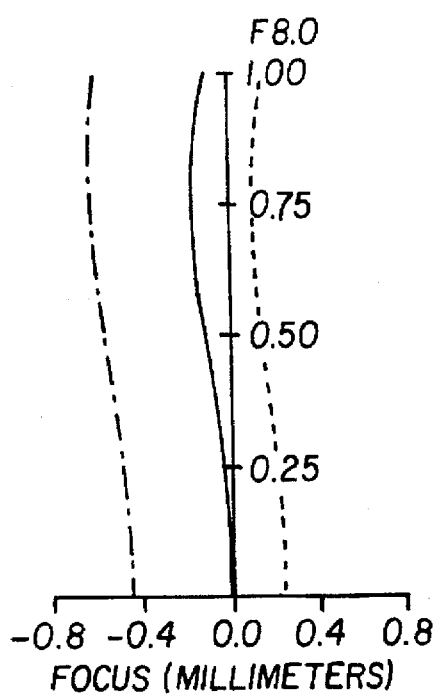

More specifically, FIG. 8A illustrates longitudinal spherical aberration. The vertical axis depicts relative aperture. The horizontal axis depicts the focus position. The primary wavelength is 546.1 nm.

Figure 8B:
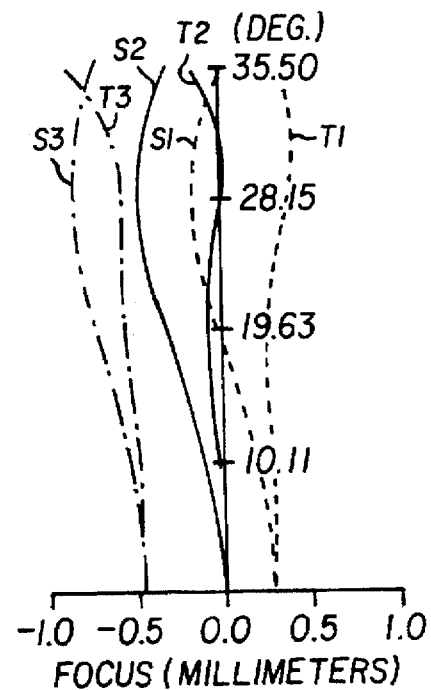

FIG. 8B illustrates astigmatism in the lens system. The vertical axis is the half field angle in degrees. The horizontal axis is focus position.

The "zero focus" on the horizontal axis of the longitudinal spherical aberration (LSA) and astigmatism plots (FIGS. 8A and 8B) is shown referenced to the paraxial focus at 546.1 nm. Since the image is cylindrically curved, we choose to reference the vertical axis of the astigmatism plot to an average curvature of the image format. For simplicity, we again choose the best fit radius to the corner of the image format for our reference. For this fourth embodiment, the shape of the image format (16.7×30 mm) gives us a multiplying factor of 1.3099 for the best fit radius to the corner of the format. Using this with the −120 mm cylinder radius, we get a best fit corner radius of −157.19 mm. All of the aberrations shown which are dependent on field are referenced to this best fit radius.

Figure 8C:
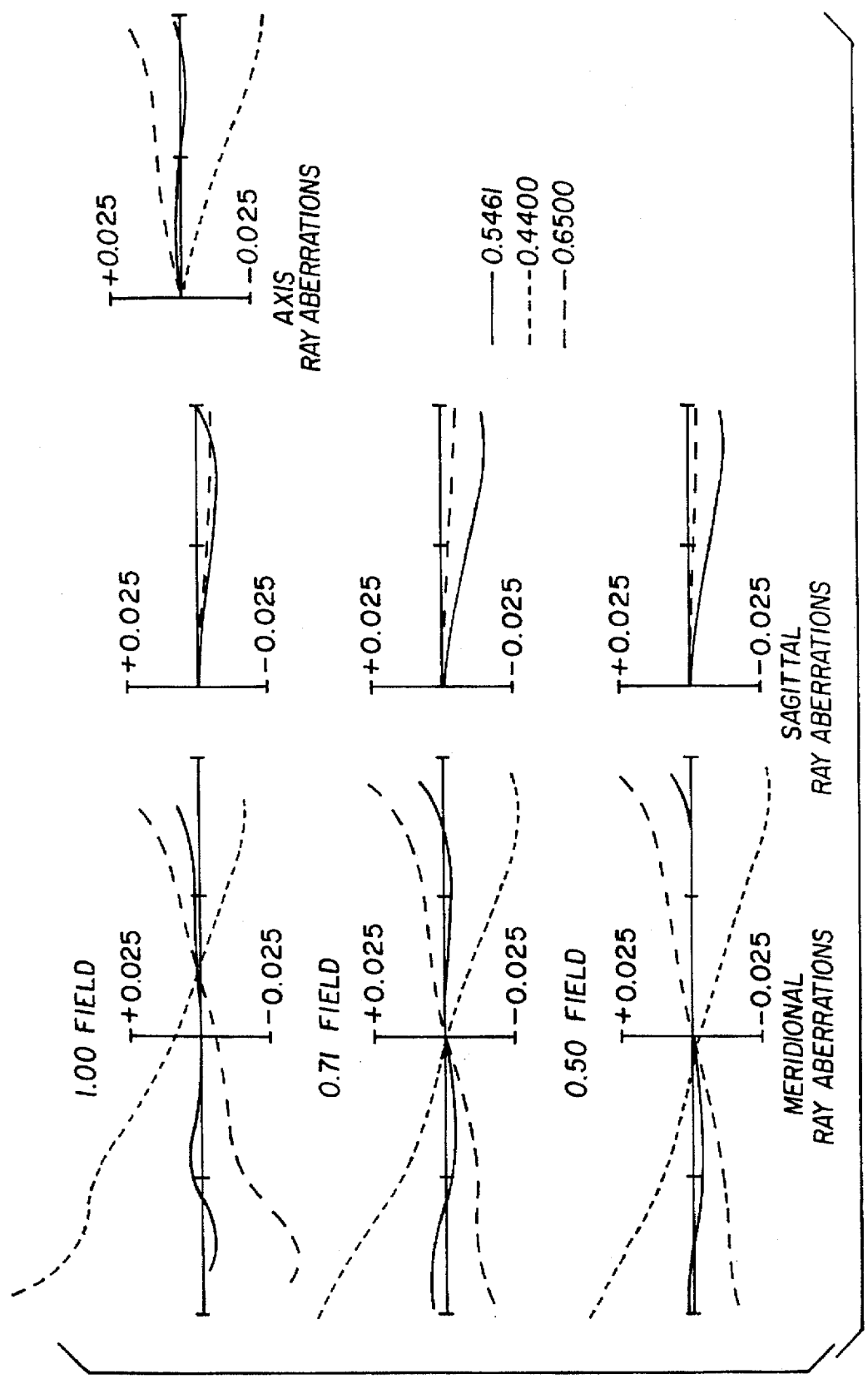

FIG. 8C depicts ray intercept curves for the fourth embodiment at several relative field positions (i.e. axis, 0.5, 0.7, and full field). The vertical axis depicts ray aberrations in millimeters. The horizontal axis is relative pupil coordinate, the edges being ±full pupil (i.e. ±1.0 pupil).

FIG. 8D depicts the lateral color (440 nm to 650 nm) across the field.

FIG. 8E depicts the distortion at the primary wavelength (546.1 nm) across the field.

Figure 8F:
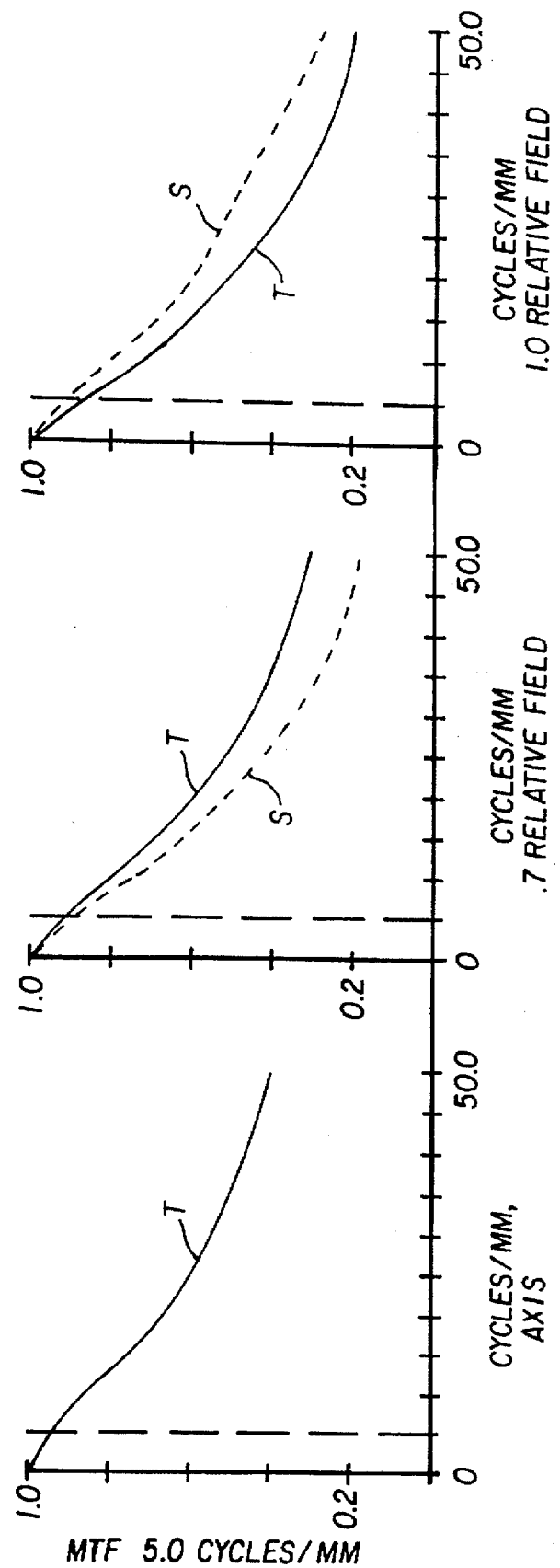

FIG. 8F depicts heterochromatic through frequency MTF at three field points: axis, 0.7 relative field, and full field. Wavelengths used were 650 nm, 546.1 nm, and 440 nm to with respective chromatic weights of 35, 50, and 15.

Figure 9:
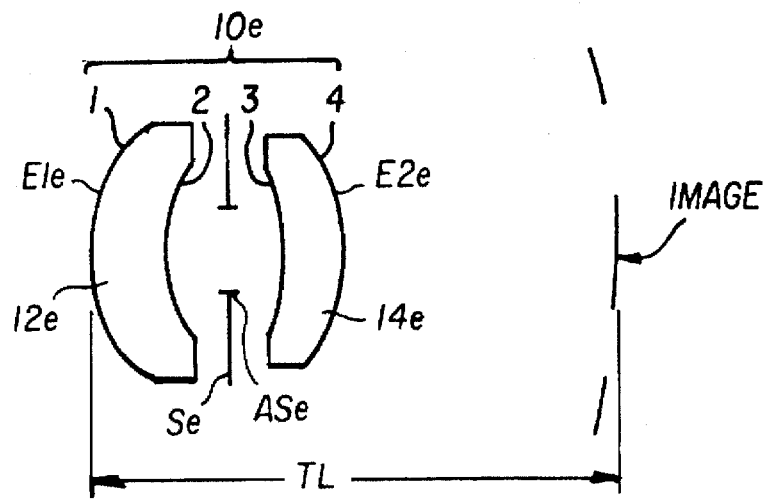
FIG. 9 shows the outline of the lens system 10e of a fifth preferred embodiment.

The fifth preferred embodiment 10e is illustrated in FIG. 9. The front lens component 12e of the optical system 10e is a meniscus plastic lens element $E_{1e}$. The rear lens component 14e is a meniscus plastic lens element $E_{2e}$. The two lens components are manufactured from different plastics. The front lens component 12e is biaspheric. The aperture stop ASe is located in the airspaced formed between the first lens element $E_{1e}$ and the second lens element $E_{2e}$. In this fifth embodiment, the focal length of optical system 10e is 25 mm, the F-number is 11 and the full field of view is 74.94 degrees. Both of lens elements $E_{1e}$ and $E_{2e}$ of the fifth embodiment are positive.

In this fifth embodiment, the lens components 12e and 14e have the thickness of 2.096 mm and 1.633 mm respectively. The focal length $f_{1e}$ of the first lens component 12e is 39.00 mm and the focal length $f_{2e}$ of the second lens component 14e is 48.28 mm. The ratio of $f_{1e}/f_{2e}=0.81$. Therefore, the biaspheric lens component is the more powerful lens component. This is different from the proceeding embodiments.

The image surface of the lens system 10e is cylindrical with a sag in the long dimension of the image. In this embodiment, this cylindrical radius of curvature is −120 mm.

Aspheric surfaces with about 139 waves and 56 waves departure from the best fit sphere, are used on the first and the second surfaces, respectively, of the biaspheric lens element to control the image quality.

The ratio of the total length TL of the lens system (measuring from the front-most surface's vertex to the image plane) to the effective focal length (EFL) of the lens system is 1.10.

The aberration curves illustrating the performance of the optical system of the fifth preferred embodiment are provided in FIGS. 10A–10F.

Figure 10A:
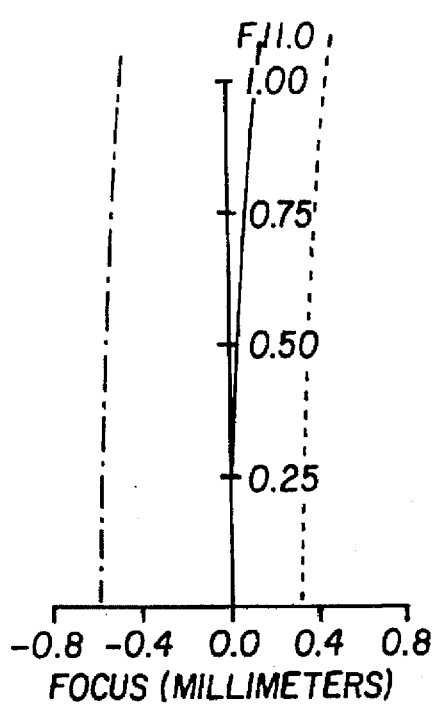
FIGS. 10A–10F provide aberration curves for the lens system 10e illustrated in FIG. 9.

More specifically, FIG. 10A illustrates longitudinal spherical aberration. The vertical axis depicts relative aperture. The horizontal axis depicts the focus position. The primary wavelength is 546.1 nm.

Figure 10B:
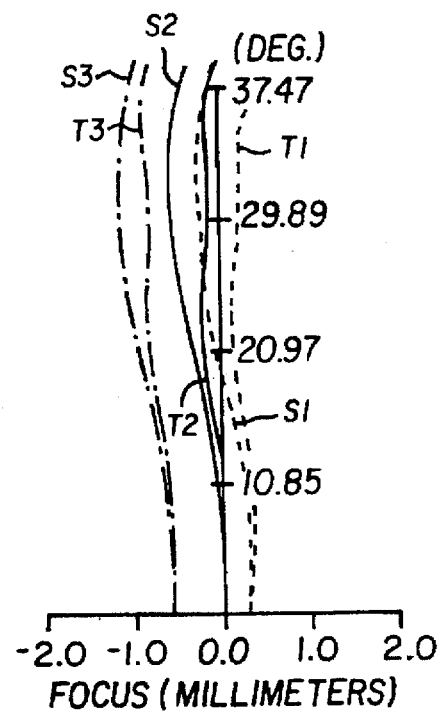

FIG. 10B illustrates astigmatism in the lens system. The vertical axis is the half field angle in degrees. The horizontal axis is focus position.

The "zero focus" on the horizontal axis of the longitudinal spherical aberration (LSA) and astigmatism plots (FIGS. 10A and 10B) is shown referenced to the paraxial focus at 546.1 nm. Since the image is cylindrically curved, we choose to reference the vertical axis of the astigmatism plot to an average curvature of the image format. For simplicity, we choose the best fit radius to the corner of the image format for our reference. For this fifth embodiment, the shape of the image format (13.3×36.4 mm) gives us a multiplying factor of 1.1335 for the best fit radius to the corner of the format. Using this with the −120 mm cylinder radius, we get a best fit corner radius of −136.02 mm. All of the aberrations shown which are dependent on field are referenced to this best fit radius.

Figure 10C:
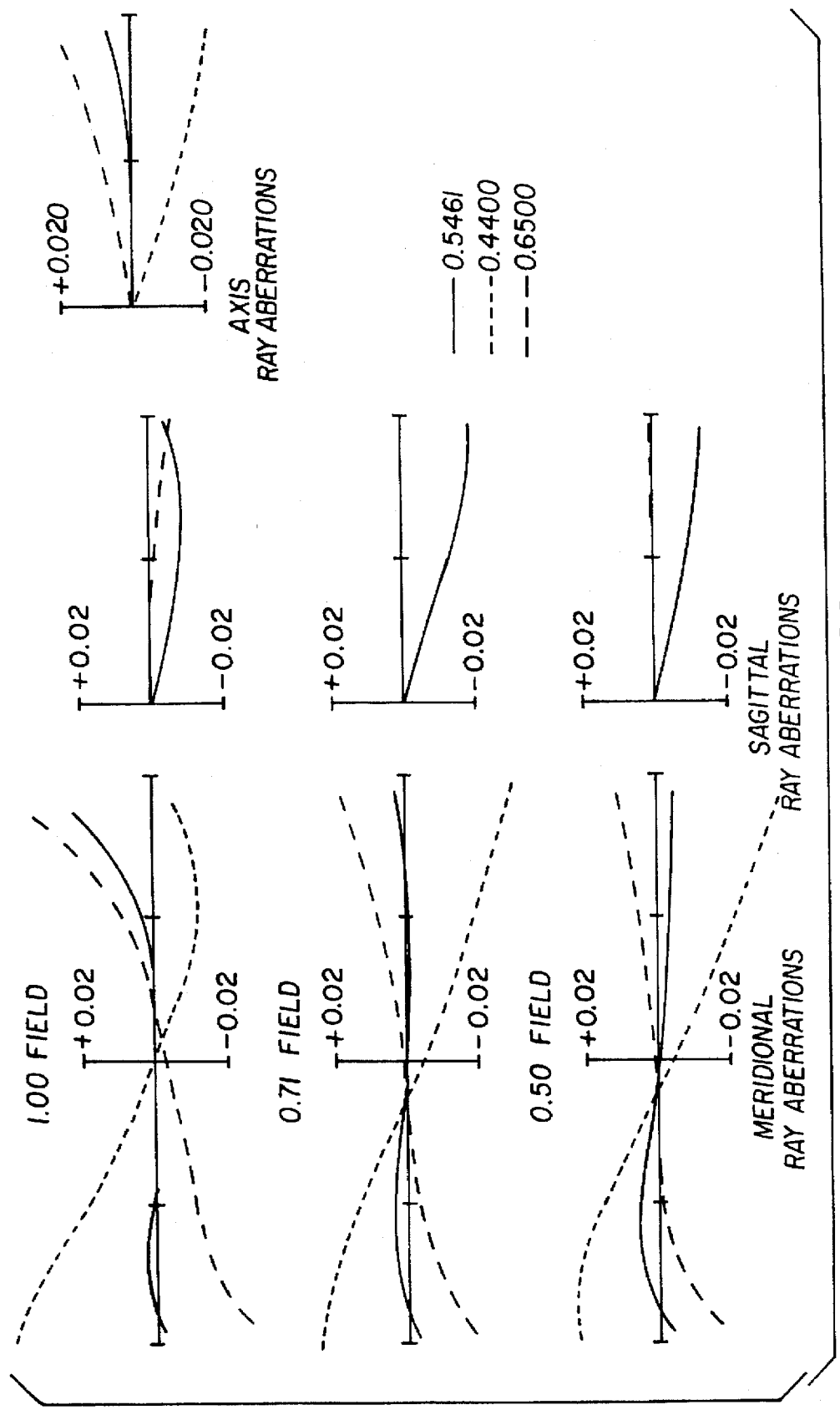

FIG. 10C depicts ray intercept curves for the fifth embodiment at several relative field positions (i.e. axis, 0.5, 0.7, and full field). The vertical axis depicts ray aberrations in millimeters. The horizontal axis is relative pupil coordinate, the edges being±full pupil (i.e. ±1.0 pupil).

Figure 10D:
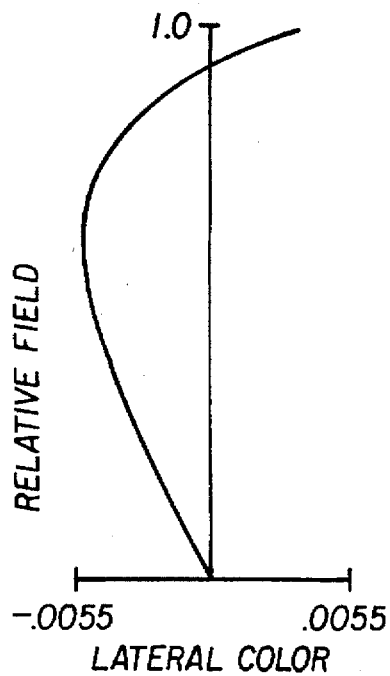

FIG. 10D depicts the lateral color (440 nm to 650 nm) across the field.

Figure 10E:
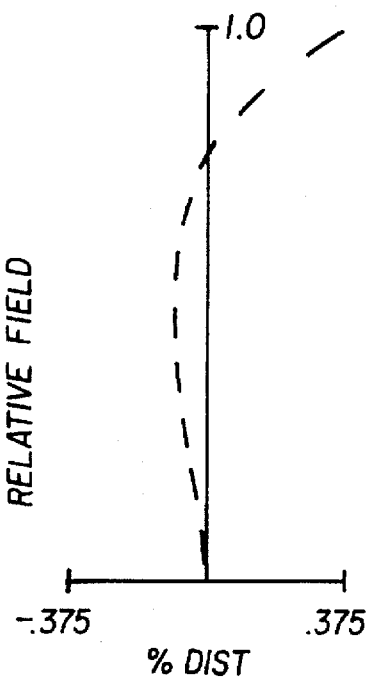

FIG. 10E depicts the distortion at the primary wavelength (546.1 nm) across the field.

Figure 10F:
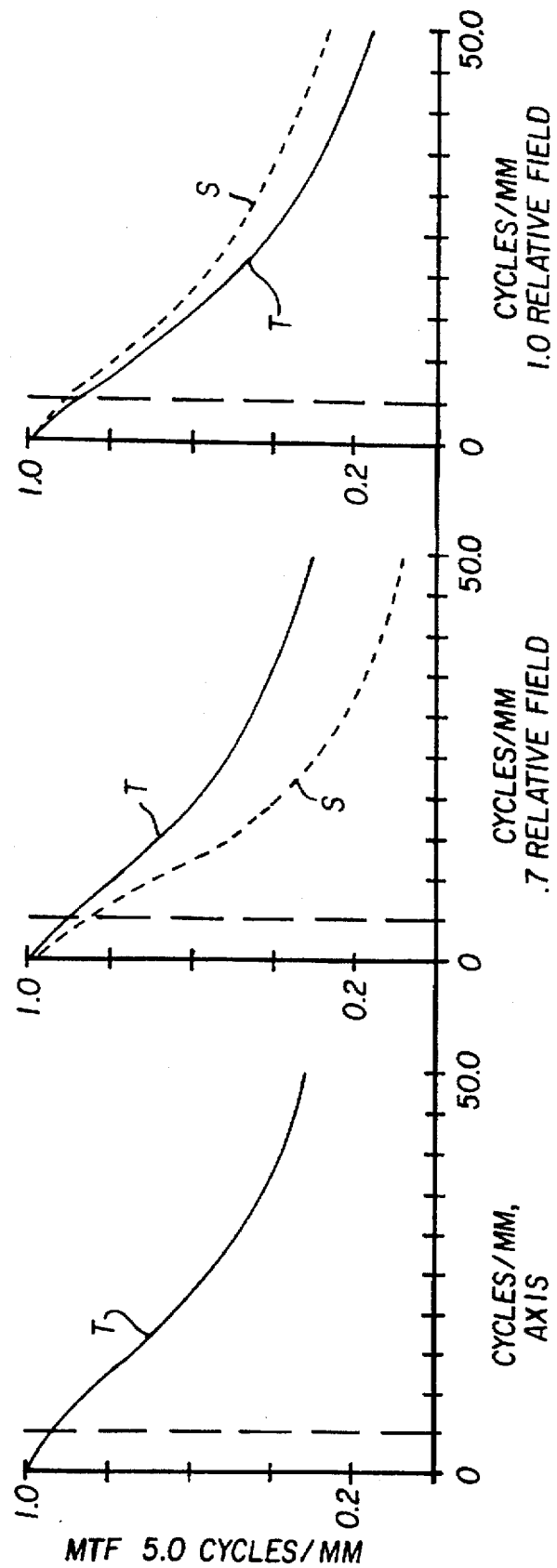

FIG. 10F depicts heterochromatic through frequency MTF at three field points: axis, 0.7 relative field, and full field. Wavelengths used were 650 nm, 546.1 nm, and 440 nm with respective chromatic weights of 35, 50, and 15.

Figure 11:
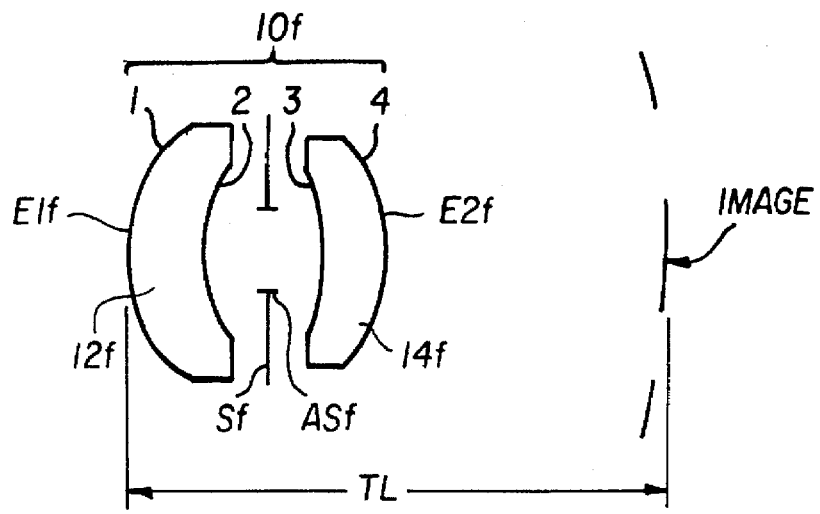
FIG. 11 shows the outline of the lens system 10f of a sixth preferred embodiment.

The sixth preferred embodiment is illustrated in FIG. 11. The front lens component 12f of the optical system 10f is a meniscus plastic lens element $E_{1f}$. The rear lens component 14f is a meniscus plastic lens element $E_{2f}$. Both front lens component 12f and the rear component 14f are biaspheric. The aperture stop ASf is located in the airspaced formed between the first lens element $E_{1f}$ and the second lens element $E_{2f}$. In this sixth embodiment, the focal length of optical system 10f is 24 mm, the F-number is 8 and the full field of view is 70.1 degrees. Both of lens elements $E_{1f}$ and $E_{2f}$ of the sixth embodiment are positive and are manufactured from the different plastics.

In this sixth embodiment, the lens components 12f and 14f have the thickness of 2.015 mm and 2.436 mm respectively. The focal length $f_{1f}$ of the first lens component 12f is 20.54 mm and the focal length $f_{2f}$ of the second lens component 14f is 10, 107 mm. The ratio of $f_{1f}/f_{2f}=0.002$.

The image surface of the lens system 10f is cylindrical with a sag in the long dimension of the image. In this embodiment, this cylindrical radius of curvature is −120 mm.

Aspheric surfaces with about 27 waves and 6 waves departure from the best fit spheres, are used on the first and the second surfaces, respectively, of the front biaspheric lens element to control the image quality. Aspheric surfaces with about 75 waves and 139 waves departure from the best fit spheres are used on the first and second surfaces, respectively, of the second biaspheric lens element to control the image quality.

The ratio of the total length TL of the lens system (measuring from the front-most surface's vertex to the image plane) to the effective focal length (EFL) of the lens system is 1.07.

The aberration curves illustrating the performance of the optical system of the sixth preferred embodiment are provided in FIGS. 12A–12F.

Figure 12D:
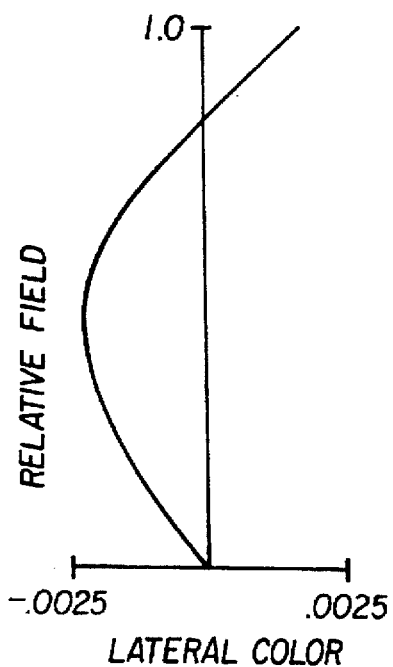
FIGS. 12A–12F provide aberration curves for the lens system 10f illustrated in FIG. 11.
Figure 12E:
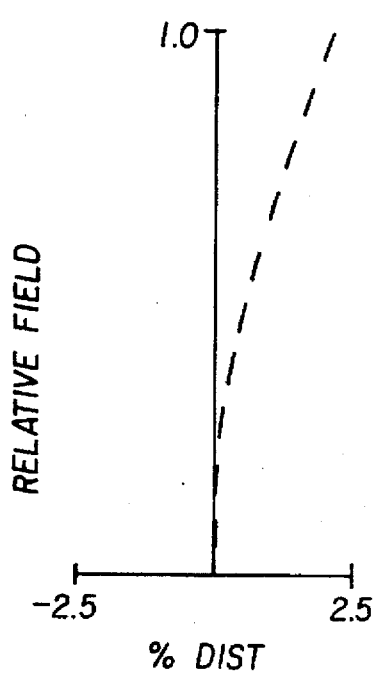
Figure 12A:
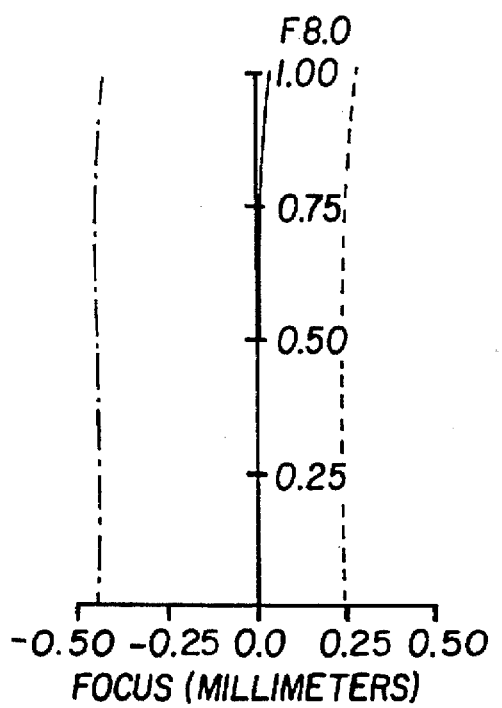

More specifically, FIG. 12A illustrates longitudinal spherical aberration. The vertical axis depicts relative aperture. The horizontal axis depicts the focus position. The primary wavelength is 546.1 nm.

Figure 12B:
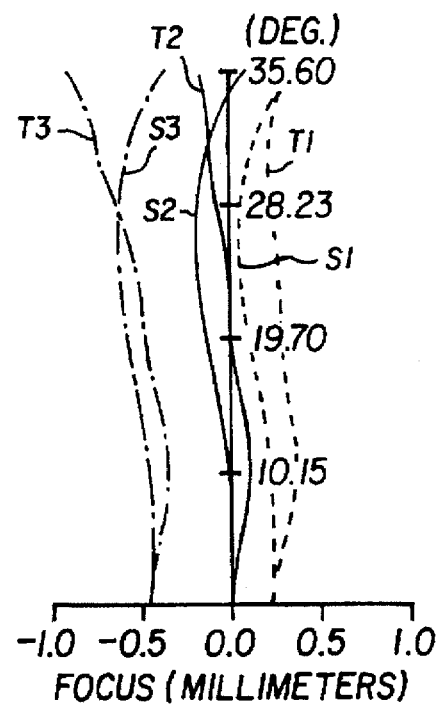

FIG. 12B illustrates astigmatism in the lens system. The vertical axis is the half field angle in degrees. The horizontal axis is focus position.

The "zero focus" on the horizontal axis of the longitudinal spherical aberration (LSA) and astigmatism plots (FIGS. 12A and 12B) is shown referenced to the paraxial focus at 546.1 nm. Since the image is cylindrically curved, we choose to reference the vertical axis of the astigmatism plot to an average curvature of the image format. For simplicity, we choose the best fit radius to the corner of the image format for our reference. For this sixth embodiment, the shape of the image format (16.7×30 mm) gives us a multiplying factor of 1.3099 for the best fit radius to the corner of the format. Using this with the −120 mm cylinder radius, we get a best fit corner radius of −157.19 mm. All of the aberrations shown which are dependent on field are referenced to this best fit radius.

Figure 12C:
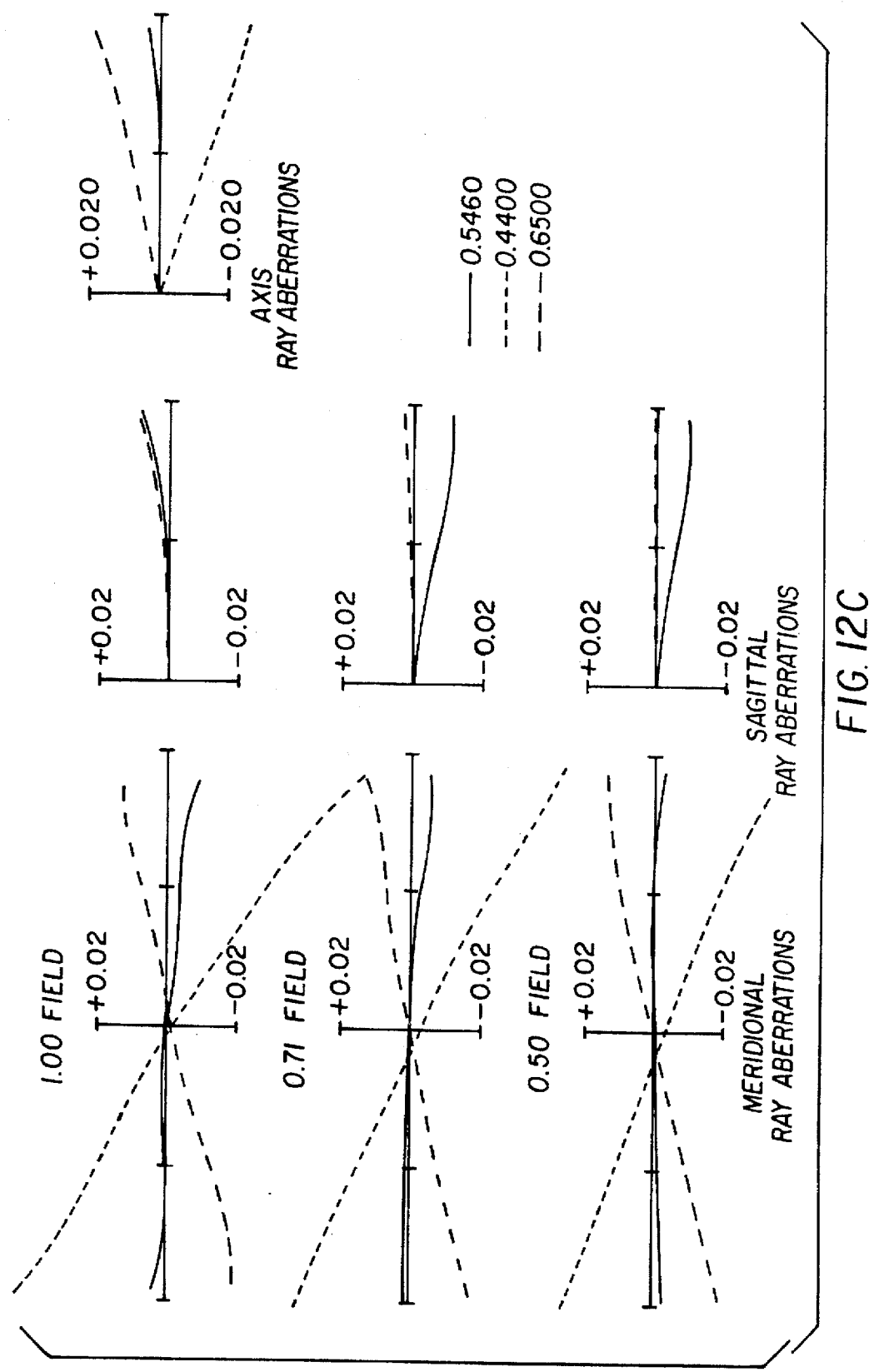

FIG. 12C depicts ray intercept curves for the sixth embodiment at several relative field positions (i.e. axis, 0.5, 0.7, and full field). The vertical axis depicts ray aberrations in millimeters. The horizontal axis is relative pupil coordinate, the edges being±full pupil (i.e. ±1.0 pupil).

FIG. 12D depicts the lateral color (440 nm to 650 nm) across the field.

FIG. 12E depicts the distortion at the primary wavelength (546.1 nm) across the field.

Figure 12F:
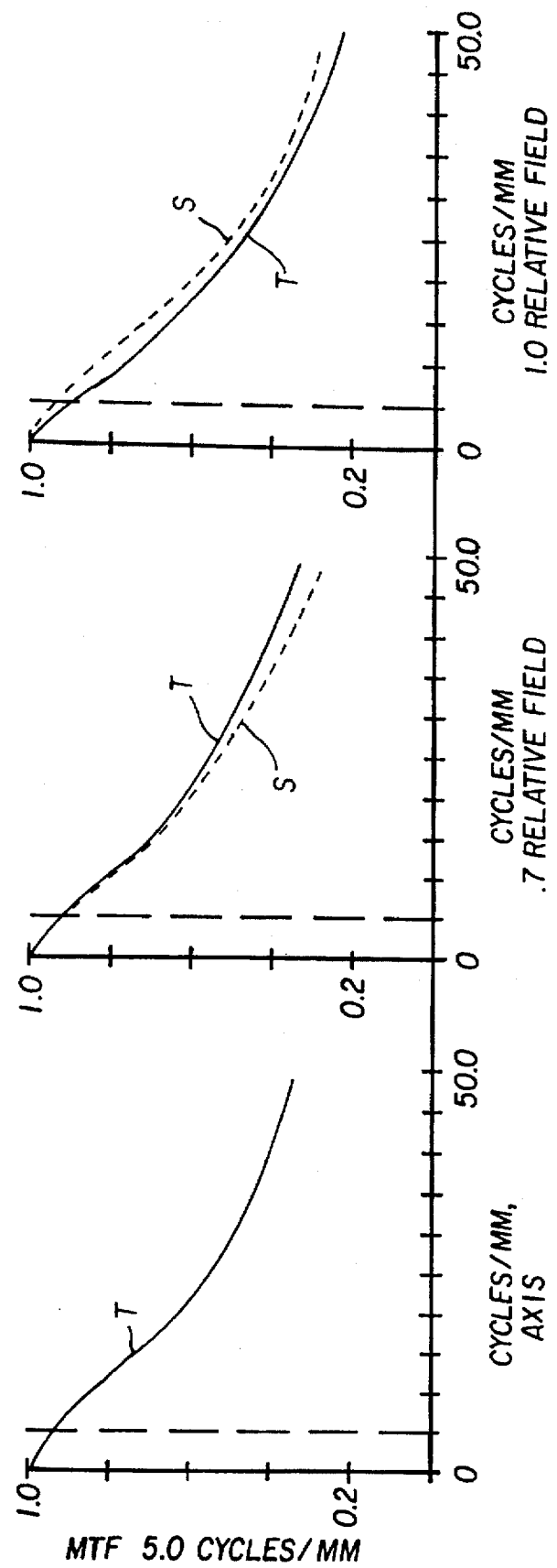

FIG. 12F depicts heterochromatic through frequency MTF at three field points: axis, 0.7 relative field, and full field. Wavelengths used were 650 nm, 546.1 nm, and 440 nm with respective chromatic weights of 35, 50, and 15.

The seventh through the ninth embodiments are most preferred, because the biaspheric lens component of these embodiments has a greatly reduced sensitivity to the aspheric surface decenter. The method for reducing lens system sensitivity to an aspheric surface decenter is described in detail further in the specification.

Figure 13:
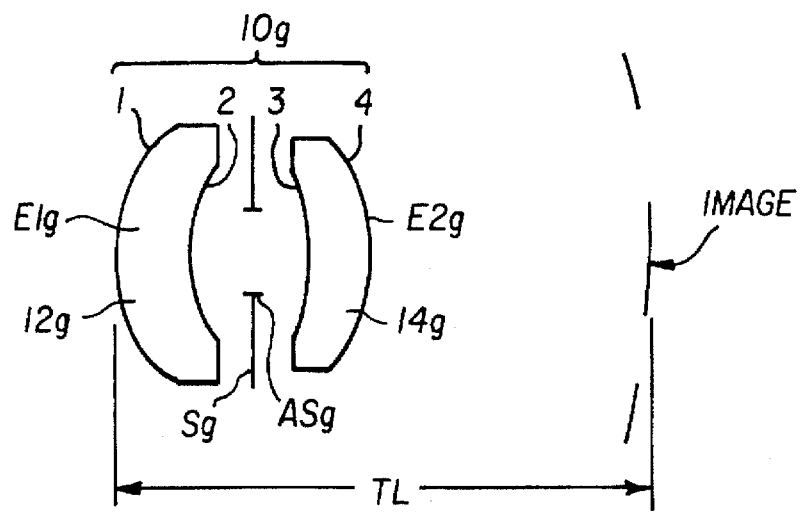
FIG. 13 shows the outline of the lens system 10g of a seventh preferred embodiment.

The seventh preferred embodiment is illustrated in FIG. 13. The front lens component 12g of the optical system 10g is a meniscus plastic lens element $E_{1g}$. The rear lens component 14g is a meniscus plastic lens element $E_{2g}$. The front lens component 12g is biaspheric. The aperture stop ASg is located in the airspaced formed between the first lens element $E_{1g}$ and the second lens element $E_{2g}$. In this seventh embodiment, the focal length of optical system 10g is 24 mm, the F-number is 8 and the full field of view is 71.7 degrees. Both of lens elements $E_{1g}$ and $E_{2g}$ of the seventh embodiment are positive and are made from the same type of plastic.

In this seventh embodiment, the lens components 12g and 14g have the thickness of 2.85 mm and 2.0 mm respectively. The focal length $f_{1g}$ of the first lens component 12g is 81.01 mm and the focal length $f_{2g}$ of the second lens component 14g is 26.84 mm. The ratio of $f_{1g}/f_{2g}=3.02$.

The image surface of the lens system 10g is cylindrical with a sag in the long dimension of the image. In this embodiment, this cylindrical radius of curvature is −90 mm.

Aspheric surfaces with about 143 waves and 48 waves departure from the best fit sphere, are used on the first and the second surfaces, respectively, of the biaspheric lens element to control the image quality.

The ratio of the total length TL of the lens system (measuring from the front-most surface's vertex to the image plane) to the effective focal length (EFL) of the lens system is 1.22.

The aberration curves illustrating the performance of the optical system of the seventh preferred embodiment are provided in FIGS. 14A–14F.

Figure 14A:
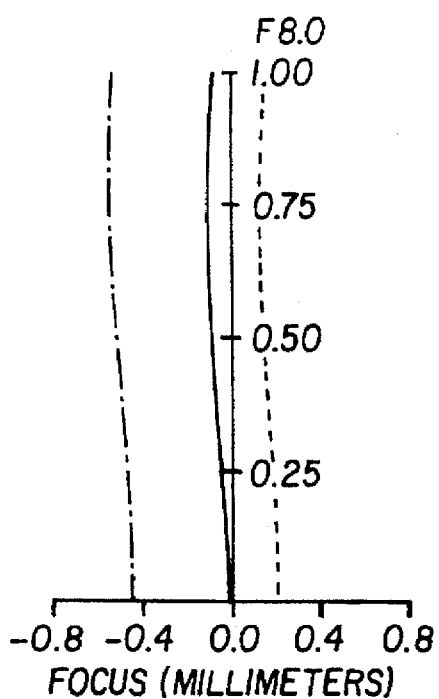
FIGS. 14A–14F provide aberration curves for the lens system 10g illustrated in FIG. 13.

More specifically, FIG. 14A illustrates longitudinal spherical aberration. The vertical axis depicts relative aperture. The horizontal axis depicts the focus position. The primary wavelength is 546.1 nm.

Figure 14B:
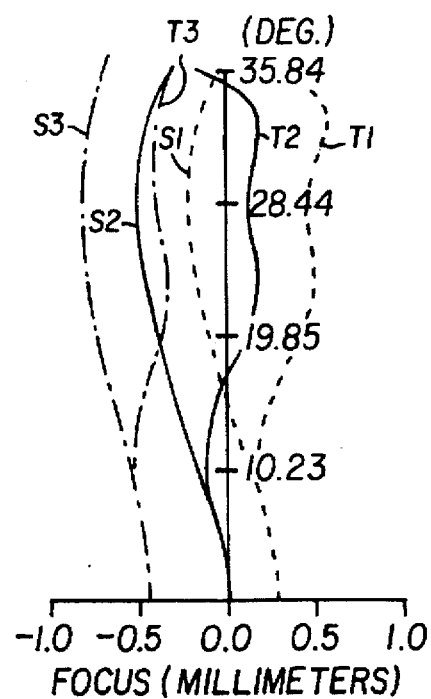

FIG. 14B illustrates astigmatism in the lens system. The vertical axis is the half field angle in degrees. The horizontal axis is focus position.

The "zero focus" on the horizontal axis of the longitudinal spherical aberration (LSA) and astigmatism plots (FIGS. 14A and 14B) is shown referenced to the paraxial focus at 546.1 nm. Since the image is cylindrically curved, we choose to reference the vertical axis of the astigmatism plot to an average curvature of the image format. For simplicity, we choose the best fit radius to the corner of the image format for our reference. For this seventh embodiment, the shape of the image format (16.7×30 mm) gives us a multiplying factor of 1.3099 for the best fit radius to the corner of the format. Using this with the −90 mm cylinder radius, we get a best fit corner radius of −117.89 mm. All of the aberrations shown which are dependent on field are referenced to this best fit radius.

Figure 14C:
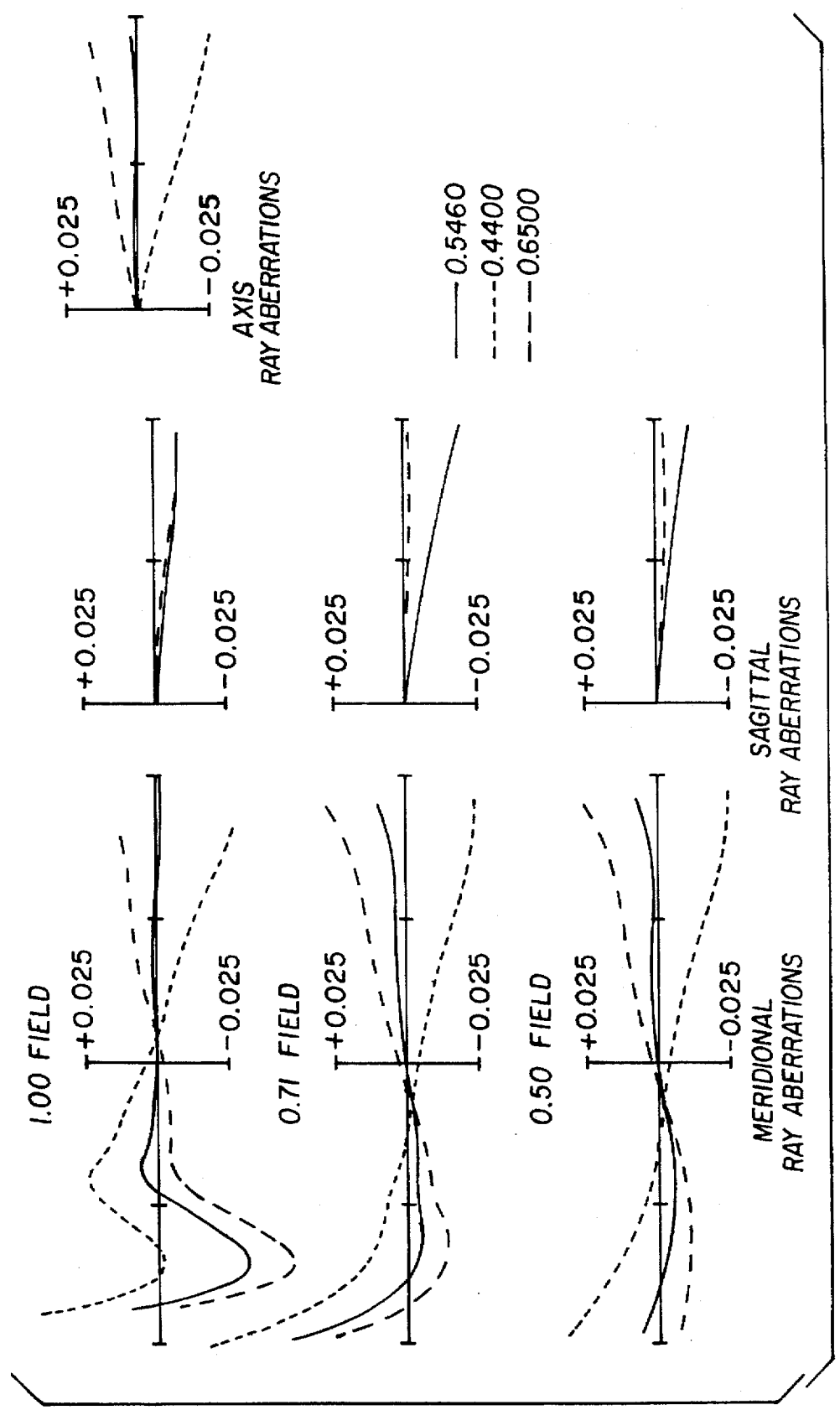

FIG. 14C depicts ray intercept curves for the seventh embodiment at several relative field positions (i.e. axis, 0.5, 0.7, and full field). The vertical axis depicts ray aberrations in millimeters. The horizontal axis is relative pupil coordinate, the edges being ±full pupil (i.e. ±1.0 pupil).

Figure 14D:
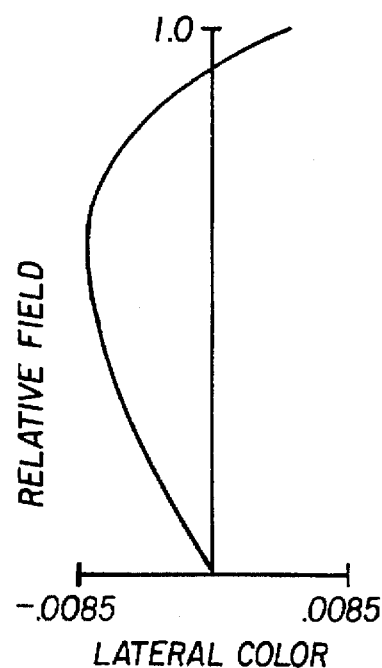

FIG. 14D depicts the lateral color (440 nm to 650 nm) across the field.

Figure 14E:
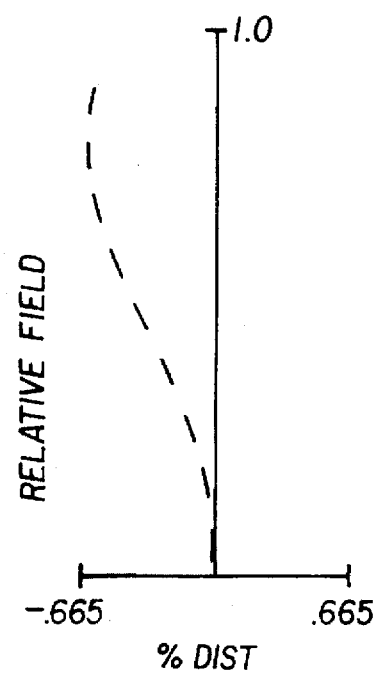

FIG. 14E depicts the distortion at the primary wavelength (546.1 nm) across the field.

Figure 14F:
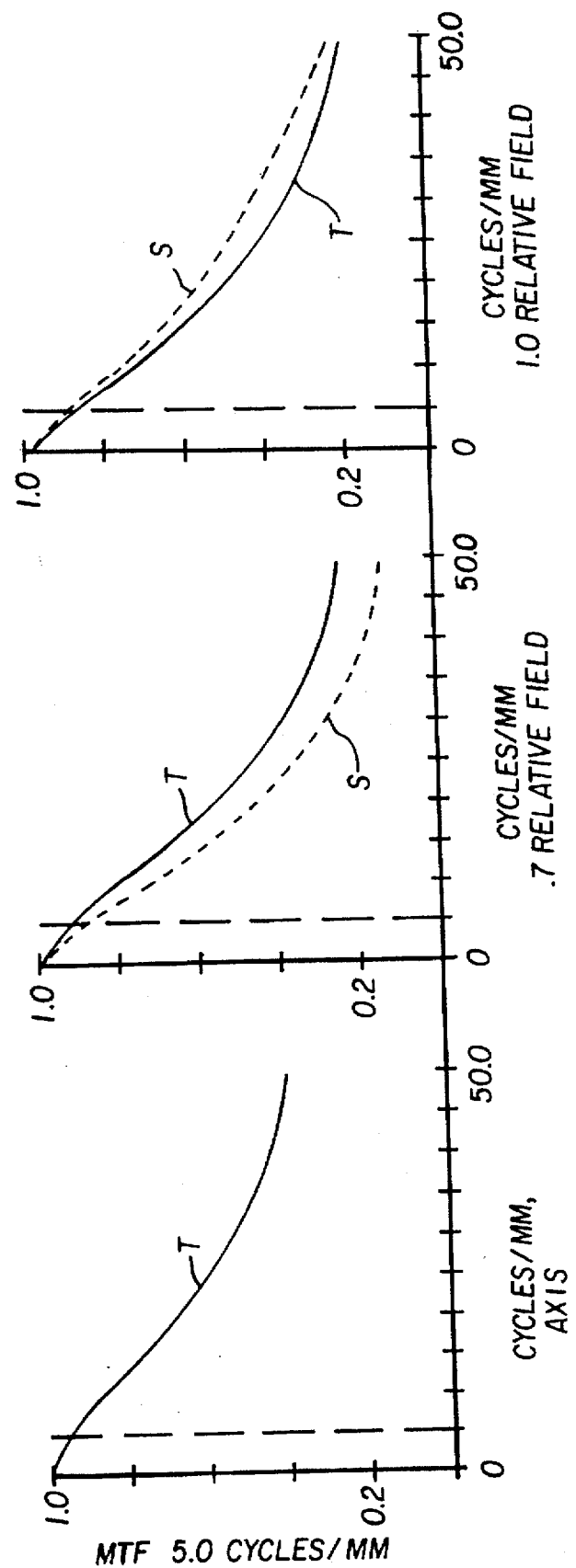

FIG. 14F depicts heterochromatic through frequency MTF at three field points: axis, 0.7 relative field, and full field. Wavelengths used were 650 nm, 546.1 nm, and 440 nm with respective chromatic weights of 35, 50, and 15.

Figure 15:
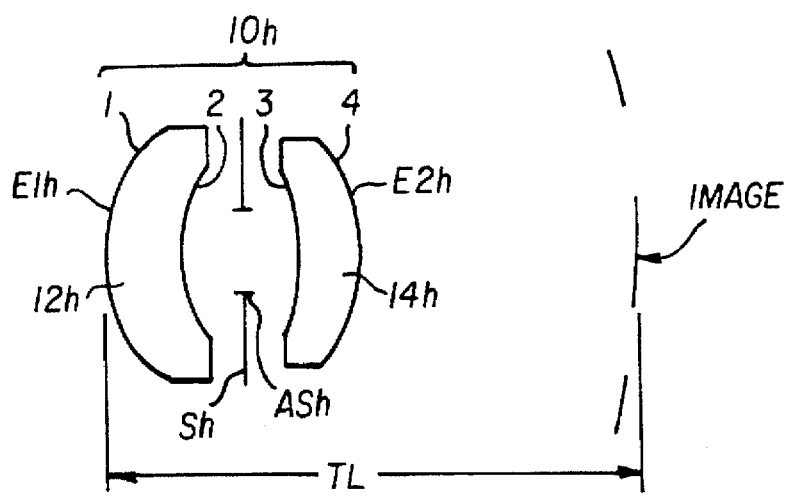
FIG. 15 shows the outline of the lens system 10h of an eighth preferred embodiment.

The eighth preferred embodiment is illustrated in FIG. 15. The optical system 10h of the eighth embodiment is constructed from two lens components 12h and 14h. The front lens component 12h is a meniscus plastic lens element $E_{1h}$. The rear lens component 14h is a meniscus plastic lens element $E_{2h}$. A different plastic material is used for each lens component. This embodiment is different from some of the above described embodiments. It contains not two, but three aspheric surfaces, and it is the second and not the first lens component that is biaspheric. The front lens element $E_{1h}$ contains a single aspheric surface which is located on a front-most (i.e., object side) surface of the lens element. The second lens element $E_{2h}$ is biaspheric. The front lens component 12h has a shorter focal length than the rear lens component 14h. In the eighth embodiment, the focal length of optical system 10h is 24 mm, the F-number is 8 and the full field of view is 70.3 degrees. Lens components 12h and 14h are made from different types of plastic.

The ratio of the total length TL of the lens system (measuring from the front-most surface's vertex to the image plane) to the effective focal length (EFL) of the lens system is 1.08.

In this eighth embodiment, the lens components 12h and 14h have the thickness of 2.85 mm and 2.5 mm respectively. The focal length $f_{1h}$ of the first lens component 12h is 22.28 mm and the focal length $f_{2h}$ of the second lens component 14h is 220.14 mm. The ratio of $f_{1h}/f_{2h}=0.10$.

An aspheric surface with about 18 waves departure from the best fit sphere is used on the front surface of lens element $E_{1h}$.

Aspheric surfaces with about 52 waves and 123 waves departure from the best fit sphere, are used on the first and the second surfaces, respectively, of the biaspheric lens element $E_{2h}$ to control the image quality.

The aberration curves illustrating the performance of the optical system of the eighth embodiment are provided in FIGS. 16A–16F.

Figure 16D:
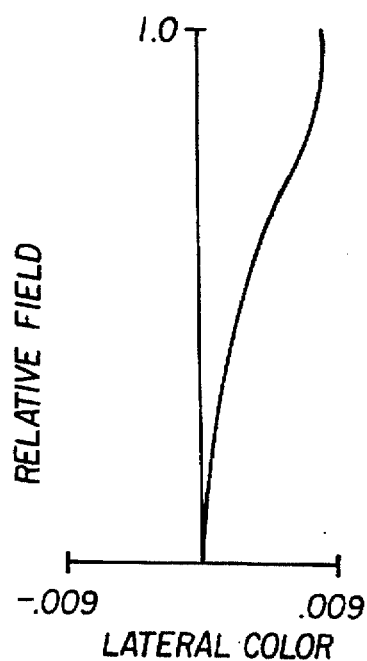
FIGS. 16A–16F provide aberration curves for the lens system 10h illustrated in FIG. 15.
Figure 16E:
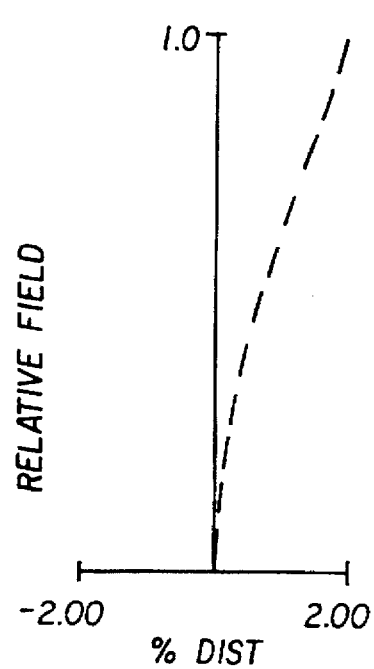
Figure 16A:
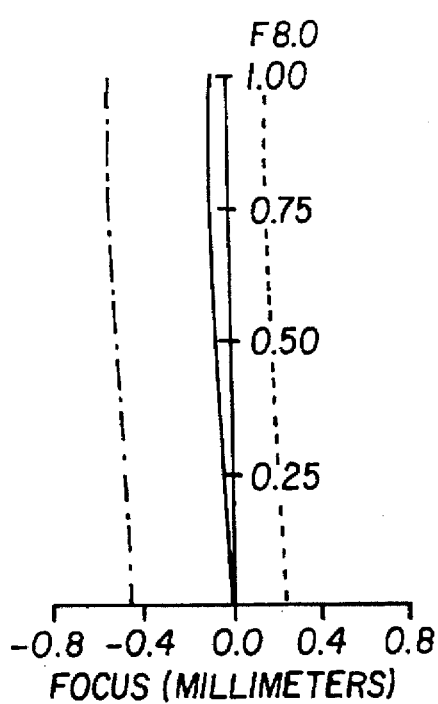

More specifically, FIG. 16A illustrates longitudinal spherical aberration. The vertical axis depicts relative aperture. The horizontal axis depicts the focus position. The primary wavelength is 546.1 nm.

Figure 16B:
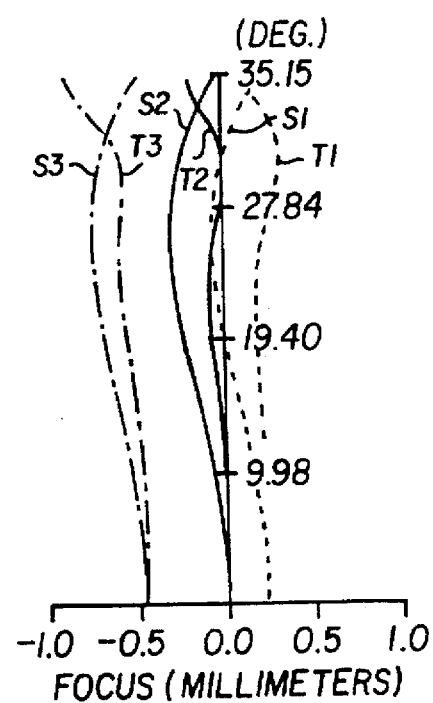

FIG. 16B illustrates astigmatism in the lens system. The vertical axis is the half field angle in degrees. The horizontal axis is focus position.

The "zero focus" on the horizontal axis of the longitudinal spherical aberration (LSA) and astigmatism plots (FIGS. 16A and 16B) is shown referenced to the paraxial focus at 546.1 nm. Since the image is cylindrically curved, we choose to reference the vertical axis of the astigmatism plot to an average curvature of the image format. For simplicity, we choose the best fit radius to the corner of the image format for our reference. For this eighth embodiment, the shape of the image format (16.7×30 mm) gives us a multiplying factor of 1.3099 for the best fit radius to the corner of the format. Using this with the −120 mm cylinder radius, we get a best fit corner radius of −157.19 mm. All of the aberrations shown which are dependent on field are referenced to this best fit radius.

Figure 16C:
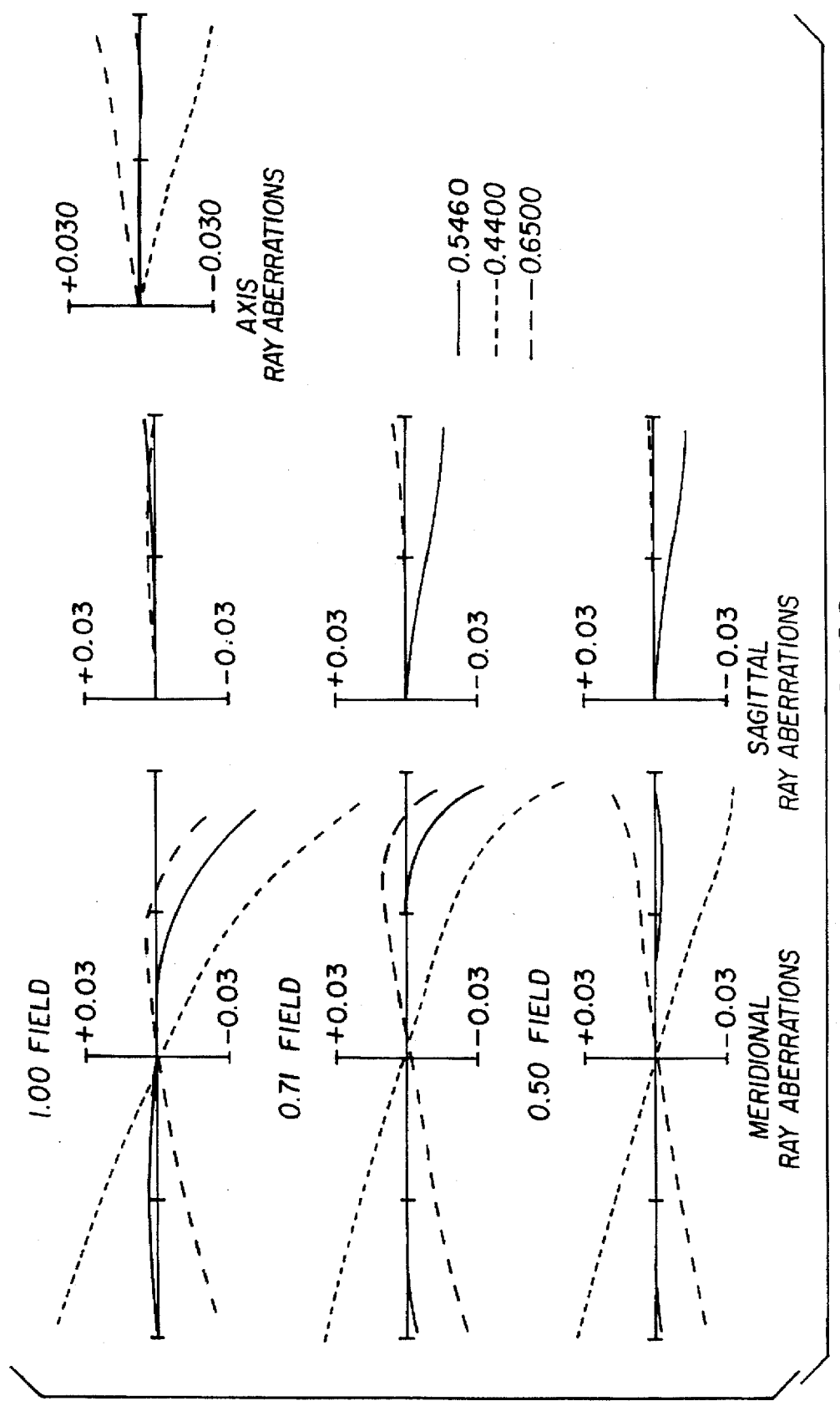

FIG. 16C depicts ray intercept curves for the eighth embodiment at several relative field positions (i.e. axis, 0.5, 0.7, and full field). The vertical axis depicts ray aberrations in millimeters. The horizontal axis is relative pupil coordinate, the edges being ±full pupil (i.e. ±1.0 pupil).

FIG. 16D depicts the lateral color (440 nm to 650 nm) across the field.

FIG. 16E depicts the distortion at the primary wavelength (546.1 nm) across the field.

Figure 16F:
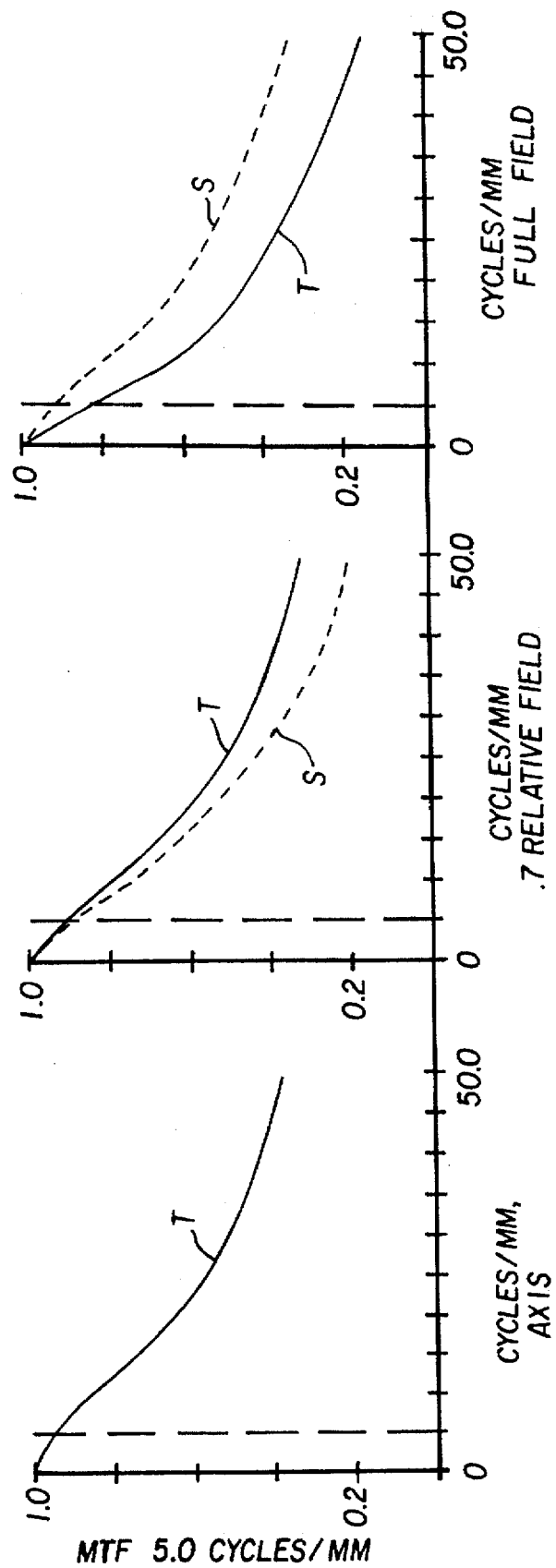

FIG. 16F depicts heterochromatic through frequency MTF at three field points: axis, 0.7 relative field, and full field. Wavelengths used were 650 nm, 546.1 nm, and 440 nm with respective chromatic weights of 35, 50, and 15.

Figure 17:
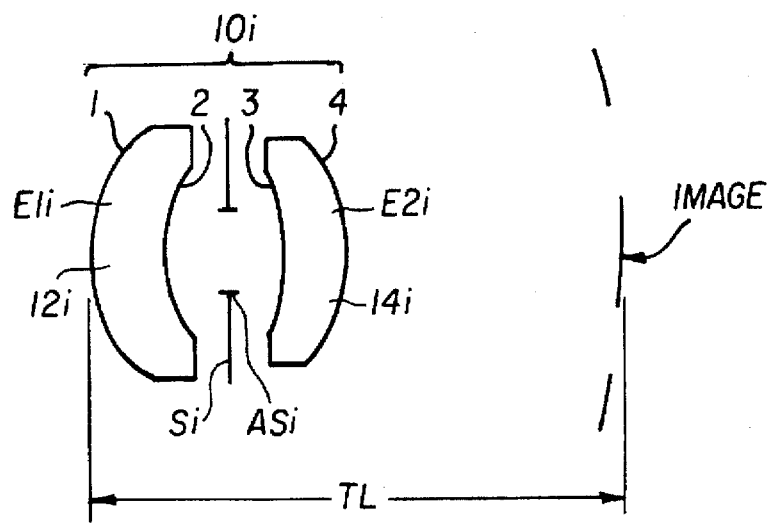
FIG. 17 shows the outline of the lens system 10i of a ninth preferred embodiment.

The ninth preferred embodiment is illustrated in FIG. 17. The front lens component $12i$ of the optical system $10i$ is a positive power meniscus lens element $E_{1i}$ which is a glass lens element. The rear lens component $14i$ is a meniscus plastic lens element $E_{2i}$. The rear lens component $12i$ is biaspheric and has negative optical power. The aperture stop ASi is located in the airspaced formed between the first lens element $E_{1i}$ and the second lens element $E_{2i}$. In this ninth embodiment, the focal length of optical system $10i$ is 28 mm, the F-number is 8 and the full field of view is 62.92 degrees.

The lens system of the ninth embodiment is athermalized. That is, that a 30° C. temperature change produces only essentially no image shift (i.e. it produces a minimum −0.02 mm image distance shift). A minimum image shift is defined as image shift of less than |0.05|nm. This property was achieved by making a stronger lens element out of glass and a weak lens element out of plastic. Because the plastic lens element has strongly curved surfaces which are also aspheric, it contributes strongly to aberration control, but has essentially no effect on the image shift when the lens system temperature undergoes a large temperature change.

In this ninth embodiment, the lens components $12i$ and $14i$ have the thickness of 3.33 mm and 2.92 mm respectively.

The image surface of the lens system $10i$ is cylindrical with a sag in the long dimension of the image. In this embodiment, this cylindrical radius of curvature is −120 mm.

Aspheric surfaces with about 98 waves and 209 waves departure from the best fit sphere, are used on the first and the second surfaces, respectively, of the biaspheric lens element to control the image quality.

The ratio of the total length TL of the lens system (measuring from the front-most surface's vertex to the image plane) to the effective focal length (EFL) of the lens system is 1.05.

The aberration curves illustrating the performance of the optical system of the ninth preferred embodiment are provided in FIGS. 18A–18F.

Figure 18A:
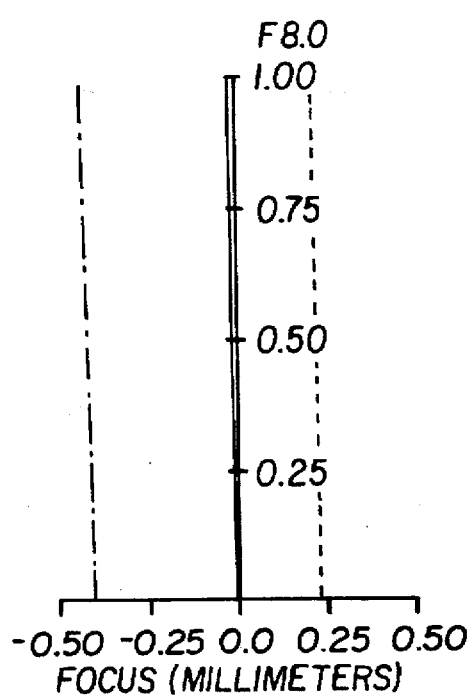
FIGS. 18A–18F provide aberration curves for the lens system 10i illustrated in FIG. 17.

More specifically, FIG. 18A illustrates longitudinal spherical aberration. The vertical axis depicts relative aperture. The horizontal axis depicts the focus position. The primary wavelength is 546.1 nm.

Figure 18B:
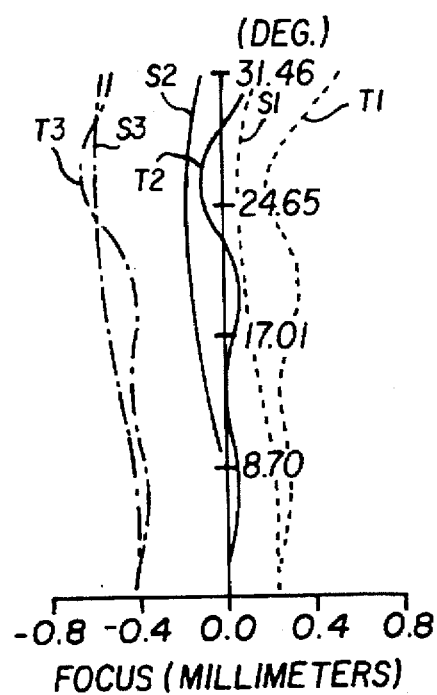

FIG. 18B illustrates astigmatism in the lens system. The vertical axis is the half field angle in degrees. The horizontal axis is focus position.

The "zero focus" on the horizontal axis of the longitudinal spherical aberration (LSA) and astigmatism plots (FIGS. 18A and 18B) is shown referenced to the paraxial focus at 546.1 nm. Since the image is cylindrically curved, we choose to reference the vertical axis of the astigmatism plot to an average curvature of the image format. For simplicity, we choose the best fit radius to the corner of the image format for our reference. For this ninth embodiment, the shape of the image format (16.7×30 mm) gives us a multi-plying factor of 1.3099 for the best fit radius to the corner of the format. Using this with the −120 mm cylinder radius, we get a best fit corner radius of −157.19 mm. All of the aberrations shown which are dependent on field are referenced to this best fit radius.

Figure 18C:
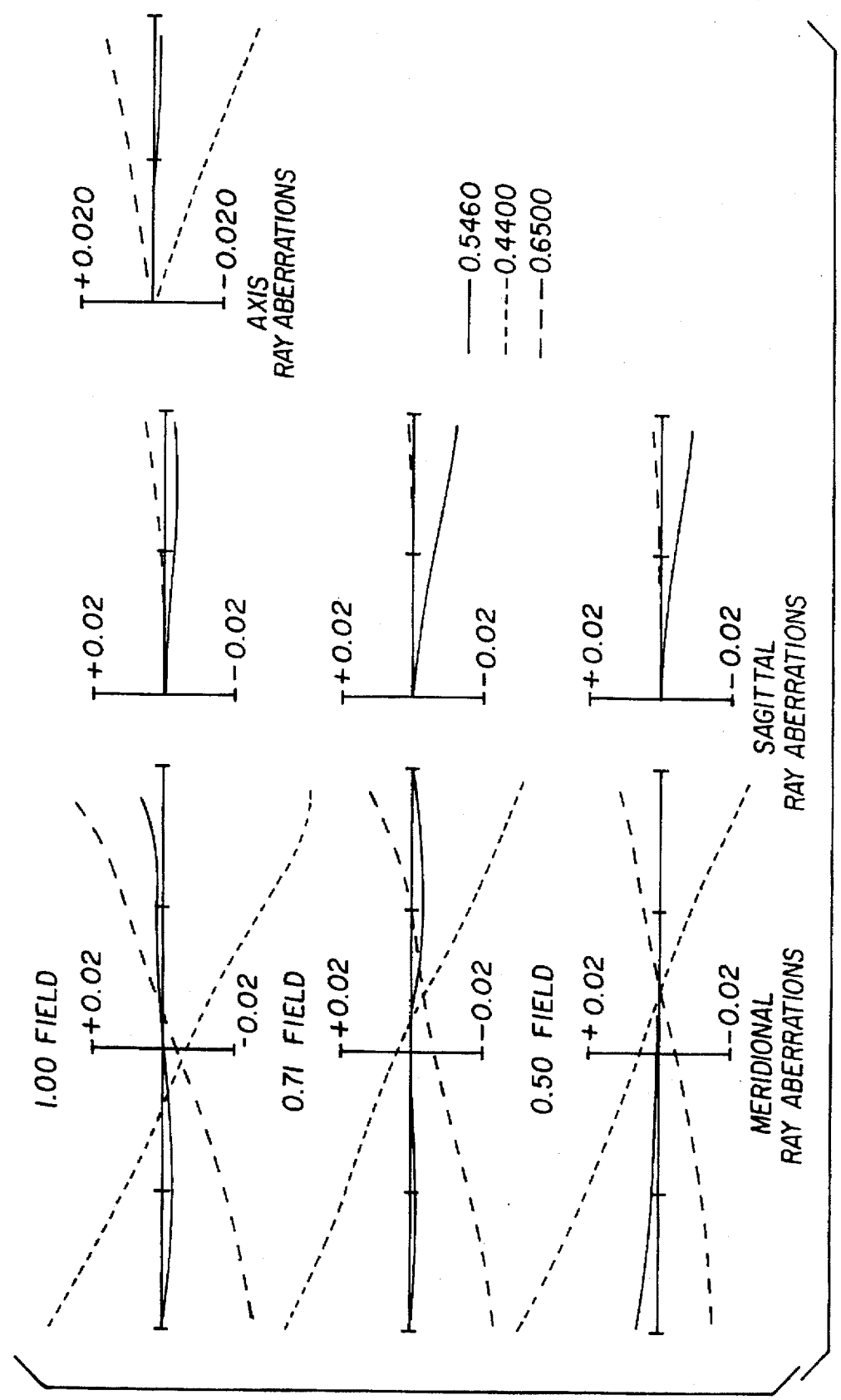

FIG. 18C depicts ray intercept curves for the ninth embodiment at several relative field positions (i.e. axis, 0.5, 0.7, and 1.0). The vertical axis depicts ray aberrations in millimeters. The horizontal axis is relative pupil coordinate, the edges being ±full pupil (i.e. ±1.0 pupil).

Figure 18D:
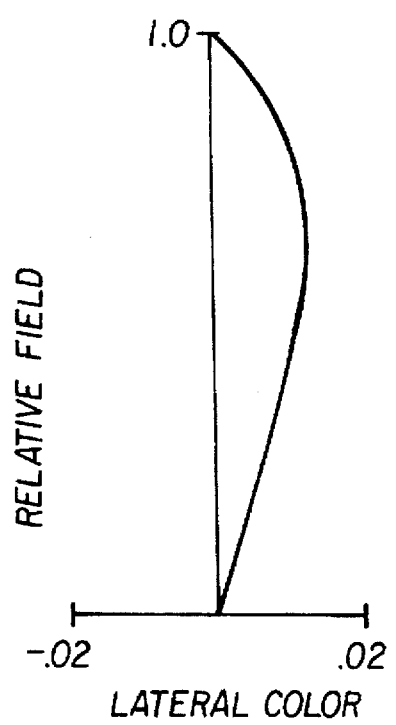

FIG. 18D depicts the lateral color (440 nm to 650 nm) across the field.

Figure 18E:
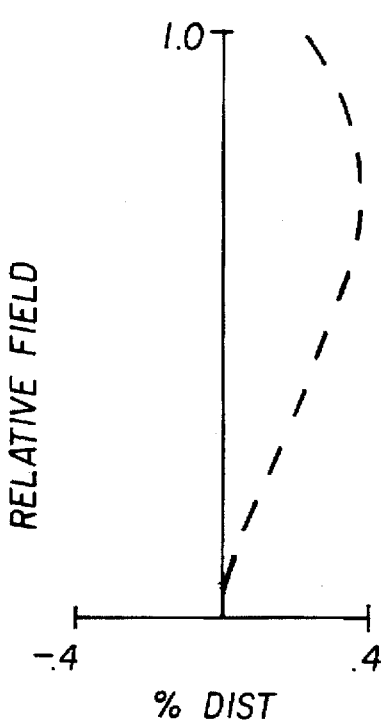

FIG. 18E depicts the distortion at the primary wavelength (546.1 nm) across the field.

Figure 18F:
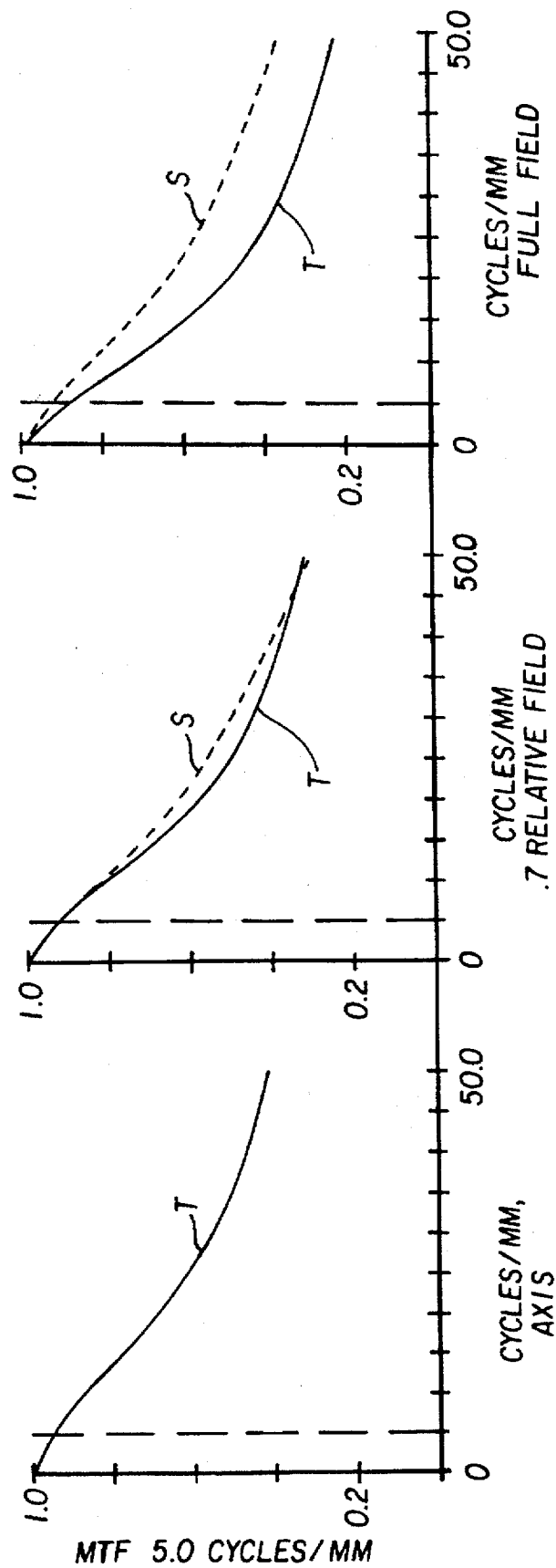
Figure 19:
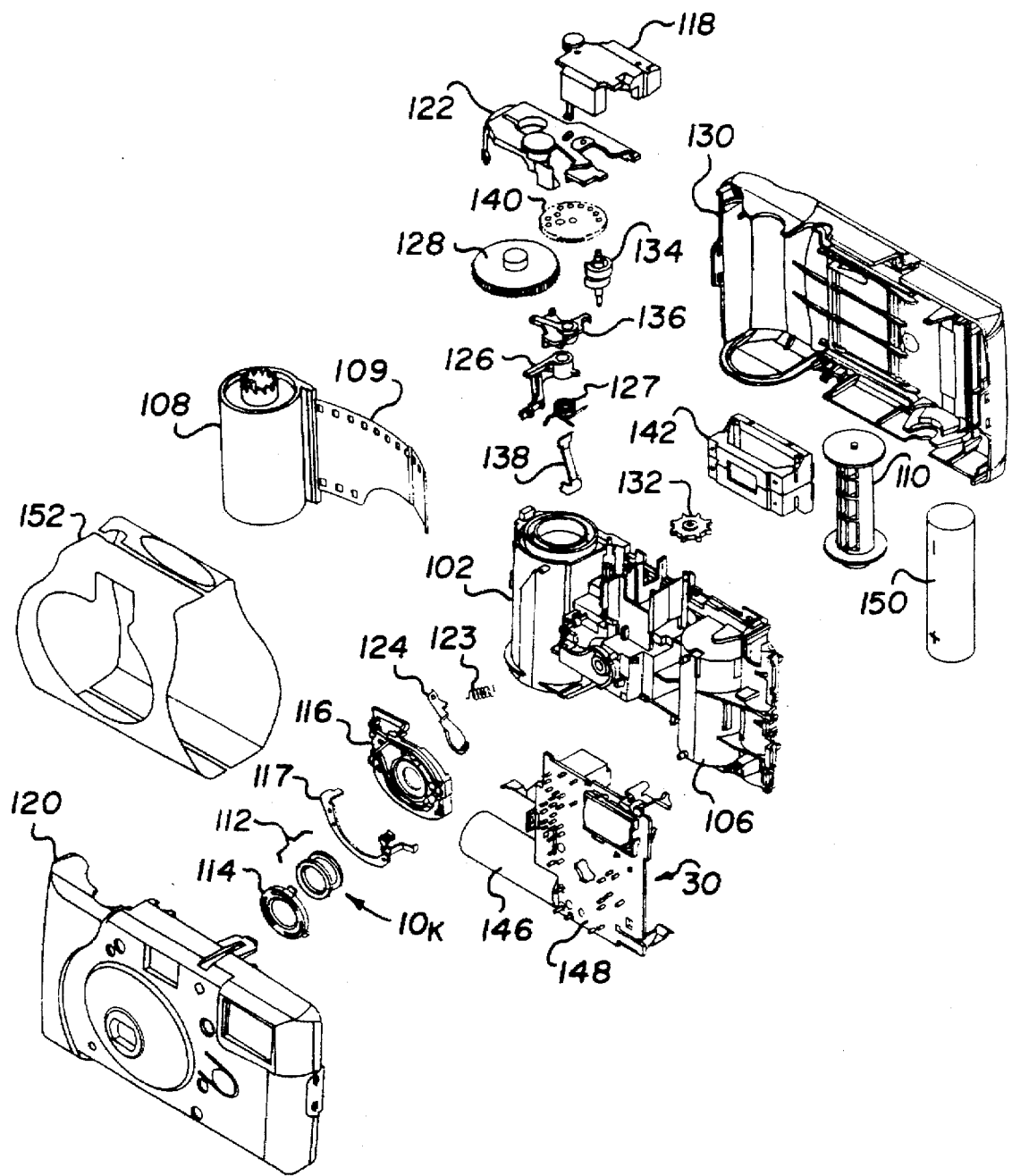
FIG. 19 is an exploded perspective view of a recyclable single-use camera incorporating the lens system such as 10a–10i.
Figure 20:
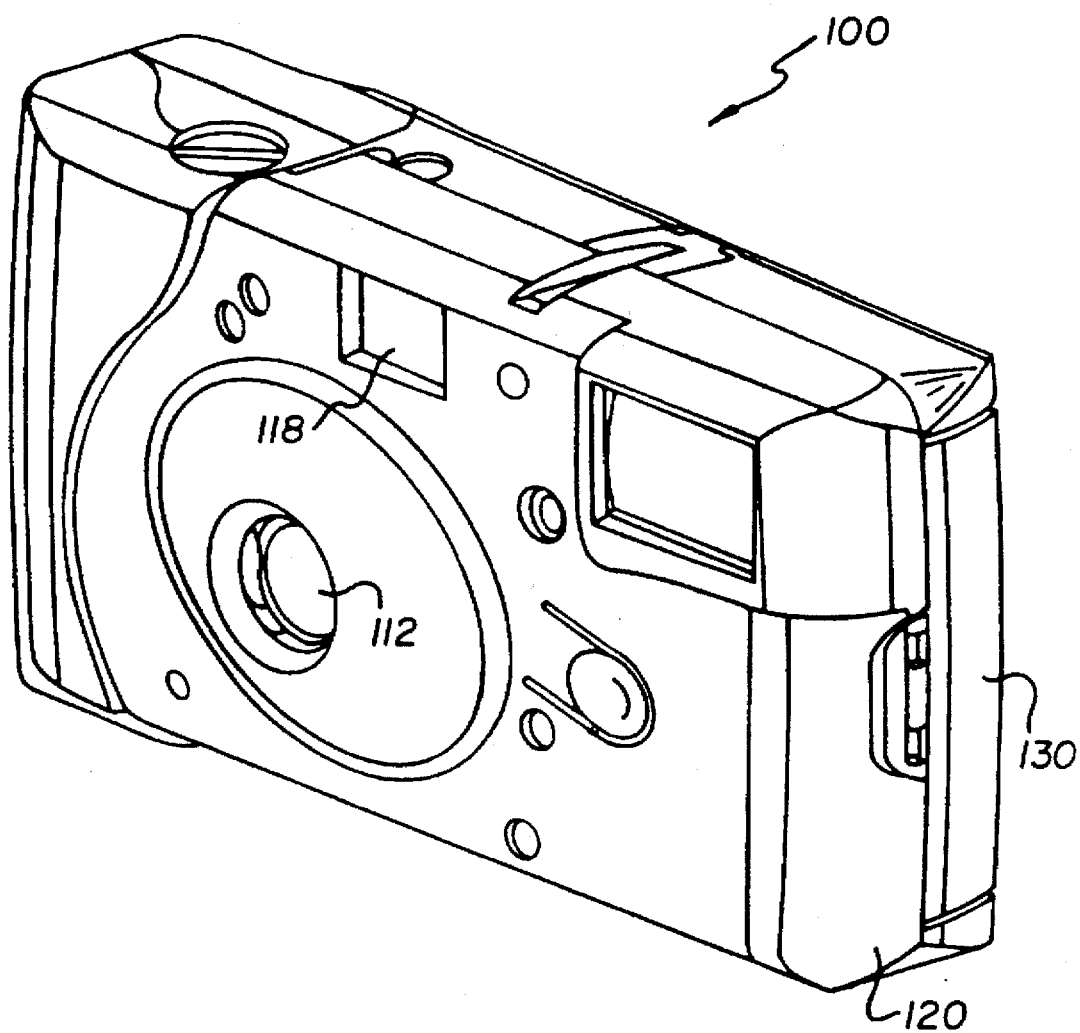
FIG. 20 is a front perspective view of the single-use camera 100 shown in FIGS. 1 and 19.
Figure 21:
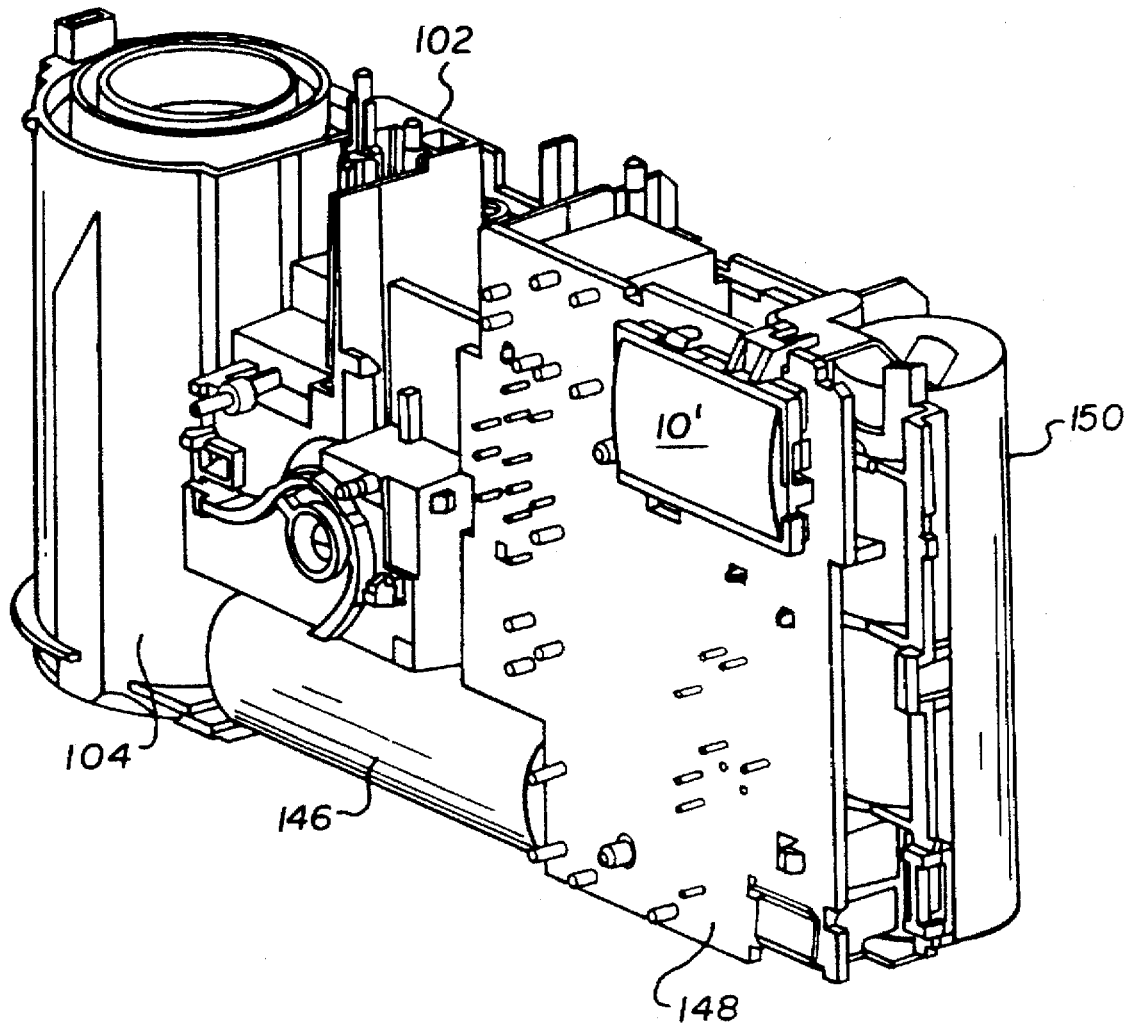
FIG. 21 is a partial front perspective view of the body of the single-use camera shown in FIGS. 19 and 20.
Figure 22:
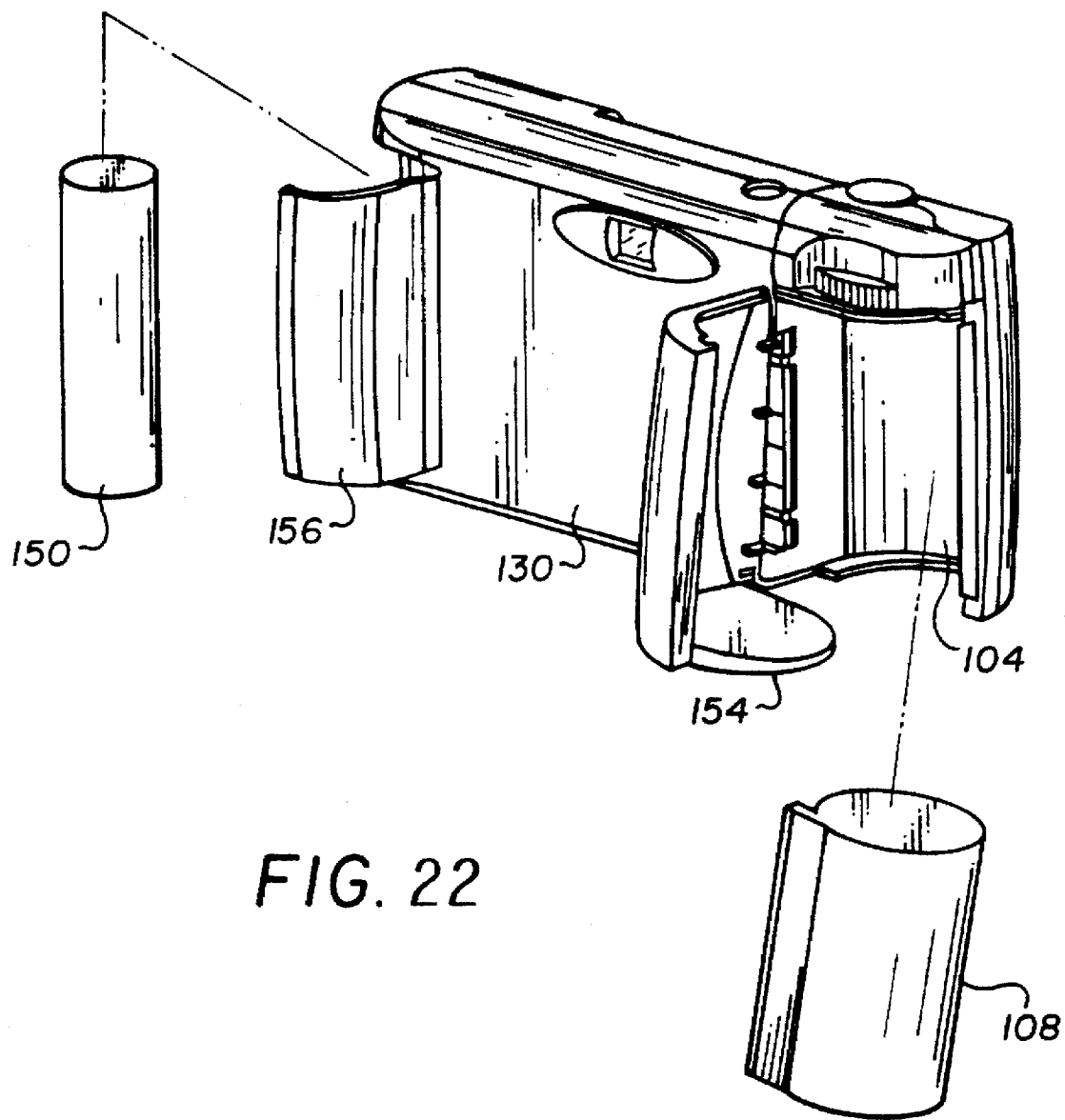
FIG. 22 is a partially exploded rear view of the camera shown in FIGS. 19–23.

FIG. 18F depicts heterochromatic through frequency MTF at three field points: axis, 0.7 relative field, and full field. Wavelengths used were 650 nm, 546.1 nm, and 440 nm with respective chromatic weights of 35, 50, and 15.

The following summarizes some of the most pertinent performance characteristics of the seventh, eighth, and ninth embodiments.

SPHERICAL ABERRATION (LSA)

LSA was calculated for each lens system at a wavelength of 546.1 nm.

| Embodiment Number | F-Number | Amount of Spherical Aberration | Number of Aspheres |
|---|---|---|---|
| 7th | 8.0 | .111 mm | 2 |
| 8th | 8.0 | .075 mm | 3 |
| 9th | 8.0 | .024 mm | 2 |

ASTIGMATISM

AMOUNT OF ASTIGMATISM*

| RELF | 7th Embodiment | 8th Embodiment | 9th Embodiment |
|---|---|---|---|
| 0 | 0 | 0 | 0 |
|  | .00 mm | .01 mm | .03 mm |
|  | .01 mm | .04 mm | .06 mm |
|  | .08 mm | .08 mm | .06 mm |
|  | .23 mm | .12 mm | .07 mm |
|  | .40 mm | .16 mm | .15 mm |
|  | .50 mm | .20 mm | .21 mm |
|  | .51 mm | .24 mm | .14 mm |
|  | .51 mm** | .28 mm** | .06 mm |
|  | .51 mm | .14 mm | .15 mm |
| 1.0 | .12 mm | .15 mm | .22 mm** |

*The amount of astigmatism is measured for each lens at a wavelength of 546.1 nm. These embodiments have an F-number at F/8. RELF means relative field.

**Indicates the worst astigmatism point in each lens.

LATERAL COLOR

Numbers shown below are the maximums for 440 nm to 650 nm. The maximum lateral color does not always occur at the edge of the field.

| Embodiment Number | Amount of Lateral Color | |
|---|---|---|
| 7th | .0079 mm | (maximum is at .6 relative field) |
| 8th | .0075 mm | (maximum is at .9 relative field) |
| 9th | .0121 mm | (maximum is at .7 relative field) |

MTF ANALYSIS

| Embodiment Number | F/Number | Axis | .7 Rel. Field | 1.0 Rel. Field | Full Field Angle |
|---|---|---|---|---|---|

-continued

| | MTF AT 5 LINES PER MILLIMETER* (TANGENTIAL/SAGITTAL) | | | | |
|---|---|---|---|---|---|
| 7th | 8.0 | 94.9 | 92.6/90.1 | 89.1/91.6 | ±35.8 DEG. |
| 8th | 8.0 | 94.6 | 92.0/90.6 | 82.9/92.6 | ±35.2 DEG. |
| 9th | 8.0 | 95.1 | 92.5/93.1 | 89.7/93.7 | ±31.5 DEG. |
| | MTF AT 20 LINES PER MILLIMETER* (TANGENTIAL/SAGITTAL) | | | | |
| 7th | 8.0 | 67.5 | 56.3/45.8 | 50.1/56.2 | ±35.8 DEG. |
| 8th | 8.0 | 64.8 | 58.5/52.4 | 41.7/59.4 | ±35.2 DEG. |
| 9th | 8.0 | 68.9 | 57.2/61.9 | 49.0/64.4 | ±31.5 DEG. |

*Heterochromatic MTF at best focus, wavelengths/weights used are 546.1 nm/50, 440 nm/15, and 650 nm/35.

The following (Tables 1–9) are the numerical examples of embodiments 1 through 9:

TABLE 1

| Surface | Clear Aperture | Axial Beam | Radius | Thickness | Index $N_d$ | V-Number $V_d$ |
|---|---|---|---|---|---|---|
| 1 | 7.05 | 2.70 | ASPHERE | 2.130 | 1.492 | 57.4 |
| 2 | 4.70 | 2.34 | ASPHERE | 1.700 | | |
| | 2.30 | 2.30 | DIAPHRAGM | 1.570 | | |
| 3 | 4.70 | 2.25 | −6.72200 | 1.780 | 1.492 | 57.4 |
| 4 | 6.35 | 2.41 | −4.69690 | | | |

LENS LENGTH 7.180
Where the radius of curvature for a surface, the axial thickness and air separations are measured in millimeters.
Aspheric Equation:

$$X = \frac{CY^2}{1+\sqrt{1-(k+1)C^2Y^2}} + DY^4 + EY^6 + FY^8 + GY^{10}$$

Surf. 1  C = 0.1794784  D = 0.5737500E−04  F = 0.1060700E−06
  k = 1.3880800  E = 0.8680000E−05  G = 0.6135300E−08
  VERTEX RADIUS (1/C) = 5.5717
Surf. 2  C = 0.1725209  D = 0.2122000E−03  F = −0.1845100E−04
  k = 4.3530000  E = 0.1111500E−03  G = 0.3731300E−06
  VERTEX RADIUS (1/C) = 5.7964

Notes:

1. EF = 21.63                F/No. = F/ 8.00
   Semi-Field = 38.69 Deg.   BF = 19.09
   Semi-Diag. = 17.17        FF = 16.72
   Format = 16.7 × 30.0      Best Focus = −.16
   Principal wavelength is 546 nm, achromatism: 440–650 nm.
   The plastic material having index $N_d$ and Abbe V-number of 1.492 and 57.4, respectively.

| Wavelength (Microns) | Refractive Index |
   |---|---|
   | 0.65000000 | 1.489394 |
   | 0.54610000 | 1.493777 |
   | 0.44000000 | 1.502120 |

2. Image surface is a cylinder with radius −90. Long dimension of image format is measured along cylinder radius of curvature.

| Image Height | Angular Field | Max. Aper. With No. Vignetting |
   |---|---|---|
   | 5.60 | 14.64 | F/ 8.0 |
   | 11.98 | 29.28 | F/ 8.0 |
   | 17.17 | 38.69 | F/ 8.0 |

| Pupil | Location | Diameter |
   |---|---|---|
   | Entrance | 3.92 | 2.70 |
   | Exit | −3.58 | 2.83 |

3. MTF data is at best focus along diagonal of the above image format using wavelengths 650, 546.1, and 440 nm, with respective weights .35, .5, and .15:

TABLE 1-continued

| | | | Percent Field (Sagittal/Tangential) | | | | | |
|---|---|---|---|---|---|---|---|---|
| F/No. | L/MM | Axis | 38% | 57% | 71% | 86% | 95% | 100% |
| 8.0 | 7. | 92 | 92/91 | 89/90 | 87/89 | 89/86 | 91/83 | 90/80 |
| 8.0 | 12.5 | 92 | 82/79 | 76/78 | 72/77 | 75/72 | 79/68 | 78/65 |
| 8.0 | 22. | 62 | 67/57 | 57/58 | 52/59 | 57/56 | 61/50 | 59/45 |

TABLE 2

| Surface | Clear Aperture | Axial Beam | Radius | Thickness | Index $N_d$ | V-Number $V_d$ |
|---|---|---|---|---|---|---|
| 1 | 7.06 | 2.70 | ASPHERE | 2.210 | 1.492 | 57.4 |
| 2 | 4.63 | 2.32 | ASPHERE | 1.700 | | |
| | 2.28 | 2.28 | DIAPHRAGM | 1.500 | | |
| 3 | 4.64 | 2.24 | −6.38860 | 1.810 | 1.492 | 57.4 |
| 4 | 6.23 | 2.42 | −4.49680 | | | |

LENS LENGTH 7.220
Where the radius of curvature for a surface, the axial thickness and air separations are measured in millimeters.
Aspheric Equation:

$$X = \frac{CY^2}{1+\sqrt{1-(k+1)C^2Y^2}} + DY^4 + EY^6 + FY^8 + GY^{10} + HY^{12} + IY^{14}$$

Surf. 1  C = 0.1837695  D = 0.3026600E−03  G = −0.1489700E−05
  k = 1.2941400  E = −0.6690900E−04  H = 0.6267200E−07
  F = 0.1536100E−04  I = −0.4329200E−09
  VERTEX RADIUS (1/C) = 5.4416
Surf. 2  C = 0.1828588  D = 0.2875800E−03  G = 0.6958700E−5
  k = 3.9063400  E = 0.2252700E−03  H = 0.
  F = −0.6157600E−04  I = 0.
  VERTEX RADIUS (1/C) = 5.4687

Notes:

1. EF = 21.63                F/No. = F/ 8.00
   Semi-Field = 38.39 Deg.   BF = 19.20
   Semi-Diag. = 17.17        FF = 16.53
   Format = 16.7 × 30.0      Best Focus = −.31
   Principal wavelength is 546 nm, achromatism: 440–650 nm.
   The plastic material having index $N_d$ and Abbe V-number of 1.492 and 57.4, respectively.

| Wavelength (Microns) | Refractive Index |
   |---|---|
   | 0.65000000 | 1.489394 |
   | 0.54610000 | 1.493777 |
   | 0.44000000 | 1.502120 |

2. Image surface is a cylinder with radius −120. Long dimension of image format is measured along cylinder radius of curvature.

| Image Height | Angular Field | Max. Aper. With No. Vignetting |
   |---|---|---|
   | 5.52 | 14.50 | F/ 8.0 |
   | 11.88 | 29.01 | F/ 8.0 |
   | 17.17 | 38.39 | F/ 8.0 |

| Pupil | Location | Diameter |
   |---|---|---|
   | Entrance | 4.03 | 2.70 |
   | Exit | −3.55 | 2.84 |

3. MTF data is at best focus along diagonal of the above image format using wavelengths 650, 546.1, and 440 nm, with respective weights .35, .5, and .15:

TABLE 2-continued

| | | | Percent Field (Sagittal/Tangential) | | | | | |
|---|---|---|---|---|---|---|---|---|
| F/No. | L/MM | Axis | 38% | 57% | 71% | 86% | 95% | 100% |
| 8.0 | 7. | 91 | 92/91 | 89/90 | 87/89 | 88/85 | 90/81 | 90/77 |
| 8.0 | 12.5 | 80 | 82/78 | 76/78 | 71/76 | 74/72 | 77/66 | 78/63 |
| 8.0 | 22. | 56 | 67/56 | 57/58 | 51/58 | 54/53 | 60/46 | 58/42 |

TABLE 3

| Surface | Clear Aperture | Axial Beam | Radius | Thickness | Index $N_d$ | V-Number $V_d$ |
|---|---|---|---|---|---|---|
| 1 | 6.70 | 3.00 | ASPHERE | 1.920 | 1.492 | 57.4 |
| 2 | 4.67 | 2.62 | ASPHERE | 1.700 | | |
| | 2.56 | 2.56 | DIAPHRAGM | 1.820 | | |
| 3 | 5.01 | 2.50 | −6.38860 | 1.700 | 1.492 | 57.4 |
| 4 | 6.45 | 2.67 | −4.85200 | | | |

LENS LENGTH 7.140
Where the radius of curvature for a surface, the axial thickness and air separations are measured in millimeters.
Aspheric Equation:

$$X = \frac{CY^2}{1+\sqrt{1-(k+1)C^2Y^2}} + DY^4 + EY^6 + FY^8 + GY^{10}$$

Surf. 1  $C = 0.1860829$   $D = 0.4563300E{-}04$   $F = -0.1104300E{-}05$
         $k = 1.3447300$   $E = 0.1387300E{-}04$   $G = 0.9467400E{-}07$
         VERTEX RADIUS (1/C) = 5.37395
Surf. 2  $C = 0.1744957$   $D = 0.2069600E{-}03$   $F = -0.3658300E{-}04$
         $k = 3.9307700$   $E = 0.1545600E{-}03$   $G = 0.4191200E{-}05$
         VERTEX RADIUS (1/C) = 5.7308

Notes:

1. EF = 24.00                     F/No. = F/ 8.00
   Semi-Field = 35.90 Deg.        BF = 21.13
   Semi-Diag. = 17.17             FF = 19.40
   Format = 16.7 × 30.0           Best Focus = −.12
   Principal wavelength is 546 nm, achromatism: 440–650 nm.
   The plastic material having index $N_d$ and Abbe V-number of 1.492 and 57.4, respectively.

| Wavelength (Microns) | Refractive Index |
|---|---|
| 0.65000000 | 1.489394 |
| 0.54610000 | 1.493777 |
| 0.44000000 | 1.502120 |

2. Image surface is a cylinder with radius −90. Long dimension of image format is measured along cylinder radius of curvature.

| Image Height | Angular Field | Max. Aper. With No. Vignetting |
|---|---|---|
| 5.69 | 13.43 | F/ 8.0 |
| 12.03 | 26.87 | F/ 8.0 |
| 17.17 | 35.90 | F/ 8.0 |

| Pupil | Location | Diameter |
|---|---|---|
| Entrance | 3.71 | 3.00 |
| Exit | −3.79 | 3.11 |

3. MTF data is at best focus along diagonal of the above image format using wavelengths 650, 546.1, and 440 nm, with respective weights .35, .5, and .15:

| | | | Percent Field (Sagittal/Tangential) | | | | | |
|---|---|---|---|---|---|---|---|---|
| F/No. | L/MM | Axis | 38% | 57% | 71% | 86% | 95% | 100% |
| 8.0 | 7. | 92 | 90/91 | 88/90 | 86/89 | 87/87 | 89/84 | 90/83 |
| 8.0 | 12.5 | 81 | 79/79 | 73/78 | 70/76 | 71/73 | 76/70 | 77/68 |
| 8.0 | 22. | 63 | 63/60 | 56/59 | 51/59 | 53/55 | 59/53 | 60/51 |

TABLE 4

| Surface | Clear Aperture | Axial Beam | Radius | Thickness | Index $N_d$ | V-Number $V_d$ |
|---|---|---|---|---|---|---|
| 1 | 6.68 | 3.00 | ASPHERE | 1.970 | 1.492 | 57.4 |
| 2 | 4.60 | 2.60 | ASPHERE | 1.700 | | |
| | 2.54 | 2.54 | DIAPHRAGM | 1.720 | | |
| 3 | 4.81 | 2.49 | −6.04290 | 1.720 | 1.492 | 57.4 |
| 4 | 6.29 | 2.67 | −4.66120 | | | |

LENS LENGTH 7.110
Where the radius of curvature for a surface, the axial thickness and air separations are measured in millimeters.
Aspheric Equation:

$$X = \frac{CY^2}{1+\sqrt{1-(k+1)C^2Y^2}} + DY^4 + EY^6 + FY^8 + GY^{10}$$

Surf. 1  $C = 0.1914931$   $D = 0.5497140E{-}04$   $F = -0.1457210E{-}05$
         $k = 1.2600400$   $E = 0.1622360E{-}04$   $G = 0.1170740E{-}06$
         VERTEX RADIUS (1/C) = 5.22212
Surf. 2  $C = 0.1830794$   $D = 0.2125880E{-}03$   $F = -0.3892640E{-}04$
         $k = 3.7153600$   $E = 0.1570810E{-}03$   $G = 0.4460260E{-}05$
         VERTEX RADIUS (1/C) = 5.46211

Notes:

1. EF = 24.00                     F/No. = F/ 8.00
   Semi-Field = 35.50 Deg.        BF = 21.17
   Semi-Diag. = 17.17             FF = 19.36
   Format = 16.7 × 30.0           Best Focus = −.12
   Principal wavelength is 546 nm, achromatism: 440–650 nm.
   The plastic material having index $N_d$ and Abbe V-number of 1.492 and 57.4, respectively.

| Wavelength (Microns) | Refractive Index |
|---|---|
| 0.65000000 | 1.489394 |
| 0.54610000 | 1.493777 |
| 0.44000000 | 1.502120 |

2. Image surface is a cylinder with radius −120. Long dimension of image format is measured along cylinder radius of curvature.

| Image Height | Angular Field | Max. Aper. With No. Vignetting |
|---|---|---|
| 5.63 | 13.27 | F/ 8.0 |
| 11.95 | 26.54 | F/ 8.0 |
| 17.17 | 35.50 | F/ 8.0 |

| Pupil | Location | Diameter |
|---|---|---|
| Entrance | 3.79 | 3.00 |
| Exit | −3.70 | 3.11 |

3. MTF data is at best focus along diagonal of the above image format using wavelengths 650, 546.1, and 440 nm, with respective weights .35, .5, and .15:

| | | | Percent Field (Sagittal/Tangential) | | | | | |
|---|---|---|---|---|---|---|---|---|
| F/No. | L/MM | Axis | 38% | 57% | 71% | 86% | 95% | 100% |
| 8.0 | 7. | 91 | 90/90 | 87/90 | 85/88 | 85/86 | 87/83 | 88/81 |
| 8.0 | 12.5 | 81 | 78/79 | 71/77 | 67/76 | 68/71 | 73/68 | 75/64 |
| 8.0 | 22. | 63 | 63/60 | 54/58 | 48/57 | 48/54 | 55/50 | 57/47 |

TABLE 5

| Surface | Clear Aperture | Axial Beam | Radius | Thickness | Index $N_d$ | V-Number $V_d$ |
|---|---|---|---|---|---|---|
| 1 | 6.83 | 2.27 | ASPHERE | 2.096 | 1.492 | 57.4 |
| 2 | 4.63 | 1.98 | ASPHERE | 1.700 | | |
| | 1.89 | 1.89 | DIAPHRAGM | 1.495 | | |
| 3 | 4.47 | 1.81 | −9.44980 | 1.633 | 1.590 | 30.9 |
| 4 | 6.13 | 1.87 | −7.56870 | | | |

TABLE 5-continued

LENS LENGTH 6.924
Where the radius of curvature for a surface, the axial thickness and air separations are measured in millimeters.
Aspheric Equation:

$$X = \frac{CY^2}{1 + \sqrt{1-(k+1)C^2Y^2}} + DY^4 + EY^6 + FY^8 + GY^{10} + HY^{12} + IY^{14} + JY^{16} + KY^{18}$$

Surf. 1  C = 0.1807068   D = −0.3280856E-03   H = −0.3227695E-07
         k = 1.2344171   E = 0.3195396E-04    I = −0.1757111E-08
                         F = −0.9249910E-05   J = 0.1697079E-09
                         G = 0.9636781E-06    K = −0.4888296E-11
         VERTEX RADIUS (1/C) = 5.5338259
Surf. 2  C = 0.1472153   D = 0.                H = 0.1724156E-06
         k = 4.7899866   E = 0.                I = −0.1222265E-06
                         F = 0.                J = −0.1437650E-07
                         G = 0.4785053E-05    K = 0.4033898E-08
         VERTEX RADIUS (1/C) = 6.7927722

Notes:

1. EF = 25.00                        F/No. = F/ 11.00
   Semi-Field = 37.47 Deg.           BF = 20.44
   Semi-Diag. = 19.39                FF = 22.78
   Format = 36.4 × 13.3              Best Focus = +.21
   Principal wavelength is 546 nm, achromatism: 440–650 nm.
   The plastic material having index $N_d$ and Abbe V-number of 1.492 and 57.4, respectively.

| Wavelength (Microns) | Refractive Index |
   |---|---|
   | 0.65000000 | 1.489394 |
   | 0.54610000 | 1.493777 |
   | 0.44000000 | 1.502120 |

The plastic material having index $N_d$ and Abbe V-number of 1.590 and 30.9, respectively.

| Wavelength (Microns) | Refractive Index |
   |---|---|
   | 0.65000000 | 1.585337 |
   | 0.54610000 | 1.594949 |
   | 0.44000000 | 1.614252 |

2. Image surface is a cylinder with radius −120. Long dimension of image format is measured along cylinder radius of curvature.

| Image Height | Angular Field | Max. Aper. With No. Vignetting |
   |---|---|---|
   | 6.34 | 14.11 | F/ 11.0 |
   | 13.46 | 28.21 | F/ 11.0 |
   | 19.39 | 37.47 | F/ 11.0 |

| Pupil | Location | Diameter |
   |---|---|---|
   | Entrance | 3.94 | 2.28 |
   | Exit | −2.94 | 2.13 |

TABLE 6

| Surface | Clear Aperture | Axial Beam | Radius | Thickness | Index $N_d$ | V-Number $V_d$ |
|---|---|---|---|---|---|---|
| 1 | 6.82 | 3.00 | ASPHERE | 2.015 | 1.492 | 57.4 |
| 2 | 5.16 | 2.62 | ASPHERE | 1.552 | | |
|   | 2.40 | 2.40 | DIAPHRAGM | 2.181 | | |
| 3 | 5.00 | 2.07 | ASPHERE | 2.436 | 1.590 | 30.9 |
| 4 | 7.84 | 2.22 | ASPHERE | | | |

LENS LENGTH 8.184
Where the radius of curvature for a surface, the axial thickness and air separations are measured in millimeters.
Aspheric Equation:

TABLE 6-continued $$X = \frac{CY^2}{1 + \sqrt{1-(k+1)C^2Y^2}} + DY^4 + EY^6 + FY^8 + GY^{10} + HY^{12} + IY^{14}$$

Surf. 1  C = 0.1924613    D = −0.1770210E-03   G = 0.7303340E-08
         k = 0.3904830    E = −0.2260400E-05   H = 0.
                          F = −0.2492010E-06   I = 0.
         VERTEX RADIUS (1/C) = 5.19585
Surf. 2  C = 0.1076584    D = 0.1590450E-03    G = 0.
         k = −0.7312000   E = 0.3218400E-04    H = 0.
                          F = 0.               I = 0.
         VERTEX RADIUS (1/C) = 9.28864
Surf. 3  C = −0.1873389   D = −0.2324660E-02   G = 0.3449830E-04
         k = 0.           E = 0.1303100E-03    H = −0.4184760E-05
                          F = −0.1572430E-03   I = 0.1503290E-06
         VERTEX RADIUS (1/C) = −5.33792
Surf. 4  C = −0.1602289   D = −0.4250590E-03   G = −0.1037200E-05
         k = 0.           E = −0.5213140E-04   H = 0.6698500E-07
                          F = 0.6610300E-05    I = −0.1945210E-08
         VERTEX RADIUS (1/C) = −6.24107

Notes:

1. EF = 24.00                       F/No. = F/ 8.00
   Semi-Field = 35.06 Deg.          BF = 17.60
   Semi-Diag. = 17.17               FF = 21.96
   Format = 16.7 × 30.0             Best Focus = −.03
   Principal wavelength is 546 nm, achromatism: 440–650 nm.
   The plastic material having index $N_d$ and Abbe V-number of 1.492 and 57.4, respectively.

| Wavelength (Microns) | Refractive Index |
   |---|---|
   | 0.65000000 | 1.489394 |
   | 0.54610000 | 1.493777 |
   | 0.44000000 | 1.502120 |

The plastic material having index $N_d$ and Abbe V-number of 1.590 and 30.9, respectively.

| Wavelength (Microns) | Refractive Index |
   |---|---|
   | 0.65000000 | 1.585337 |
   | 0.54610000 | 1.594949 |
   | 0.44000000 | 1.614252 |

2. Image surface is a cylinder with radius −120. Long dimension of image format is measured along cylinder radius of curvature.

| Image Height | Angular Field | Max. Aper. With No. Vignetting |
   |---|---|---|
   | 5.58 | 13.07 | F/ 8.0 |
   | 11.90 | 26.14 | F/ 8.0 |
   | 17.17 | 35.06 | F/ 8.0 |

| Pupil | Location | Diameter |
   |---|---|---|
   | Entrance | 3.78 | 3.01 |
   | Exit | −4.78 | 2.81 |

TABLE 7

| Surface | Clear Aperture | Axial Beam | Radius | Thickness | Index $N_d$ | V-Number $V_d$ |
|---|---|---|---|---|---|---|
| 1 | 8.11 | 3.00 | ASPHERE | 2.850 | 1.492 | 57.4 |
| 2 | 5.03 | 2.60 | ASPHERE | 1.700 | | |
|   | 2.55 | 2.55 | DIAPHRAGM | 1.764 | | |
| 3 | 5.12 | 2.50 | −7.93827 | 2.000 | 1.492 | 57.4 |
| 4 | 6.83 | 2.66 | −5.37793 | | | |

LENS LENGTH 8.314
Where the radius of curvature for a surface, the axial thickness and air separations are measured in millimeters.
Aspheric Equation:

TABLE 7-continued $$X = \frac{CY^2}{1+\sqrt{1-(k+1)C^2Y^2}} + DY^4 + EY^6 + FY^8 + GY^{10} + HY^{12} + IY^{14} + JY^{16} + KY^{18}$$

Surf. 1  C = 0.1375124   D = 0.2975986E-03   H = -0.5338952E-08
         k = 0.9855269   E = -0.1802293E-04  I = 0.7213138E-09
                         F = 0.5067433E-05   J = 0.3634665E-10
                         G = -0.2582161E-06  K = -0.2374518E-11
VERTEX RADIUS (1/C) = 7.27207

Surf. 2  C = 0.1292569   D = 0.1026159E-02   H = 0.1958292E-05
         k = 2.5571032   E = 0.2197372E-03   I = -0.2254705E-06
                         F = -0.3899092E-04  J = 0.
                         G = 0.5965716E-06   K = 0.
VERTEX RADIUS (1/C) = 7.73653

Notes:

1. EF = 24.00                          F/No. = F/ 8.00
   Semi-Field = 35.84 Deg.             BF = 21.12
   Semi-Diag. = 17.17                  FF = 18.43
   Format = 16.7 × 30.0                Best Focus = -.11
   Principal wavelength is 546 nm, achromatism: 440–650 nm.
   The plastic material having index $N_d$ and Abbe V-number of
   1.492 and 57.4, respectively.

| Wavelength (Microns) | Refractive Index |
|---|---|
| 0.65000000 | 1.489394 |
| 0.54610000 | 1.493777 |
| 0.44000000 | 1.502120 |

2. Image surface is a cylinder with radius -90. Long dimension of
   image format is measured along cylinder radius of curvature.

| Image Height | Angular Field | Max. Aper. With No. Vignetting |
|---|---|---|
| 5.69 | 13.41 | F/ 8.0 |
| 12.00 | 26.82 | F/ 8.0 |
| 17.17 | 35.84 | F/ 8.0 |

| Pupil | Location | Diameter |
|---|---|---|
| Entrance | 4.49 | 3.00 |
| Exit | -4.01 | 3.14 |

3. MTF data is at best focus along the diagonal of the above image
   format using wavelengths 650, 546.1, and 440 nm, with
   respective weights .35, .5, and .15:

Nominal lens system.

Percent Field (Sagittal/Tangential)

| F/No. | L/MM | Axis | 38% | 57% | 71% | 86% | 95% | 100% |
|---|---|---|---|---|---|---|---|---|
| 8.0 | 7. | 92 | 91/91 | 87/89 | 84/88 | 83/82 | 85/83 | 87/83 |
| 8.0 | 12.5 | 82 | 80/79 | 71/76 | 65/74 | 64/69 | 68/69 | 72/68 |
| 8.0 | 22. | 64 | 64/57 | 52/52 | 43/51 | 42/50 | 48/50 | 53/46 |

The lens system MTF with the lens system having a +.025 mm
decenter on surface 1.

Percent Field (Sagittal/Tangential)

| F/No. | L/MM | Axis | 38% | 57% | 71% | 86% | 95% | 100% |
|---|---|---|---|---|---|---|---|---|
| 8.0 | 7. | 92/92 | 90/91 | 85/89 | 82/85 | 80/74 | 83/73 | 85/78 |
| 8.0 | 12.5 | 82/81 | 79/79 | 68/76 | 60/72 | 58/60 | 63/52 | 68/57 |

The lens system MTF with the lens system having a -.025 mm
decenter on surface 1.

Percent Field (Sagittal/Tangential)

| F/No. | L/MM | Axis | 38% | 57% | 71% | 86% | 95% | 100% |
|---|---|---|---|---|---|---|---|---|
| 8.0 | 7. | 92/92 | 91/89 | 88/85 | 86/82 | 86/80 | 87/80 | 88/78 |
| 8.0 | 12.5 | 82/81 | 80/73 | 74/65 | 69/58 | 69/57 | 72/58 | 74/53 |

TABLE 8

| Surface | Clear Aperture | Axial Beam | Radius | Thickness | Index $N_d$ | V-Number $V_d$ |
|---|---|---|---|---|---|---|
| 1 | 7.80 | 3.00 | ASPHERE | 2.850 | 1.492 | 57.4 |
| 2 | 5.23 | 2.51 | 9.94649 | 1.517 | | |
|   | 2.31 | 2.31 | DIAPHRAGM | 1.883 | | |
| 3 | 4.88 | 2.05 | ASPHERE | 2.500 | 1.590 | 30.9 |
| 4 | 7.74 | 2.17 | ASPHERE | | | |

LENS LENGTH 8.750

Where the radius of curvature for a surface, the axial thickness and air
separations are measured in millimeters.

Aspheric Equation:

$$X = \frac{CY^2}{1+\sqrt{1-(k+1)C^2Y^2}} + DY^4 + EY^6 + FY^8 + GY^{10} + HY^{12} + IY^{14} + JY^{16} + KY^{18}$$

Surf. 1  C = 0.1748686   D = 0.             H = 0.
         k = 0.1739281   E = 0.             I = 0.
                         F = 0.             J = 0.
                         G = 0.             K = 0.
VERTEX RADIUS (1/C) = 5.71858

Surf. 3  C = -0.1667150  D = -0.1173103E-02  H = -0.1248107E-05
         k = 0.7696216   E = -0.2937716E-03  I = 0.4331939E-07
                         F = 0.4321027E-04   J = 0.3983943E-07
                         G = -0.4805751E-05  K = -0.3217884E-08
VERTEX RADIUS (1/C) = -5.99826

Surf. 4  C = -0.1508910  D = -0.1622863E-03  H = 0.1499098E-07
         k = 0.5900456   E = -0.2936541E-04  I = -0.4056008E-09
                         F = 0.9085097E-06   J = -0.7309910E-10
                         G = -0.1776793E-06  K = 0.3466098E-11
VERTEX RADIUS (1/C) = -6.62730

Notes:

1. EF = 24.00                          F/No. = F/ 8.00
   Semi-Field = 35.15 Deg.             BF = 17.24
   Semi-Diag. = 17.17                  FF = 21.96
   Format = 16.7 × 30.0                Best Focus = -.07
   Principal wavelength is 546 nm, achromatism: 440–650 nm.
   The plastic material having index $N_d$ and Abbe V-number of
   1.492 and 57.4, respectively.

| Wavelength (Microns) | Refractive Index |
|---|---|
| 0.65000000 | 1.489394 |
| 0.54610000 | 1.493777 |
| 0.44000000 | 1.502120 |

The plastic material having index $N_d$ and Abbe V-number of
1.590 and 30.9, respectively.

| Wavelength (Microns) | Refractive Index |
|---|---|
| 0.65000000 | 1.585337 |
| 0.54610000 | 1.594949 |
| 0.44000000 | 1.614252 |

2. Image surface is a cylinder with radius -120. Long dimension of
   image format is measured along cylinder radius of curvature.

| Image Height | Angular Field | Max. Aper. With No. Vignetting |
|---|---|---|
| 5.59 | 13.12 | F/ 8.0 |
| 11.93 | 26.24 | F/ 8.0 |
| 17.17 | 35.15 | F/ 8.0 |

| Pupil | Location | Diameter |
|---|---|---|
| Entrance | 4.65 | 3.01 |
| Exit | -4.40 | 2.71 |

3. MTF data is at best focus along the diagonal of the above
   image format using wavelengths 650, 546.1, and 440 nm,
   with respective weights .35, .5, and .15.
   This lens formula was designed to have minimum MTF image
   degradation for a .025 mm shift of the first surface on the

TABLE 8-continued biaspheric element relative to the second surface of the biaspheric element.

Nominal lens system.

|  |  |  | Percent Field (Sagittal/Tangential) |  |  |  |  |  |
|---|---|---|---|---|---|---|---|---|
| F/No. | L/MM | Axis | 38% | 57% | 71% | 86% | 95% | 100% |
| 8.0 | 7. | 92 | 90/91 | 87/90 | 86/88 | 88/79 | 89/71 | 90/79 |
| 8.0 | 12.5 | 81 | 79/80 | 72/78 | 70/75 | 73/63 | 77/52 | 78/61 |
| 8.0 | 22. | 64 | 64/62 | 54/60 | 51/56 | 56/44 | 60/36 | 60/44 |

Perturbed lens system with +.025 mm decenter on surface 3.

|  |  |  | Percent Field (Sagittal/Tangential) |  |  |  |  |  |
|---|---|---|---|---|---|---|---|---|
| F/No. | L/MM | Axis | 38% | 57% | 71% | 86% | 95% | 100% |
| 8.0 | 7. | 92/91 | 90/90 | 86/88 | 85/86 | 86/74 | 88/66 | 89/75 |
| 8.0 | 12.5 | 81/80 | 78/79 | 70/75 | 67/73 | 71/58 | 76/46 | 78/55 |

Perturbed lens system with −.025 mm decenter on surface 3.

|  |  |  | Percent Field (Sagittal/Tangential) |  |  |  |  |  |
|---|---|---|---|---|---|---|---|---|
| F/No. | L/MM | Axis | 38% | 57% | 71% | 86% | 95% | 100% |
| 8.0 | 7. | 92/91 | 90/90 | 88/89 | 87/86 | 88/80 | 90/73 | 90/80 |
| 8.0 | 12.5 | 81/80 | 79/78 | 73/75 | 72/69 | 75/61 | 77/54 | 77/61 |

TABLE 9

| Surface | Clear Aperture | Axial Beam | Radius | Thickness | Index $N_d$ | V-Number $V_d$ |
|---|---|---|---|---|---|---|
| 1 | 9.98 | 3.50 | 6.57522 | 3.330 | 1.498 | 67.0 |
| 2 | 7.49 | 2.92 | 12.3004 | 2.812 |  |  |
|  | 2.50 | 2.50 | DIAPHRAGM | 2.852 |  |  |
| 3 | 5.94 | 2.07 | ASPHERE | 2.920 | 1.590 | 30.9 |
| 4 | 9.24 | 2.18 | ASPHERE |  |  |  |

LENS LENGTH 11.914

Where the radius of curvature for a surface, the axial thickness and air separations are measured in millimeters.
The front element is BK10 glass. The second element is polystyrene.
A plus 30 degree celsius temperature change causes a −.02 mm image distance change. The thermal expansion and refractive index coefficients used for BK10 are 5.8E-06 mm per mm per degree celsius and 3.5E-06 per degree celsius, respectively. The thermal expansion and refractive index coefficients used for polystyrene are 7.2E-05 mm per mm per degree celsius and −13E-05 per degree celsius, respectively.

Aspheric Equation:

$$X = \frac{CY^2}{1 + \sqrt{1 - (k+1)C^2Y^2}} + DY^4 + EY^6 + FY^8 + GY^{10} + HY^{12} + IY^{14}$$

Surf. 3  C = −0.1639393  D = −0.1352420E-02  G = −0.1386870E-05
k = 0.  E = −0.1164530E-03  H = −0.1526140E-07
F = 0.7685050E-05  I = 0.
VERTEX RADIUS (1/C) = −6.09982

Surf. 4  C = −0.1388098  D = −0.6652480E-03  G = −0.4537740E-06
k = −1.  E = −0.4647250E-04  H = 0.1959480E-07
F = 0.4762720E-05  I = −0.3859810E-09
VERTEX RADIUS (1/C) = −7.2041

Notes:

1. EF = 28.00  F/No. = F/ 8.00
Semi-Field = 31.46 Deg.  BF = 17.38
Semi-Diag. = 17.17  FF = 25.96
Format = 16.7 × 30.0  Best Focus = +.00
Principal wavelength is 546 nm, achromatism: 440−650 nm.
The plastic material having index $N_d$ and Abbe V-number of 1.590 and 30.9, respectively.
Wavelength

TABLE 9-continued

| (Microns) | Refractive Index |
|---|---|
| 0.65000000 | 1.585337 |
| 0.54610000 | 1.594949 |
| 0.44000000 | 1.614252 |

2. Image surface is a cylinder with radius −120. Long dimension of image format is measured along cylinder radius of curvature.

| Image Height | Angular Field | Max. Aper. With No. Vignetting |
|---|---|---|
| 5.75 | 11.59 | F/ 8.0 |
| 12.04 | 23.18 | F/ 8.0 |
| 17.17 | 31.46 | F/ 8.0 |

| Pupil | Location | Diameter |
|---|---|---|
| Entrance | 7.42 | 3.51 |
| Exit | −6.11 | 2.94 |

3. MTF data is at best focus along the diagonal of the above image format using wavelengths 650, 546.1, and 440 nm, with respective weights .35, .5, and .15.
This lens formula was designed to have minimum MTF image degradation for a .025 mm shift of the first surface on the biaspheric element relative to the second surface of the biaspheric element.

Nominal lens system.

|  |  |  | Percent Field (Sagittal/Tangential) |  |  |  |  |  |
|---|---|---|---|---|---|---|---|---|
| F/No. | L/MM | Axis | 38% | 57% | 71% | 86% | 95% | 100% |
| 8.0 | 7. | 92 | 91/91 | 90/89 | 89/88 | 90/86 | 90/84 | 90/84 |
| 8.0 | 12.5 | 83 | 81/80 | 78/76 | 77/74 | 77/71 | 78/69 | 80/66 |
| 8.0 | 22. | 66 | 66/62 | 61/57 | 60/54 | 61/52 | 62/50 | 62/44 |

Perturbed lens system with +.025 mm decenter on surface 3.

|  |  |  | Percent Field (Sagittal/Tangential) |  |  |  |  |  |
|---|---|---|---|---|---|---|---|---|
| F/No. | L/MM | Axis | 38% | 57% | 71% | 86% | 95% | 100% |
| 8.0 | 7. | 92/92 | 91/90 | 89/88 | 88/86 | 88/82 | 88/79 | 89/82 |
| 8.0 | 12.5 | 82/82 | 80/79 | 76/74 | 74/69 | 74/65 | 75/62 | 77/67 |

Perturbed lens system with −.025 mm decenter on surface 3.

|  |  |  | Percent Field (Sagittal/Tangential) |  |  |  |  |  |
|---|---|---|---|---|---|---|---|---|
| F/No. | L/MM | Axis | 38% | 57% | 71% | 86% | 95% | 100% |
| 8.0 | 7. | 92/92 | 92/90 | 90/87 | 90/85 | 90/83 | 90/81 | 90/77 |
| 8.0 | 12.5 | 82/82 | 81/77 | 79/71 | 78/67 | 79/61 | 79/59 | 79/51 |

A Method of Desensitizing The Lens System Containing A Biaspheric Lens Element To The Aspheric Decenter Typically, a lens system is designed with field angles covering only half of the image because of lens symmetry (from axis to one edge of the image). For a cylindrical film format, one can choose the best fit spherical radius to the corner of the cylinder format for the image surface in the design. (However, in this specification, the film radius described for the preferred embodiments is the actual cylinder radius, not the best fit corner radius used to do the design.)

A lens system with a biaspheric lens element, is difficult to manufacture due to the sensitivity of the lens system to the displacement of one of the aspheric surfaces of such a lens element relative to the other surface. Typically, a decenter Δ of 0.025 mm, which is a reasonable molding tolerance, causes a noticeable loss in MTF (Modulation Transfer Function) in the image as you move away from the axis. Molding to tighter tolerances increases the cost of the element.

A desensitizing procedure was used to design the seventh, eighth, and ninth embodiments. A decenter of 0.025 mm was inserted during the lens design procedure on the first (i.e. front-most) surface of the biaspheric element. All other surfaces were centered on a common axis (i.e. 0.025 mm from where the first biaspheric surface is decentered to). To optimize with the assumed manufacturing decenter (tolerance), one must trace rays over the whole image, that is, plus and minus field angles.

For the embodiments 7, 8 and 9, axis,±30% field,±70% field, and±100% field were used for optimization. In addition,±50% field was used to optimize embodiments 8 and 9 and additionally,±90% field was used to optimize the embodiment 9. When the design program reaches a solution, it balances the performance of the upper and lower fields so that when the decenter in the design is removed, the undecentered solution is still good.

Tables 7–9, notes 3, document the performance of the desensitized embodiments.

For the seventh embodiment, which was desensitized for biaspheric sensitivity as described above, the 71% field heterochromatic MTF performance along the diagonal went from 65/74 (sagittal/tangential) at 12.5 lines per millimeter to 60/72 (sagittal/tangential) with a±0.025 mm decenter and 69/58 (sagittal/tangential) with a−0.025 mm decenter. This is much less MTF image degradation than a typical undesensitized lens would produce. The heterochromatic wavelength weights used are 546 nm/50, 440 nm/15, and 650 nm/35. For this analysis, positive (i.e. uphill) field angle rays were traced.

For the eighth embodiment, which is also desensitized for biaspheric sensitivity as described above, the 71% field heterochromatic MTF performance went from 70/75 (sagittal/tangential) at 12.5 lines per millimeter to 67/73 (sagittal/tangential) for a+0.025 mm decenter and 72/69 (sagittal/tangential) for a−0.025 mm decenter, again this is much less than the degradation produced by a regularly designed and manufactured lens system with a biaspheric element.

Similar performance was also achieved for the ninth embodiment (note 3, Table 9).

The improvement at the edge of the field over the typical prior art designs is even more dramatic (in tables 7–9).

When optimizing, designing or analyzing a lens system with a desensitized biaspheric element, one can use a decenter in only one direction and trace both positive and negative field angle rays. On the other hand, one can also create two zoom positions by assigning a positive decenter value to one zoom position and a negative decenter value to the other zoom position.

Although, in design, one could require two zoom positions to accommodate the desired decenter value, for example, a+0.025 mm and a−0.025 mm decenter, doing the design as stated above with just one zoom position is simpler.

To summarize the steps recommended to manufacture a desensitized biaspheric plastic lens element:

1. Star with a good solution which is not desensitized to aspheric decenter;
2. Decenter one of the aspheric surfaces of the biaspheric element (first surface, for example) in only one dimension, such as the Y plane (or meridional plane);
3. Require an optimization that traces both positive and negative rays eminating from the appropriate axis (Y axis if Y decenter is being used) at infinity but filling the entire stop aperture (X, Y plane). The program will optimize the lens system, balancing these bundles of rays against each other (i.e. it tries to get equal image quality in plus and minus bundles) while it comes up with optimum parameters for the aspheric surfaces. It will try to control astigmatism, field curvature, spherical aberration, as well as other aberrations. An equivalent optimization method may also be used;
4. Drop the decenter out and the lens design is complete;
5. Print out the lens parameters; and
6. Manufacture the lens system according to these parameters.

Without a desensitizing procedure, similar to the one discussed above, the biaspheric element is difficult to make. Quality control especially would make it much more expensive to produce.

It should be obvious that weak optical components or lens elements having two surfaces with no optical power (such as plano/plano plate) and which do not significantly alter third order aberration corrections or the like might also be employed, but the term "lens element" is not intended to include such lens elements or components for purposes of the present application. It is also to be understood that other embodiments of the present invention may be scaled up or down.

Optical systems in accordance with the present invention are particularly well suited for use in cameras which create large aspect ratio images, with the larger dimension of the image area being curved in conformity with the cylindrical image surface. They have an advantage of providing a low F/number, i.e. an F/number below F/11, such as F/8, while maintaining the performance of a much slower optical system (such as a typical F/14 lens system, for example).

In the preferred embodiments, the invention is incorporated into the camera (FIGS. 19–23) of U.S. Pat. No. 5,604,639 which would be modified to include the taking lens 112. However, in the above embodiments, the shutter blade is located at the aperture stop position—i.e. between the two lens elements of the lens $10_k$.

Referring now to FIGS. 19–23, a taking lens 112 or a lens system such as $10_k$ can be contained within the assemblage of a camera, such as a recyclable single-use camera 100 having three major structural components: a main body or frame 102, a front cover 120 which is attached to the front of the body, and a rear cover 130 which is attached to the rear of the body. Referring to the exploded view of the camera 100 shown in FIG. 19, the body 102 includes a pair of formed chambers 104, 106 for retaining a film cassette 108 and a take-up roll, such as spool 110, respectively. The pair of chambers 104, 106 are oppositely disposed relative to an exposure gate 107, FIG. 23. The body 102 additionally supports the following camera parts which are attached to the body prior to the attachment of the covers 120, 130: the taking lens 112 or the optical system such as lens $10_k$ which is attached to the front of the body 102 by means of a retainer 114 and a support plate 116 sandwiching the lens therebetween, wherein the support plate has a contact switch 117; and a plastic viewfinder 118. Also attached to the body 102 is a shutter mechanism 119 consisting of a keeper plate 122 having a depressible shutter release portion for tripping a shutter blade 124, biased by a spring 123 via a high-energy lever 126 which is also biased by helical spring 127; a film advancing and metering mechanism consisting of a thumbwheel 128 which engages the spool (not shown) of the loaded film cassette 108, a sprocket 132 for engaging film perforations having a spring biased portion extending into a rotatable cam 134 which engages a metering lever 136 which is biased by means of a spring 138, the cam having an extending portion 138 for contacting a frame counter 140;

a light baffle 142 which is mounted into the rear of the body 102 and into the exposure gate 107, FIG. 23; and the flash illumination assembly 30 having an anamorphic lens 10' and further including a capacitor 146 and circuit board 148 which is powered by a battery 150. The illumination assembly 30 is made operable, preferably according to the particular embodiment, by a one touch cantilevered portion of the front cover 120, FIG. 20. The front cover 120 and the rear cover 130 are sandwiched together along with the body 102 to form an assembled camera and a label 152 is subsequently attached to the finished camera 100.

Single-use cameras, such as the described camera 100, are designed to be recycled by the manufacturer after a purchaser has completed exposing the loaded film and turned the camera over to a photofinisher for development of the film. According to this preferred embodiment, the photofinisher opens a door 154 on the rear cover 130 and removes the fill cassette 108. The opening of the door 154 breaks the rear cover 130, but without damaging or exposing the camera parts which are attached to the body 102. Similarly, a second breakaway door 156 can also be provided on the rear cover 130 to be opened by the photofinisher to remove the flash battery 150, if desired. See FIG. 22.

The camera 100 is then turned over to the manufacturer for recycling as will now be described with reference to the FIGS. 19–23. The front cover 120 and rear cover 130 are each broken away from the body 102, each having releasable hooks (not shown) or other attachment means for allowing removal of the covers from the body. The covers, made from a recyclable plastic such as polystyrene, can be sent to be pulverized. In the meantime, an evaluation can be made as to each of the parts supported by the body 102; i.e.: the viewfinder s 118, shutter mechanism 119, flash illumination assembly 30, the optical system $10_k$, etc., or the lens elements of the optical system. Those parts deemed worn are removed from the body 102 and replaced. Those remaining single-use parts, such as the optical system $10_k$ or the lens cell containing these lens elements, such as the front lens element $12_k$, the camera flash assembly 30, shutter mechanism 119, etc., which can be reused remain supported by the body 102, for reassembly of a camera 100.

A new front cover 120 is then fitted to the front face of the body 102 and an unexposed roll of film 109 contained within a fresh cassette 108 is loaded into the film cartridge chamber 104. A leading portion of the film 109 contained with the cassette 108 is then engaged with the take-up spool 110, housed within the body chamber 106, as is conventionally known. A new rear cover 130 is then snapped or otherwise attached onto the rear of the camera body 102 and/or to the from cover 120. It should be readily apparent that the covers 120, 130 and body 102 may utilize a number of means for attaching the structural parts together; for example, hook and/or press fitting members may be used, or the parts can be ultrasonically welded together.

In the particular camera 100 described, the film 109 is then pre-wound onto the take-up spool 110 which is supported for rotation in chamber 106 so that the film is wound back into the cassette 108 as the film is being exposed.

The recycled single-use camera 100, utilizing previously used single-use camera parts, such as the flash illumination assembly 30, and the particularly described lens system $10_k$ is now fully assembled and ready for consumer use.

Thus, it is also apparent that the invention provides for making a single-use camera from previously used single-use camera parts utilizing the above-mentioned optical system $10_k$ as a taking lens 112 for such camera.

It is to be understood that the introduction of the aspheric surfaces is not restricted to the particular examples shown herein.

Variations and modifications within the scope of the invention will undoubtedly suggest themselves to those skilled in the art. Accordingly, the foregoing description should be taken as illustrative and not in a limiting sense. Thus, the invention has been described in detail with particular reference to a preferred embodiment thereof, but it will be understood that variations and modifications can be effected within the spirit and scope of the invention.

What is claimed is:

1. An optical system for use in a low-cost camera having a photosensitive material with an image surface curved toward said optical system, said optical system comprising only two single lens components and an aperture stop located therebetween, wherein one of said lens components is biaspheric, said optical system forming a curved image corresponding substantially to the curved image surface of the camera through a full field angle θ of at least 62.5 degrees, and wherein said optical system is not sensitive to aspheric surface decenter of ±0.025 mm of said biaspheric lens component, so that the heterochromatic MTF values of the optical system are $$MTF > 58,$$

where MTF represents sagittal and tangential MTF values at the spatial frequency of 12.5 lines/mm, from zero to about 70% field of view.

2. An optical system according to claim 1, wherein each of said two lens components is a plastic lens element.

3. An optical system according to claim 2, wherein one of said plastic lens elements is a front-most lens element, said front-most lens element having a meniscus shape with a convex surface facing the object side.

4. An optical system according to claim 2, wherein each of said plastic lens elements is a meniscus lens element concave to said aperture stop.

5. An optical system according to claim 4, wherein one of said lens elements has only one aspheric surface.

6. An optical system according to claim 5 wherein said only one aspheric surface is a front-most surface of the lens element.

7. An optical system as claimed in claim 4, wherein each lens element fulfills the following two requirements:

$$1 \text{ mm} < T < 3 \text{ mm}$$

where T is the center thickness of each of the lens elements.

8. An optical system according to claim 1, wherein one of said lens components is a glass lens component.

9. An optical system according to claim 8 wherein each of said lens components is a meniscus lens element concave to said aperture stop.

10. An optical system according to claim 1, wherein the other one of said lens components has at least one aspheric surface.

11. An optical system according to claim 10, wherein said only one aspheric surface is a front-most surface of the lens element.

12. An optical system according to claim 1 which satisfies the following parameters:

| Surface | Clear Aperture | Axial Beam | Radius | Thickness | Index $N_d$ | V-Number $V_d$ |
|---|---|---|---|---|---|---|
| 1 | 8.11 | 3.00 | ASPHERE | 2.850 | 1.492 | 57.4 |
| 2 | 5.03 | 2.60 | ASPHERE | 1.700 | | |
|  | 2.55 | 2.55 | DIAPHRAGM | 1.764 | | |

-continued

| Surface | Clear Aperture | Axial Beam | Radius | Thickness | Index $N_d$ | V-Number $V_d$ |
|---|---|---|---|---|---|---|
| 3 | 5.12 | 2.50 | −7.93827 | 2.000 | 1.492 | 57.4 |
| 4 | 6.83 | 2.66 | −5.37793 | | | |
| | | | LENS LENGTH 8.314 | | | |

Where the radius of curvature for a surface, the axial thickness and air separations are measured in millimeters.

Aspheric Equation:

$$X = \frac{CY^2}{1+\sqrt{1-(k+1)C^2Y^2}} + DY^4 + EY^6 + FY^8 + GY^{10} + HY^{12} + IY^{14} + JY^{16} + KY^{18}$$

| Surf. 1 | C = 0.1375124  k = 0.9855269 | D = 0.2975986E-03  E = −0.1802293E-04  F = 0.0567433E-05  G = −0.2582161E-06 | H = −0.5338952E-08  I = 0.7213138E-09  J = 0.3634665E-10  K = −0.2374518E-11 |
|---|---|---|---|
| | VERTEX RADIUS (1/C) = 7.27207 | | |
| Surf. 2 | C = 0.1292569  k = 2.5571032 | D = 0.1026159E-02  E = 0.2197372E-03  F = −0.3899092E-04  G = 0.5965716E-06 | H = 0.1958292E-05  I = −0.2254705E-06  J = 0.  K = 0. |
| | VERTEX RADIUS (1/C) = 7.73653 | | |

13. An optical system according to claim 1 which satisfies the following parameters:

| Surface | Clear Aperture | Axial Beam | Radius | Thickness | Index $N_d$ | V-Number $V_d$ |
|---|---|---|---|---|---|---|
| 1 | 7.80 | 3.00 | ASPHERE | 2.850 | 1.492 | 57.4 |
| 2 | 5.23 | 2.51 | 9.94649 | 1.517 | | |
| | 2.31 | 2.31 | DIAPHRAGM | 1.883 | | |
| 3 | 4.88 | 2.05 | ASPHERE | 2.500 | 1.590 | 30.9 |
| 4 | 7.74 | 2.17 | ASPHERE | | | |
| | | | LENS LENGTH 8.750 | | | |

Where the radius of curvature for a surface, the axial thickness and air separations are measured in millimeters.

Aspheric Equation:

$$X = \frac{CY^2}{1+\sqrt{1-(k+1)C^2Y^2}} + DY^4 + EY^6 + FY^8 + GY^{10} + HY^{12} + IY^{14} + JY^{16} + KY^{18}$$

| Surf. 1 | C = 0.1748686  k = 0.1739281 | D = 0.  E = 0.  F = 0.  G = 0. | H = 0.  I = 0.  J = 0.  K = 0. |
|---|---|---|---|
| | VERTEX RADIUS (1/C) = 5.71858 | | |
| Surf. 3 | C = −0.1667150  k = 0.7696216 | D = −0.1173103E-02  E = −0.2937716E-03  F = 0.4321027E-04  G = −0.4805751E-05 | H = −0.1248107E-05  I = 0.4331939E-07  J = 0.3983943E-07  K = −0.3217884E-08 |
| | VERTEX RADIUS (1/C) = −5.99826 | | |
| Surf. 4 | C = −0.1508910  k = 0.5900456 | D = −0.1622863E-03  E = −0.2936541E-04  F = 0.9085097E-06  G = −0.1776793E-06 | H = 0.1499098E-07  I = −0.4056008E-09  J = −0.7309910E-10  K = 0.3466098E-11 |
| | VERTEX RADIUS (1/C) = −6.62730 | | |

14. An optical system according to claim 1 which satisfies the following parameters:

| Surface | Clear Aperture | Axial Beam | Radius | Thickness | Index $N_d$ | V-Number $V_d$ |
|---|---|---|---|---|---|---|
| 1 | 9.98 | 3.50 | 6.57522 | 3.330 | 1.498 | 67.0 |
| 2 | 7.49 | 2.92 | 12.3004 | 22812 | | |
| | 2.50 | 2.50 | DIAPHRAGM | 2.852 | | |
| 3 | 5.94 | 2.07 | ASPHERE | 2.920 | 1.590 | 30.9 |
| 4 | 9.24 | 2.18 | ASPHERE | | | |
| | | | LENSLENGTH 11.914 | | | |

Where the radius of curvature for a surface, the axial thickness and air separations are measured in millimeters.

Aspheric Equation:

$$X = \frac{CY^2}{1+\sqrt{1-(k+1)C^2Y^2}} + DY^4 + EY^6 + FY^8 + GY^{10} + HY^{12} + IY^{14}$$

| Surf. 3 | C = −0.1639363  k = 0. | D = −0.1352420E-02  E = −0.1164530E-03  F = 0.7685050E-05 | G = −0.1386870E-05  H = −0.1526140E-07  I = 0. |
|---|---|---|---|
| | VERTEX RADIUS (1/C) = −6.09982 | | |
| Surf. 4 | C = −0.1388098  k = −1. | D = −0.6652480E-03  E = −0.4647250E-04  F = 0.4762720E-05 | G = −0.4537740E-06  H = 0.1959480E-07  I = −0.3859810E-09 |
| | VERTEX RADIUS (1/C) = −7.2041 | | |

15. An optical system according to claim 1 wherein tangential MTF values at the spatial frequency of 12.5 lines/mm, at about 70% field of view are 58≦tangential MTF values≦78.

16. An optical system having an image surface curved toward the optical system, said optical system comprising: (i) two single non-identical lens elements, one of which is biaspheric, and wherein the ratio of the focal lengths of the two lens elements fall within the range:

$$0.81 \geq \frac{f1}{f2} \geq 0.002,$$

or within the range $$\frac{f1}{f2} \geq 2.1,$$

where f1 is the focal length of a front lens element and f2 is the focal length of a rear lens element; and (ii) an aperture stop, said aperture stop being positioned between said two lens elements, each of said lens elements being a meniscus lens element concave to said aperture stop.

17. An optical system having an image surface curved toward the optical system, said optical system being characterized by good aberration correction over a full field angle of at least 62.5 degrees and an F/number below F/11, said optical system comprising two single non-identical lens elements, one of which is biaspheric, and an aperture stop, said aperture stop being positioned between said two lens elements, each of said lens elements being a meniscus lens element concave to the aperture stop; and wherein said optical system has a nominal average heterochromatic MTF value and said optical system is not sensitive to aspheric surface decenter of ±0.025 mm of the biaspheric lens element, so that the average heterochromatic MTF value of the optical system with a decentered aspheric surface is 7 or fewer percentage points smaller than the nominal average heterochromatic MTF value, where the average heterochromatic MTF value=(Sagittal Value+Tangential Value)/2, and is measured at 71% field at 12.5 lines per mm.

18. An optical system according to claim 17, wherein both of said lens elements are made from the same optical plastic.

19. An optical system according to claim 18, wherein the index of refraction of both lenses is 1.49 and the Abbe V number is 57.4.

20. A method of making a single-use camera from previously used camera parts, said method comprising the steps of:

(A) providing a camera body having a film cassette chamber;

(B) supporting in said camera body previously used single-use camera parts including (i) a viewfinder, (ii) a shutter mechanism, and (iii) an optical system desensitized for biaspheric sensitivity to aspheric surface decenter of |0.025|mm, said optical system including only two lens elements, at least one of said lens elements being biaspheric and each of said lens elements having an index of refraction of at least 1.45, and (C) loading an unexposed roll of film into the film cassette chamber of the camera body.

21. A single-use camera made from previously used camera parts comprising:

a camera body having a film cassette chamber, said camera body supporting previously used camera parts including an optical system desensitized for biaspheric sensitivity to aspheric surface decenter of |0.025|mm, said optical system being comprised of only two lens elements, one of said lens elements being biaspheric and a shutter located between said lens elements, wherein said optical system being adapted for imaging on a curved film plane;

a shutter mechanism, and a viewfinder; and an unexposed roll of film mounted in the film cassette chamber of the camera body.

22. A single-use camera according to claim 21, wherein both of said lens elements are biaspheric.

23. A single-use camera according to claim 21, wherein only one of said lens elements is biaspheric, said biaspheric lens element having a longer focal length then the other lens elements.

24. A single-use camera according to claim 21, wherein said lens elements are meniscus lens elements having their respective concave surfaces facing each other.

* * * * *